(12) United States Patent
Sue et al.

(10) Patent No.: US 10,613,422 B2
(45) Date of Patent: Apr. 7, 2020

(54) PROJECTION-TYPE DISPLAY DEVICE

(71) Applicant: Universal Entertainment Corporation, Koto-ku, Tokyo (JP)

(72) Inventors: Hiroaki Sue, Tokyo (JP); Koichi Mori, Tokyo (JP); Yuuichirou Suzuki, Tokyo (JP); Shinji Makisako, Tokyo (JP); Hiroyuki Ishida, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 10 days.

(21) Appl. No.: 15/374,350

(22) Filed: Dec. 9, 2016

(65) Prior Publication Data

US 2017/0169654 A1 Jun. 15, 2017

(30) Foreign Application Priority Data

Dec. 11, 2015 (JP) .................................. 2015-241978
Jul. 14, 2016 (JP) .................................. 2016-139196
Jul. 14, 2016 (JP) .................................. 2016-139237

(51) Int. Cl.
| *G03B 21/10* | (2006.01) |
| *G07F 17/32* | (2006.01) |
| *G03B 21/606* | (2014.01) |
| *G03B 21/62* | (2014.01) |
| *G03B 21/13* | (2006.01) |
| *H04N 9/31* | (2006.01) |
| *F21V 8/00* | (2006.01) |

(52) U.S. Cl.
CPC ........... *G03B 21/10* (2013.01); *G02B 6/0051* (2013.01); *G03B 21/13* (2013.01); *G03B 21/606* (2013.01); *G03B 21/62* (2013.01); *G07F 17/3211* (2013.01); *G07F 17/3218* (2013.01); *H04N 9/3141* (2013.01)

(58) Field of Classification Search
CPC ...... G03B 21/10; G03B 21/13; G07F 17/3211; G07F 17/3202; G07F 17/3216; G02B 6/0035; G02B 6/0068
See application file for complete search history.

(56) References Cited

U.S. PATENT DOCUMENTS

| 7,780,520 | B2 * | 8/2010 | Baerlocher | ............. G07F 17/32 273/138.1 |
| 8,337,298 | B2 * | 12/2012 | Baerlocher | ............. G07F 17/32 273/138.1 |
| 8,467,012 | B2 * | 6/2013 | Rasmussen | ......... G07F 17/3211 349/61 |
| 8,502,936 | B2 * | 8/2013 | Rasmussen | ....... G02F 1/133528 349/74 |
| 8,550,912 | B2 * | 10/2013 | Lanning | .............. G07F 17/3211 463/34 |

(Continued)

*Primary Examiner* — Bao-Luan Q Le
(74) *Attorney, Agent, or Firm* — Simpson & Simpson, PLLC; S. Peter Konzel

(57) ABSTRACT

There is provided a display device capable of extending the range of its application by enhancing the designability and the diversity of the display manner and by improving visual effects. The display device includes: a projector configured to project light to display information in the form of a projection image; a screen having a display surface through which light projected by the projector passes to form a projection image thereon; and a controller configured to control the projector. The display surface has a non-planar shape.

10 Claims, 40 Drawing Sheets

(56) References Cited

U.S. PATENT DOCUMENTS

| | | | | |
|---|---|---|---|---|
| 8,753,196 B2* | 6/2014 | Baerlocher | G07F 17/32 | 463/16 |
| 8,926,127 B2* | 1/2015 | Sinofsky | F21S 8/033 | 362/247 |
| 8,968,106 B2* | 3/2015 | Fujisawa | G07F 17/3206 | 463/16 |
| 9,214,065 B2* | 12/2015 | Baerlocher | G07F 17/32 | |
| 9,262,883 B2* | 2/2016 | Kishi | G07F 17/32 | |
| 9,286,749 B2* | 3/2016 | Fujisawa | G07F 17/3206 | |
| 9,509,939 B2* | 11/2016 | Henion | H04N 5/7458 | |
| 9,690,183 B2* | 6/2017 | Ohsugi | H04N 9/3185 | |
| 9,786,115 B2* | 10/2017 | Hirato | G07F 17/3213 | |
| 9,875,599 B2* | 1/2018 | Onitsuka | G07F 17/3211 | |
| 2002/0142830 A1* | 10/2002 | Adams | G07F 17/3211 | 463/20 |
| 2003/0226299 A1* | 12/2003 | Chou | B44C 5/04 | 40/591 |
| 2005/0192084 A1* | 9/2005 | Iwamoto | G07F 17/3202 | 463/20 |
| 2007/0218982 A1* | 9/2007 | Baerlocher | G07F 17/32 | 463/27 |
| 2009/0316436 A1* | 12/2009 | Takahashi | G02B 6/0078 | 362/628 |
| 2010/0081502 A1* | 4/2010 | Rasmussen | G02F 1/133528 | 463/30 |
| 2010/0190552 A1* | 7/2010 | Rasmussen | G07F 17/3209 | 463/34 |
| 2010/0227677 A1* | 9/2010 | Baerlocher | G07F 17/32 | 463/27 |
| 2011/0109882 A1* | 5/2011 | Cove | G03B 21/10 | 353/30 |
| 2012/0040738 A1* | 2/2012 | Lanning | G07F 17/3202 | 463/20 |
| 2012/0281407 A1* | 11/2012 | Sinofsky | F21S 8/033 | 362/247 |
| 2013/0116043 A1* | 5/2013 | Baerlocher | G07F 17/32 | 463/27 |
| 2013/0288793 A1* | 10/2013 | Fujisawa | G07F 17/3206 | 463/31 |
| 2014/0132935 A1* | 5/2014 | Kim | G03B 21/10 | 353/79 |
| 2014/0287825 A1* | 9/2014 | Baerlocher | G07F 17/32 | 463/27 |
| 2015/0062890 A1* | 3/2015 | Camarota | F21V 5/04 | 362/223 |
| 2015/0080107 A1* | 3/2015 | Hirato | G07F 17/3213 | 463/20 |
| 2015/0133220 A1* | 5/2015 | Fujisawa | G07F 17/3206 | 463/31 |
| 2015/0358574 A1* | 12/2015 | Henion | H04N 5/7458 | 348/745 |
| 2015/0363997 A1* | 12/2015 | Onitsuka | G07F 17/3211 | 463/32 |
| 2016/0071354 A1* | 3/2016 | Hilbert | G07F 17/3209 | 463/31 |
| 2016/0071376 A1* | 3/2016 | Baerlocher | G07F 17/32 | 463/16 |
| 2016/0097970 A1* | 4/2016 | Ohsugi | H04N 9/3185 | 348/759 |

* cited by examiner

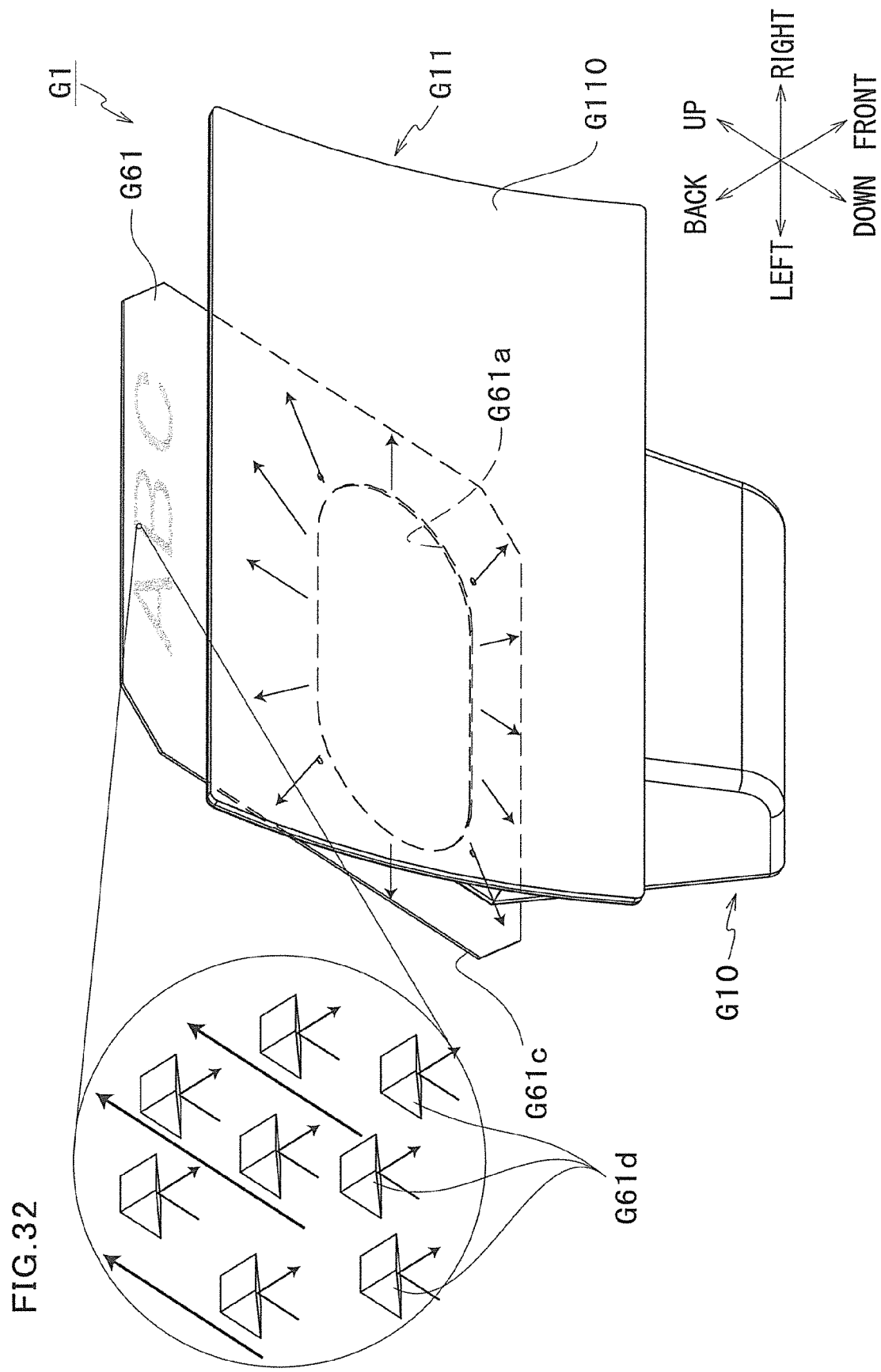

PROJECTION-TYPE DISPLAY DEVICE

CROSS REFERENCE TO RELATED APPLICATION

The present application claims priority from Japanese Patent Applications No. 2015-241978 filed on Dec. 11, 2015, No. 2016-139196 filed on Jul. 14, 2016, and No. 2016-139237 filed on Jul. 14, 2016, the disclosures of which are herein incorporated by reference in its entirety.

FIELD OF THE INVENTION

The present invention relates to a display device.

BACKGROUND OF THE INVENTION

There have been known display devices configured to display information. For example, there is disclosed a topper display device of a gaming machine, by U.S. Unexamined Patent Publication No. 2016/0005261, for example. The topper display device is configured to display contents related to a game on its front.

BRIEF SUMMARY OF THE INVENTION

Technical Problem

In recent years, there is a display device which incorporates a projector therein and is configured to project images onto a screen on a front side. The use of the projector is advantageous in that the size of the display screen can be enlarged at low cost. However, because the projector is disposed inside the display device, the depth of the device has to be increased. Because of this disadvantage, there has been sought to add further value in the use of the projector in the display device, by improving other factors such as the designability and the diversity of the display manner.

The present invention has been made to solve the above problem. An object of the invention is to provide a display device capable of extending the range of its application by enhancing the designability and the diversity of the display manner and by improving visual effects provided by the device.

Technical Solution

According to an embodiment of the present invention, a display device includes: a projector configured to project light to display information in a form of a projection image; a screen having a display surface through which light projected by the projector passes to form a projection image thereon; and a controller configured to control the projector, wherein the display surface has a non-planar shape.

In the above arrangement, the display surface of the screen, to which light to display information in the form of a projection image is projected by the projector, has a non-planar shape. This enables the device to display a stereoscopic image with depth, to further enhance visual effects and decorative effects.

In the display device of the present invention, the display surface of the screen may have a curved shape with inclination.

In the above arrangement, when the entire display surface has a convex shape, display thereon is visually perceptible from a wider range of area than that on the flat display surface. Meanwhile, when the entire display surface has a concave shape, display thereon is visually perceptible from a narrower range of area than that on the flat display surface. Thus, the above arrangement extends the range of application of the display device.

In the display device of the present invention, the display surface of the screen may be formed by a plurality of projection surface members partially overlapping each other.

In the above arrangement, the stereoscopic screen suited for projection images is structured. Thus, it is possible to further extend the range of application of the display device.

In the display device of the present invention, the screen may be arranged to be replaceable.

In the above arrangement, by replacing the screen, it is possible to change the visual impressions given by projection images on the display surface. Therefore, the display manner is freely changeable merely by replacing the screen in accordance with the layout of the place in which the display device is provided or the design of an external device to which the display device is connected. This enhances the designability and the diversity of the display manner.

According to an embodiment of the present invention, a display device includes: a screen unit including a casing, a projector provided in the casing and configured to project light to display information in a form of a projection image, and a screen forming a wall surface of the casing and having a display surface through which light projected by the projector passes to form a projection image thereon; a light emission unit provided in the casing, the light emission unit including a light source and an illuminated portion illuminated by the light source; and a controller configured to control the projector and the light emission unit, wherein the display surface has a non-planar shape.

In the above arrangement, the display surface of the screen, onto which light to display information in the form of a projection image is projected by the projector, has a non-planar shape, and the light emission unit is mounted in addition to the projector. This makes it possible to give notification or the like through light emission, around the screen unit. There has been a structural problem in projectors: brightness is lower in the peripheral portion of the screen than the central portion of the screen. However, in the above arrangement, the display device is configured to display a stereoscopic image with depth by the use of the non-planar screen. Further, the light emission unit is provided around the casing provided with the screen. These arrangements capture attention of people looking at the display device. This makes the above-mentioned problem less noticeable.

In the display device of the present invention, the light emission unit may be provided so that at least one of edges of the screen is fringed with the light emission unit.

In the above arrangement, the light emission unit is provided so that at least one of the edges of the screen is fringed with the light emission unit. Light is emitted from the light emission unit, in addition to projection images projected by the projector. This further enhances the visual effects and the decorative effects of the display manner.

In the display device of the present invention, the casing may be provided with a light-shielding member provided at an edge portion of the screen and configured to shield the display surface from light traveling from the light emission unit to the display surface.

In the above arrangement, the light-shielding member is provided to shield the display surface from light emitted from the light source. When the screen unit and the light emission unit are unitarily formed, for example, this arrangement increases the efficiency of application of light by the projector to project a projection image on the screen, and reduces effects on the brightness and resolution of the projection image projected on the display surface of the screen.

In the display device of the present invention, the light emission unit may include: a light-transmitting light guiding plate provided on an opposite side of the casing from the display surface so as to be attachable to and detachable from the casing, and having an opening of a predetermined shape penetrating the plate in its thickness direction; and a plurality of light sources provided so as to be opposed to an opening-side end surface forming the opening of the light guiding plate, and the display device may be arranged such that the light sources are arranged to be aligned along the opening-side end surface, and light from the light sources is guided into the light guiding plate through the opening-side end surface, to illuminate an outer end surface of the light guiding plate.

In the above arrangement, light emitted from the light sources arranged in the opening of the light guiding plate enters through the opening-side end surface of the light guiding plate, and then the light is guided in the light guiding plate, to illuminate the whole area of the outer end surface of the light guiding plate. Thus, light emitted from the light sources is radially dispersed in the light guiding plate and reaches the outer end surface of the plate. This makes it possible to illuminate the whole circumference of the light guiding plate annularly. As a result, the thus illuminated light guiding plate is visible from all the directions relative to the display device, which further enhances the visual effects and decorative effects of the display device.

In the display device of the present invention, the light guiding plate may include a reflecting portion processed to reflect, in the thickness direction of the light guiding plate, a part of light emitted from the light sources and guided in the light guiding plate.

In the above arrangement, a part of light guided in the light guiding plate exits through a surface of the light guiding plate, reflected by the reflecting portion of the light guiding plate, which portion has been processed to reflect light. Light exiting from the surface of the light guiding plate improves the designability, to further enhance the visual effects and decorative effects of the display device.

According to an embodiment of the present invention, a display device includes: a screen unit including a casing, a projector provided in the casing and configured to project light to display information in a form of a projection image, and a screen forming a wall surface of the casing and having a display surface through which light projected by the projector passes to form a projection image thereon; a light emission unit provided in the casing, the light emission unit including a light source and an illuminated portion illuminated by the light source; an input device configured to receive operation from an outside; and a controller connected to an external device and configured to control the projector and the light emission unit based on a signal from the external device, and to control the light emission unit based on a signal from the input device, wherein the display surface has a non-planar shape.

In the above arrangement, the display surface of the screen, onto which light to display information in the form of a projection image is projected by the projector, has a non-planar shape, and the light emission unit is mounted in addition to the projector. This makes it possible to give notification or the like through light emission, around the screen unit. Projection images on the display surface are controlled based on a signal from the external device. The light emission mode of the light emission unit is controlled based on a signal from the external device and a signal from the input device which receives operation from the outside. There has been a structural problem in projectors: brightness is lower in the peripheral portion of the screen than the central portion of the screen. However, in the above arrangement, the display device is configured to display a stereoscopic image with depth by the use of the non-planar screen. Further, the light emission unit is provided around the casing provided with the screen. These arrangements capture attention of people looking at the display device. This makes the above-mentioned problem less noticeable. Further, the light emission mode of the light emission unit is changeable by operation from the outside. Thus, it is possible to extend the range of application of the display device.

In the display device of the present invention, the controller may control the light emission unit to emit light in a specific light emission mode when receiving a signal from the input device.

In the above arrangement, when the input device is operated from the outside, the light emission unit emits light in the specific light emission mode. This makes all the people who can see the light emission unit know the fact that the input device has been operated.

In the display device of the present invention, the input device may be a touch sensor.

In the above arrangement, the touch sensor formed as a planar surface is used instead of a button having a movable portion. This prevents failures caused by dirt or the like entering a space around the movable portion, and failures caused by fatigue in the movable portion.

In the display device of the present invention, the external device may be a gaming machine, and the display device may be arranged such that the controller is configured to: receive a video signal and a light emission pattern signal corresponding to a game status from the gaming machine; control the projector to project light to display video indicated by the video signal in the form of a projection image; and control the light emission unit to emit light in a light emission mode indicated by the light emission pattern signal.

In the above arrangement, the display device can be used as a display area for a game in the gaming machine. In addition, the light emission unit can be used for effects in the game. Further, because it is possible to control the light emission unit through the input device, the display device is able to function as a notification device to call casino staff or the like.

BRIEF DESCRIPTION OF THE DRAWINGS

FIG. 32 is an explanatory diagram illustrating an example of the illumination manner of the light guiding plate in Eighth Embodiment.

DETAILED DESCRIPTION OF EMBODIMENTS

The following will describe embodiments of the present invention with reference to the drawings.

First Embodiment

First of all, a description will be given for the basic outline of a display device of First Embodiment of the present invention.

The display device of the present embodiment is configured to display various types of information in the form of a projection image, using a transmission-type projector device. That is, the display device includes: a projector configured to project light to display information in the form of a projection image; a screen having a display surface through which light projected by the projector passes to form a projection image thereon; and a controller configured to control the projector. The display surface of the screen has a non-planar shape (for example, see FIG. 17). This enables the device to display a stereoscopic image with depth, to further enhance visual effects and decorative effects.

The following description of the embodiments mainly deals with the case where a single display device is connected to a single gaming machine. However, the present invention is not limited to this. For example, the display device may be used as a common display device connected to a plurality of gaming machines. Further, the number of projectors mounted in a display device is not limited to one. A plurality of projectors may be mounted in a single display device. The display device does not have to be connected to the gaming machine. The display device may be configured to operate independently. The display device may be connected to Internet, to be operable based on information from a server or the like. To be more specific, the display device may be a device which operates solely to display advertisement or the like, or may be a unit for decorating a gaming machine, which unit operates independently from the gaming machine.

Figure 17:
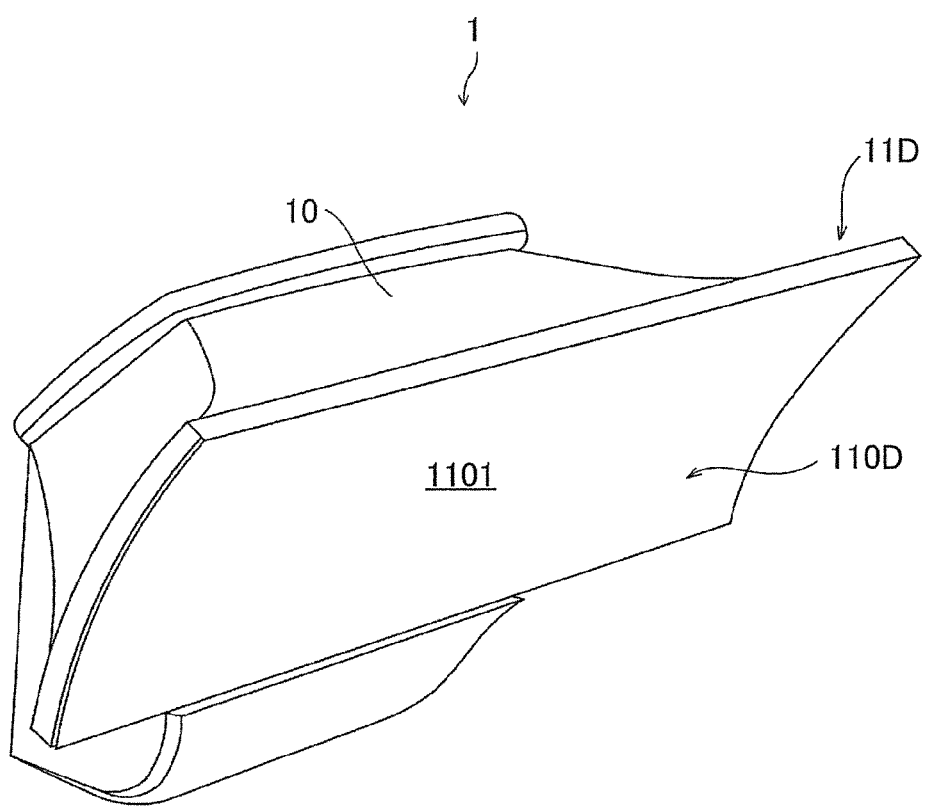
FIG. 17 is an overall perspective view of the display device of Fifth Embodiment.
Figure 19:
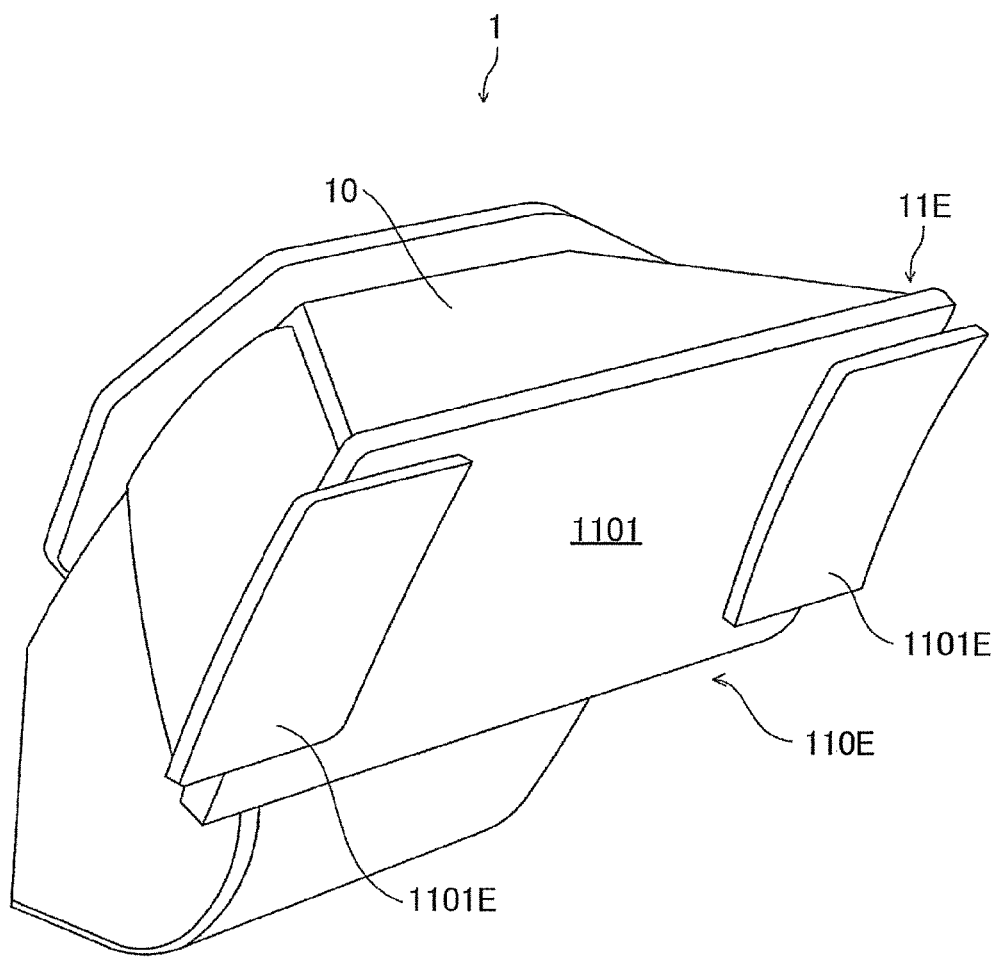
FIG. 19 is an overall perspective view of the display device of Modification 1 of Fifth Embodiment.
Figure 20:
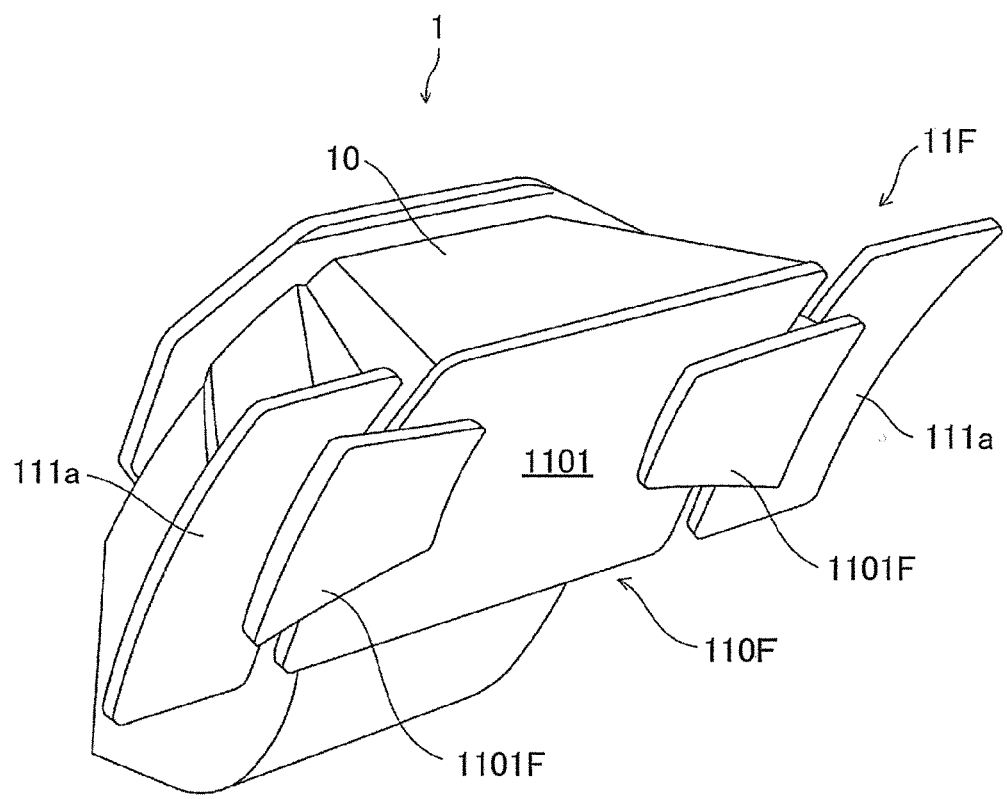
FIG. 20 is an overall perspective view of the display device of Modification 2 of Fifth Embodiment.

The shape of the screen is not particularly limited as long as its display surface has a non-planar shape. Such a non-planar surface is not limited to a curved surface gently inclined throughout its whole range, for example, as shown in FIG. 17. For example, a part of the display surface may project, or a recess may be provided at a part of the display surface. As shown in FIG. 19 and FIG. 20, for example, such a non-linear display surface may be formed by a plurality of members.

In the following embodiments, the controller of the display device determines information to be displayed in the form of a projection image (hereinafter referred to as "projection image information"), based on a control signal transmitted from the gaming machine connected to the display device. However, the present invention is not limited to this. For example, the controller may determine the projection image information as follows. The controller may store predetermined patterns, and may display plural types of information based on the stored patterns. Alternatively, the controller may determine the projection image information based on a control signal transmitted from the outside of the display device. Such a control signal from the outside may be received via the Internet, for example, or may be received from an external device connected to the display device. Alternatively, such a control signal may be received from an input device provided to the display device.

Such a control signal may be the projection image information. Alternatively, such a control signal may be identification information to identify the projection image information. In this case, the projection image information is stored in the controller. As such, the controller may store: the projection image information; information regarding the relation between the projection image information and the identification information; display patterns for the projection image information; and/or the like.

[Structure of Display Device]

The structure of the display device will be described with reference to FIG. 1 to FIG. 6. Some of the embodiments including the present embodiment are described using a display device, the display surface of the screen of which does not have a non-planar shape. However, a screen having a non-planar display surface is applicable to the display device of these embodiments. The screen having a non-planar display surface will be described later.

Figure 1:
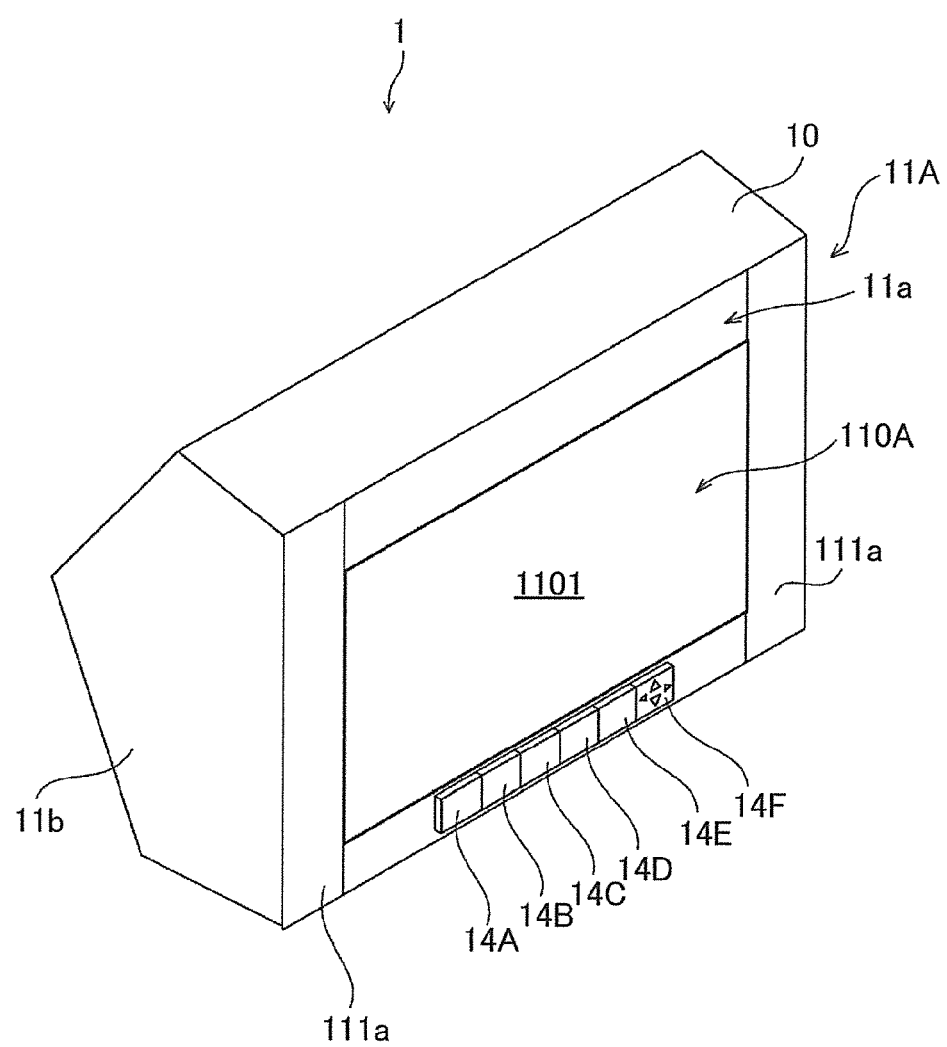
FIG. 1 is an overall perspective view of a display device of First Embodiment.
Figure 2:
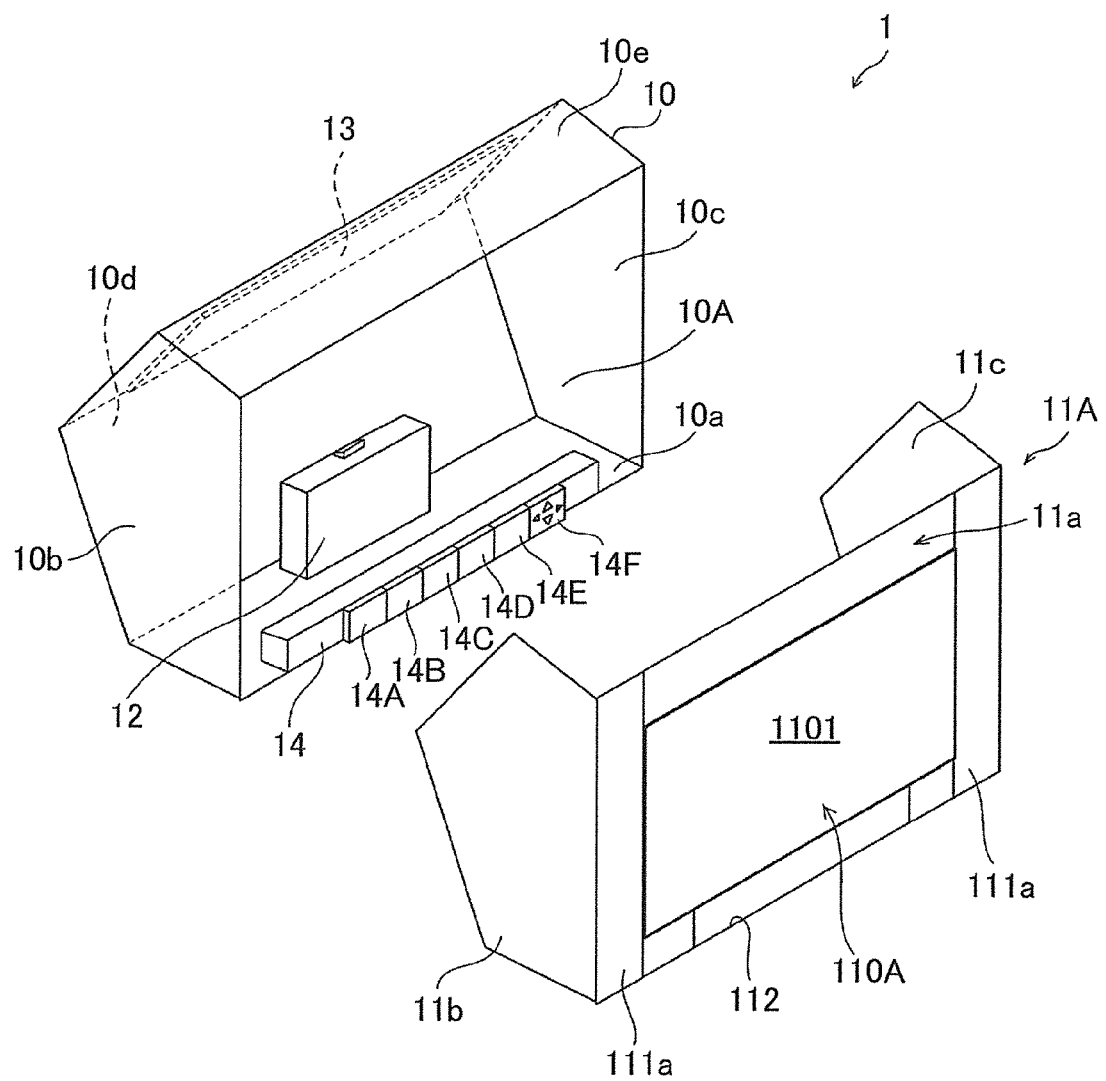
FIG. 2 is an exploded perspective view of the display device of First Embodiment.
Figure 3:
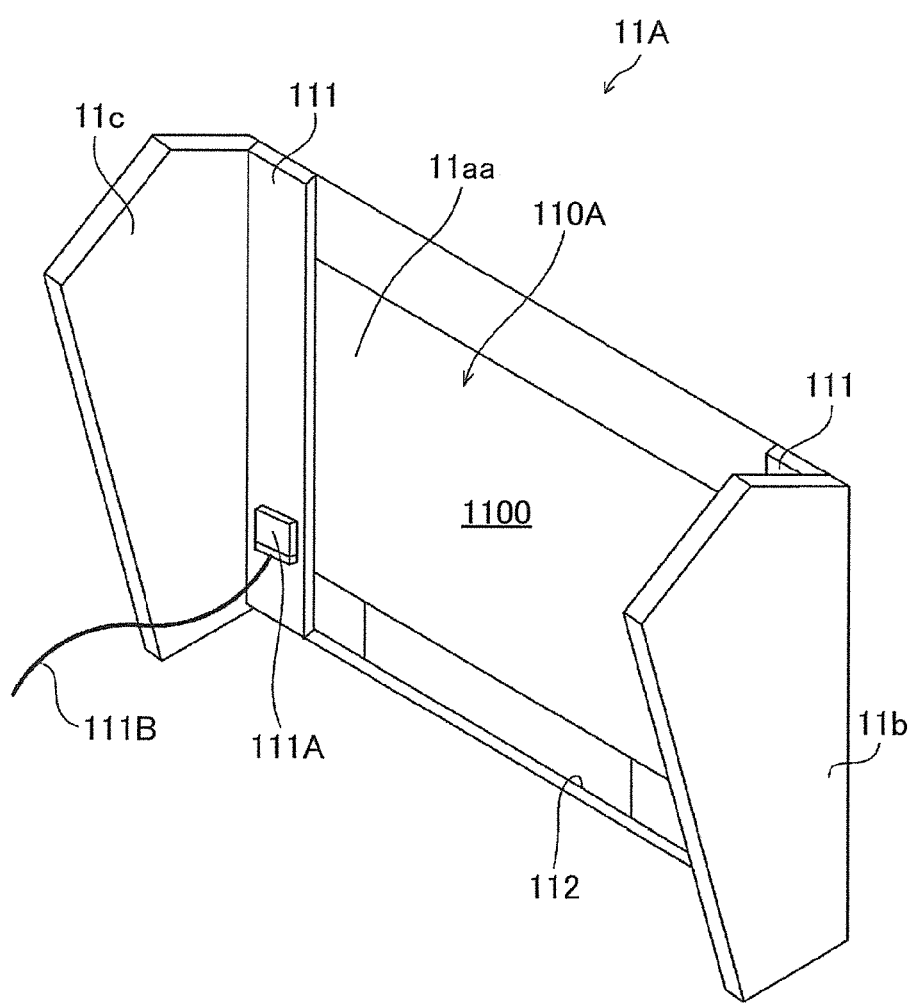
FIG. 3 is a perspective view of a screen unit of the display device of First Embodiment, viewed from the back.
Figure 4A:
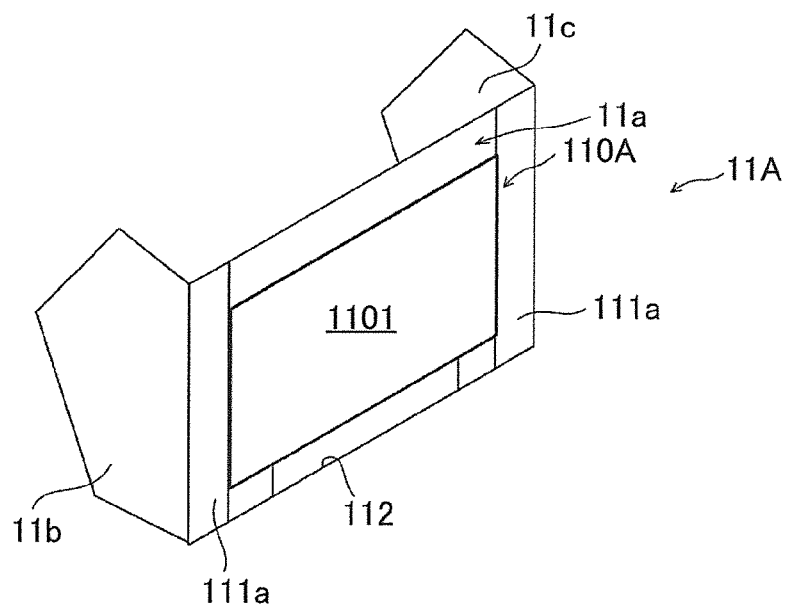
FIG. 4A is a perspective view of an exemplary replaceable screen unit of the display device of First Embodiment.

As shown in FIG. 2, the display device 1 of the present embodiment includes: a casing 10; a screen unit 11A; a projector main body (projector unit) 12; a reflector 13; and an operation unit 14, as basic components. The casing 10 accommodates therein an unillustrated control unit, in addition to the projector main body 12, the reflector 13, and the operation unit 14. The control unit is configured to control the operation of the overall display device 1. The screen unit 11A is attached to cover an opening 10A provided on the front side of the casing 10. In First Embodiment, there are three replaceable screen units 11A to 11C, by way of example, as shown in FIG. 4A and FIG. 4C. FIG. 1 to FIG. 3 each shows the screen unit 11A of a standard type. Unless otherwise noted, the description will be given basically using the screen unit 11A. However, any of these screen units may be used.

As shown in FIG. 2, the casing 10 has a box-like shape. The casing 10 has: a bottom surface 10a; left and right side surfaces 10b and 10c; rear surface 10d; an upper surface 10e; and the front-side opening 10A. The projector main body 12 is disposed on a rear portion of the bottom surface 10a. The operation unit 14 is disposed on a front portion of the bottom surface 10a. The reflector 13 is attached to an upper portion of the rear surface 10d.

The screen unit 11A has: a front surface portion 11a configured to cover the opening 10A of the casing 10; and left and right side portions 11b and 11c. The side portions 11b and 11c are detachably secured to the side surfaces 10b and 10c of the casing 10, respectively. The screen unit 11A includes: a screen (projection surface member) 110A provided at an opening 11aa of the front surface portion 11a; and LED substrates 111. The LED substrates 111 are provided at both left and right portions of the back surface of the front surface portion 11a, as shown in FIG. 3.

The front surface portion 11a has: light exit surfaces 111a; and an aperture 112, in addition to the opening 11aa in which the screen 110A is disposed. The light exit surfaces 111a are provided to the left and right of the screen 110A, and light is applied through the light exit surfaces 111a. Through the aperture 112, buttons 14A to 14F of the operation unit 14 are exposed to face the front.

The screen 110A is a light-transmission type rear-projection screen, i.e., light is projected from behind the screen. The screen 110A is mainly made of a light-transmitting glass plate, acrylic plate, or resin film, for example. The color of the screen 110A is normally (when no image is projected thereon) milky white, translucent, or gray. The screen 110A of the screen unit 11A has a uniform thickness throughout the screen 110A. The screen 110A has: a uniformly flat incident surface 1100 (FIG. 3) on the back side thereof; and a display surface 1101 (FIG. 2) on the front side thereof. To the incident surface 1100, light projected from the projector main body 12 enters. On the display surface 1101, a projection image is formed by light having entered the incident surface 1100 and having been transmitted through the screen 110A. The screens 110B and 110C of the remaining screen units 11B and 11C each has the incident surface 1100 similar to that of the screen 110A of the screen unit 11. Meanwhile, the display surface 1101 of each of the screens 110B and 110C is different from that of the screen 110A. This will be detailed later.

As shown in FIG. 2 and FIG. 3, each light exit surface 111a is a surface of a light-transmitting plate member. The LED substrates 111 are respectively provided on the back of the plate members. Although not illustrated, a plurality of LEDs are mounted on each LED substrate 111. Each LED substrate 111 is connected to the control unit in the casing 10 through a connector 111 and a cable 111B. In FIG. 3, the connector 111A and the cable 111B for one of the LED substrates 111 are illustrated. It should be noted that the connector and the cable are provided for the other of the LED substrates 111, and the other of the LED substrates 111 is also connected to the control unit through the connector and the cable.

The control unit controls the LEDs on the LED substrates 111 so as to be turned on or blink. Light emitted from the LEDs is applied frontward through the light exit surfaces 111a. No light emitting portion is provided to the screen units 11B and 11C. The reason for this will be described later.

Each light exit surface 111a is a surface of the light-transmitting plate member in this embodiment. However, the present invention is not limited to this. The light exit surface may be made of a material that at least partially has a light-transmitting portion. That is, the light exit surface may partially include a portion through which light is not transmittable.

In such a light-transmitting portion, a decorative sheet may be provided between each LED substrate and the corresponding plate member. Further, light-transmitting colored decoration may be provided to the light-transmitting portion of the plate members. In this case, while each LED substrate functions as a light emitting unit having a light source, each plate member functions as a decoration member decorated by the light emitting unit. As the decoration member, there is used a member having optical characteristics, such as light transmittance, diffusion, polarization, refraction, and reflection.

The projector main body 12 is configured to project light to display various types of information on the screen in the form of a projection image. The projector main body 12 may be, for example, of an LCD (liquid-crystal display) type using a liquid-crystal display, or of a DLP (Registered Trademark: Digital Light Processing) using a DMD (Digital Micromirror Device). Examples of various types of information displayed on the screen include advertisement, information on the external device connected to the display device, and the like. When a gaming machine is connected to the display device, for example, contents of a game executed on the gaming machine are displayed, for example.

The projector main body (projector unit) 12 is connected to the unillustrated control unit. The control unit controls the operation of the projector main body 12. The projector main body 12 includes: a liquid-crystal panel or a DMD; and an LED or a lamp functioning as a light source; a dichroic mirror; a projector lens; and the like. The position of the projector lens is adjustable with respect to the optical axis.

The projector main body 12 is provided so that light exiting from the projector lens directly goes to the reflector 13. When the screen unit (11A to 11C) is attached, focus can be adjusted by slightly adjusting the position of the projector lens of the projector main body 12 with respect to the optical axis. This enables projection of sharp projection images in correct focus on the screen (110A to 110C), whichever of the screen units 11A to 11C is used.

The reflector 13 is made of a member which reflects light. The reflector 13 is provided on the rear surface 10d to be inclined relative to the opening 10A of the casing 10. The reflector 13 reflects light coming from the projector main body 12 toward the opening 10A (toward the incident surface 1100 of the screen 110A).

Figure 6:
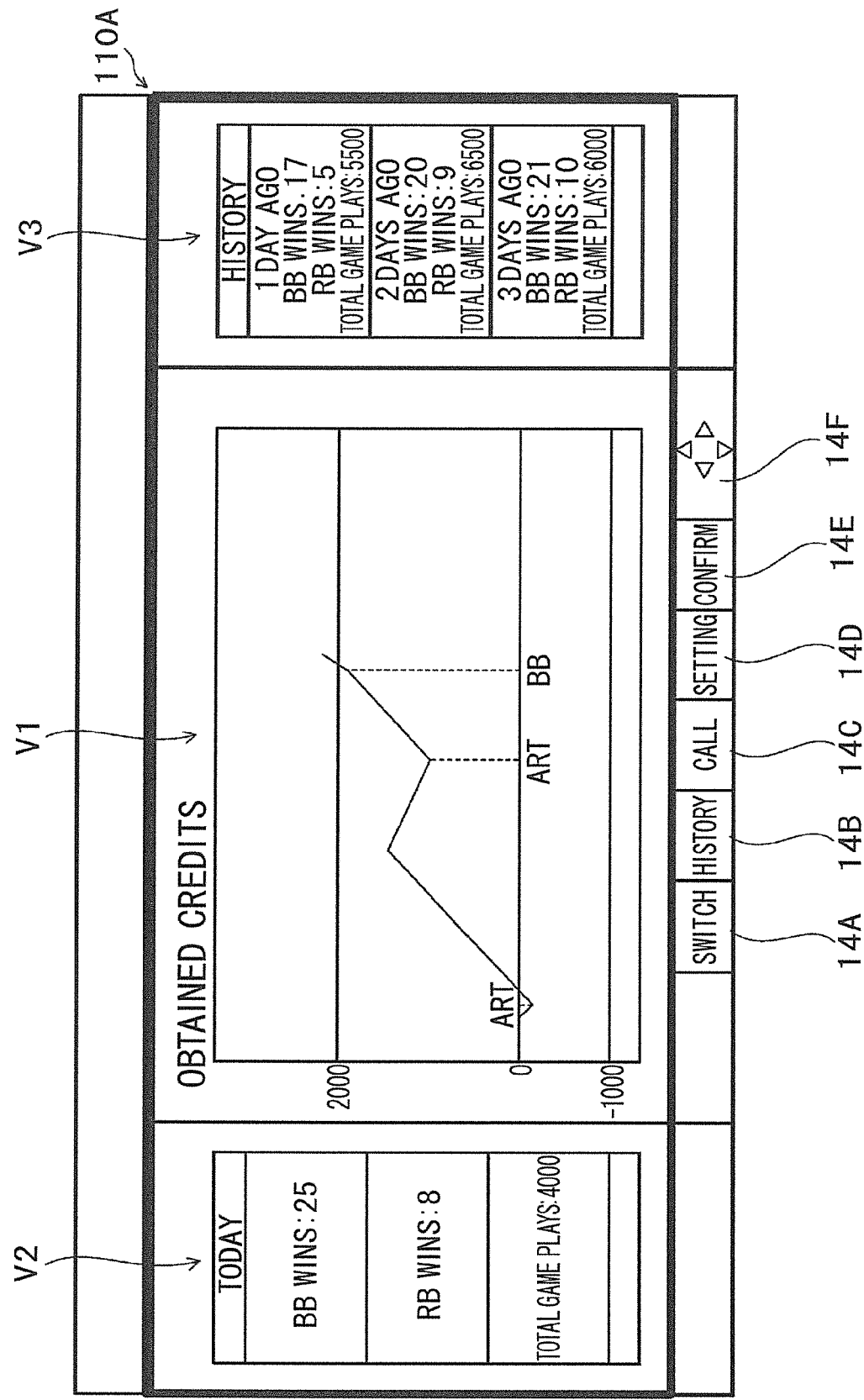
FIG. 6 is a schematic diagram illustrating an example of contents displayed on the display device of First Embodiment.

The operation unit 14 has a plurality of buttons 14A to 14F arranged laterally. The buttons 14A to 14F are operable by a user of the display device (hereinafter, simply referred to as a "user".) Specifically, as shown in FIG. 6, the operation unit 14 has the following buttons arranged from left to right: a switch button 14A, a history button 14B, a call button 14C, a setting button 14D, a confirm button 14E, and a four-way button 14F. The operation unit 14 is connected to the unillustrated control unit. When operation on any of the buttons 14A to 14F is detected by the switch corresponding thereto, a detection signal is supplied from the switch to the control unit. Then, the control unit performs display control corresponding to the detection signal.

In the present embodiment, the display device is connected to a gaming machine, and the switching button 14A is used to switch the displayed contents, such as a graph and numerical values, which will be described later. The history button 14B is used to display today's game history. The call button 14C is used to call the staff of a casino. The setting button 14D is used to change the display setting and the like.

The confirm button 14E is used to confirm various settings. The four-way button 14F is used to change a numerical value, and to scroll.

Figure 4B:
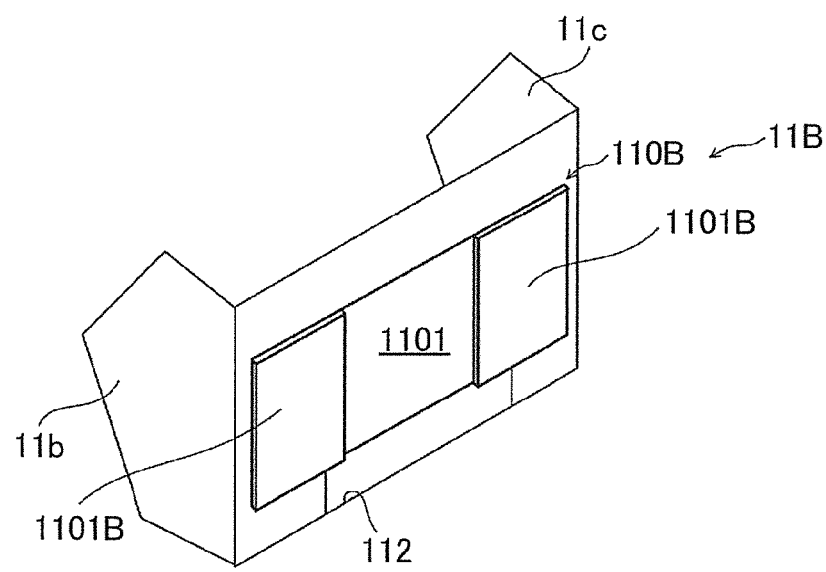
FIG. 4B is a perspective view of an exemplary replaceable screen unit of the display device of First Embodiment.
Figure 4C:
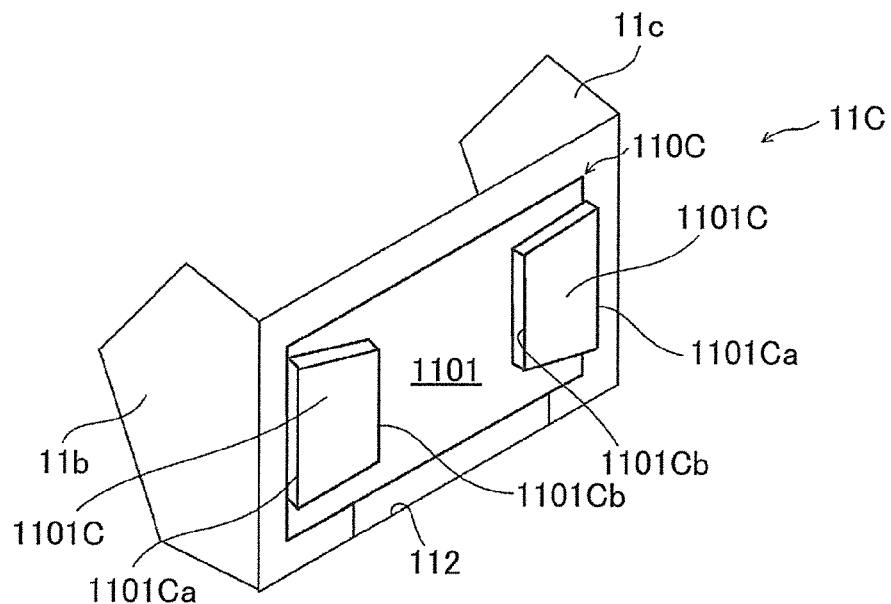
FIG. 4C is a perspective view of an exemplary replaceable screen unit of the display device of First Embodiment.
Figure 5A:
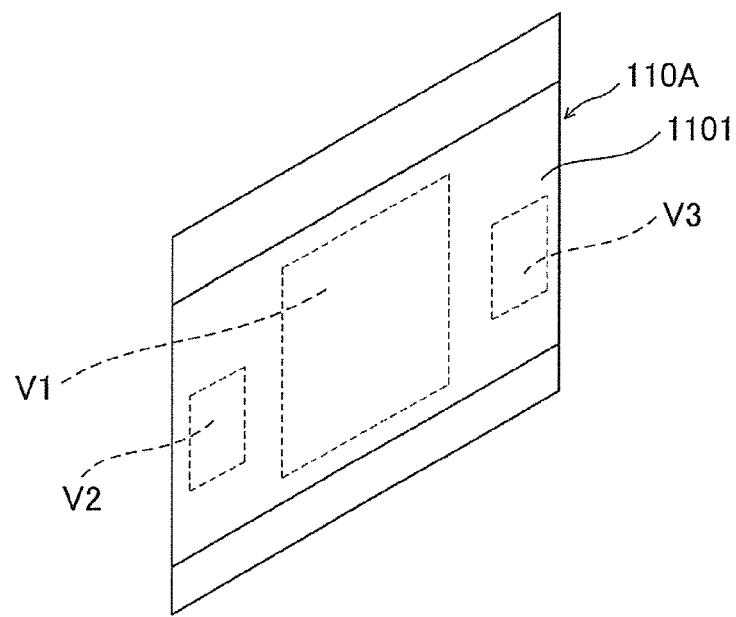
FIG. 5A is a perspective view of an exemplary display area of the screen unit.
Figure 5B:
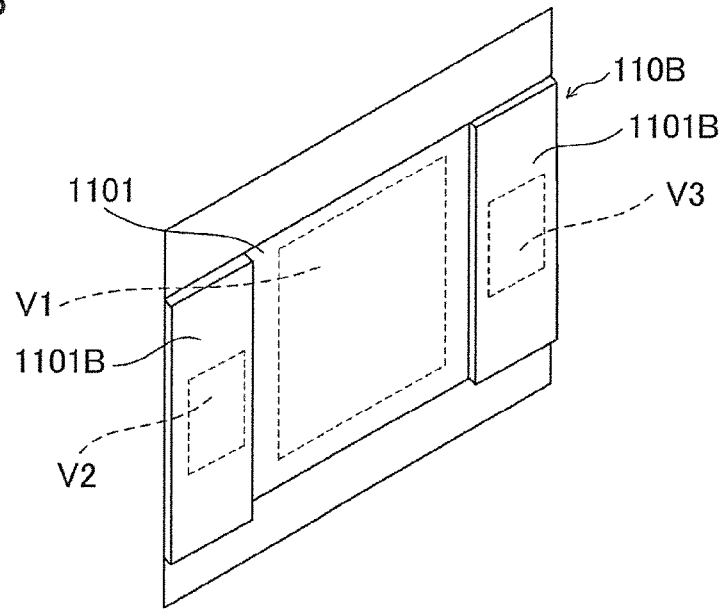
FIG. 5B is a perspective view of an exemplary display area of the screen unit.
Figure 5C:
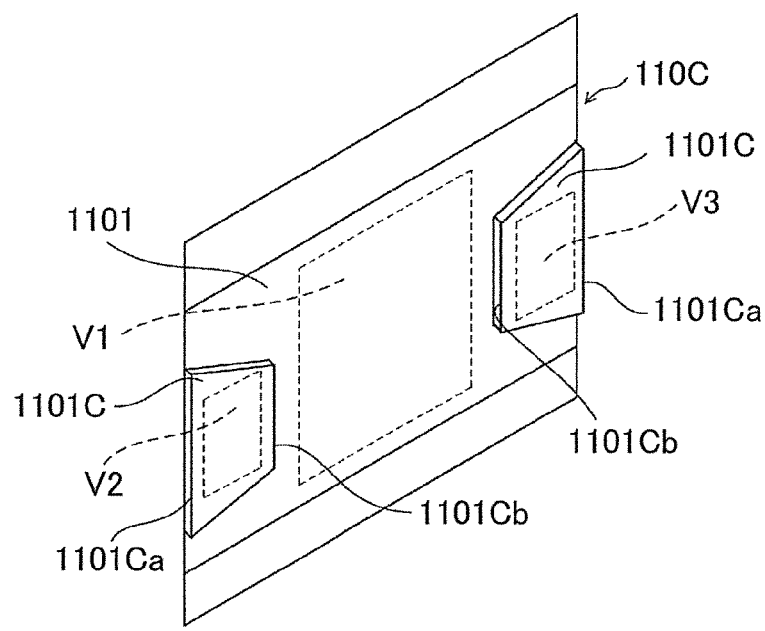
FIG. 5C is a perspective view of an exemplary display area of the screen unit.

FIG. 4A to FIG. 4C respectively show the replaceable screen units 11A to 11C. FIG. 5A to FIG. 5C respectively show display areas on the screens of the screen units 11A to 11C. Note that same or similar elements of the screen units 11A to 11C are given the same reference numerals. Although not illustrated, the casing 10 is commonly used for the screen units 11A to 11C.

The screen unit 11A shown in FIG. 4A is the same as the screen unit shown in FIG. 1 to FIG. 3. In the screen unit 11A, the entire front surface of the screen 110A is structured as a uniformly flat display surface 1101. As shown in FIG. 5A, a projection image V1 is projected on a central portion of the display surface 1101, a projection image V2 is projected on a left end portion of the display surface 1101, and a projection image V3 is projected on a right end portion of the display surface 1101. The left and right herein are the left and right of a viewer who sees the display surface 1101 in front thereof. As described above, the incident surface 1100 of the screen 110A, which is on the back side, is uniformly flat.

As exemplarily shown in FIG. 6, a chart image is displayed as the projection image V1 on the screen 110A. The chart image is a line-graph showing the credit amount having been obtained by the user from the start of the game. A text image is displayed as the projection image V2. The text image shows the number of plays of a bonus game and the total number of game plays executed today.

Another text image is displayed as the projection image V3. The text image shows historical data, such as the number of plays of the bonus game and the total number of game plays executed in the past. The surface which light enters is the incident surface 1100. The surface on which light is projected (display surface) is not limited to the above display surface 1101. That is, the display surface may include an area on the back surfaces of the LED substrates 111, areas above and below the incident surface 1100 (e.g., the front surface portion 11a), and the left and right areas (the side portions 11b and 11c).

Thus, the surface on which light is projected may be located inside the screen unit, as long as the surface is located frontward of the projector main body 12 or frontward of the reflector 13 and onto which a projection image is able to be projected.

In the screen unit 11B shown in FIG. 4B, a central portion of the front surface of the screen 110A is structured as the uniformly flat display surface 1101. Hereinafter, the central display surface of the screen 110B is referred to as a "first display surface 1101". Second display surfaces 1101B are respectively provided at left and right end portions of the screen 110B, on the front side of the screen 110B.

Each second surface 1101B is positioned frontward of the first display surface 1101. That is, each second display surface 1101B is a surface of a panel having a thickness. The difference in the position in the front-back direction made by the thickness defines each second display surface 1101B as a rectangular area. No light exit surface is provided on the screen unit 11B of the present embodiment. Instead, the left and right second display surfaces 1101B extend to the positions close to the left and right ends of the screen unit 11B, respectively.

As shown in FIG. 5B, the projection image V1 is projected on the first display surface 1101, the projection image V2 is projected on the left second display surface 1101B, and the projection image V3 is projected on the right second display surface 1101B. The left and right herein are the left and right of a viewer who sees the screen 110B in front thereof.

The contents of the projection images V1 to V3 are basically similar to those shown in FIG. 6. However, the projection image V2 and V3 respectively displayed on the left and right second display surfaces 1101B may contain a message image, in addition to the text image. The message image will be described later.

Although not illustrated, an incident surface is formed on the back side of the screen 110B, so as to correspond to the first display surface 1101 and the second display surfaces 1101B. To the incident surface, light projected from the projector main body 12 enters. The incident surface of the screen 110B is also uniformly flat.

In the screen unit 11C shown in FIG. 4C, a central portion of the front surface of the screen 110C is structured as the uniformly flat display surface 1101. Hereinafter, the central display surface of the screen 110C is referred to as a "first display surface 1101". Second display surfaces 1101C are respectively provided at left and right end portions of the screen 110C, on the front side of the screen 110C.

Each second surface 1101C is positioned frontward of the first display surface 1101. That is, each second display surface 1101C is a surface of a panel having a thickness. The difference in the position in the front-back direction made by the thickness defines each second display surface 1101C as a trapezoidal area. A longer side portion 1101Ca of each trapezoidal second display surface 1101C is located closer to the left or right end portion of the screen 110C. A shorter side portion 1101Cb of each trapezoidal second display surface 1101C is located closer to the central portion of the screen 110C.

Figure 11:
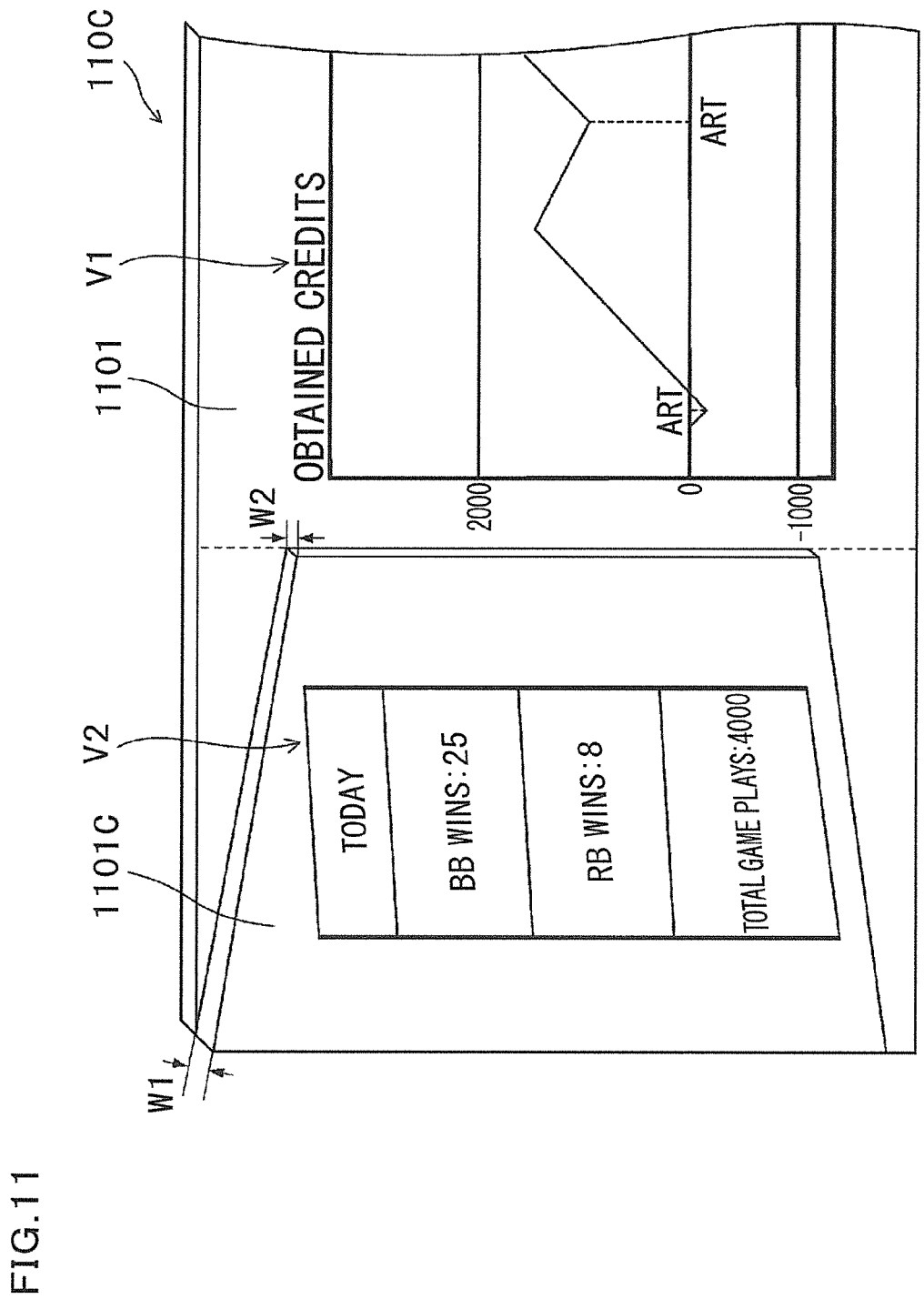
FIG. 11 is an explanatory diagram for explaining a third display example displayed on the display device of First Embodiment.

In the present embodiment, as shown in FIG. 11, a thickness W1 of each panel at the longer side portion 1101Ca is larger than a thickness W2 of the panel at the shorter side portion 1101Cb. The thickness of each panel gradually increases from its shorter side portion 1101Cb to the longer side portion 1101Ca. No light exit surface is provided to the screen unit 11C. The second display surfaces 1101C at the left and right end portions are large enough.

As shown in FIG. 5C, the projection image V1 is projected on the first display surface 1101, the projection image V2 is projected on the left second display surface 1101C, and the projection image V3 is projected on the right second display surface 1101C. The left and right herein are the left and right of a viewer who sees the screen 110C in front thereof. The contents of the projection images V1 to V3 are basically similar to those shown in FIG. 6. Although not illustrated, an incident surface is formed on the back side of the screen 110C, so as to correspond to the first display surface 1101 and the second display surfaces 1101C. To the incident surface, light projected from the projector main body 12 enters. The incident surface of the screen 110C is also uniformly flat.

[How Image is Displayed on Screen and Seen]

The following will describe how an image is displayed on the screen (110A to 110C) and seen, with reference to FIG. 7 to FIG. 11.

Figure 7:
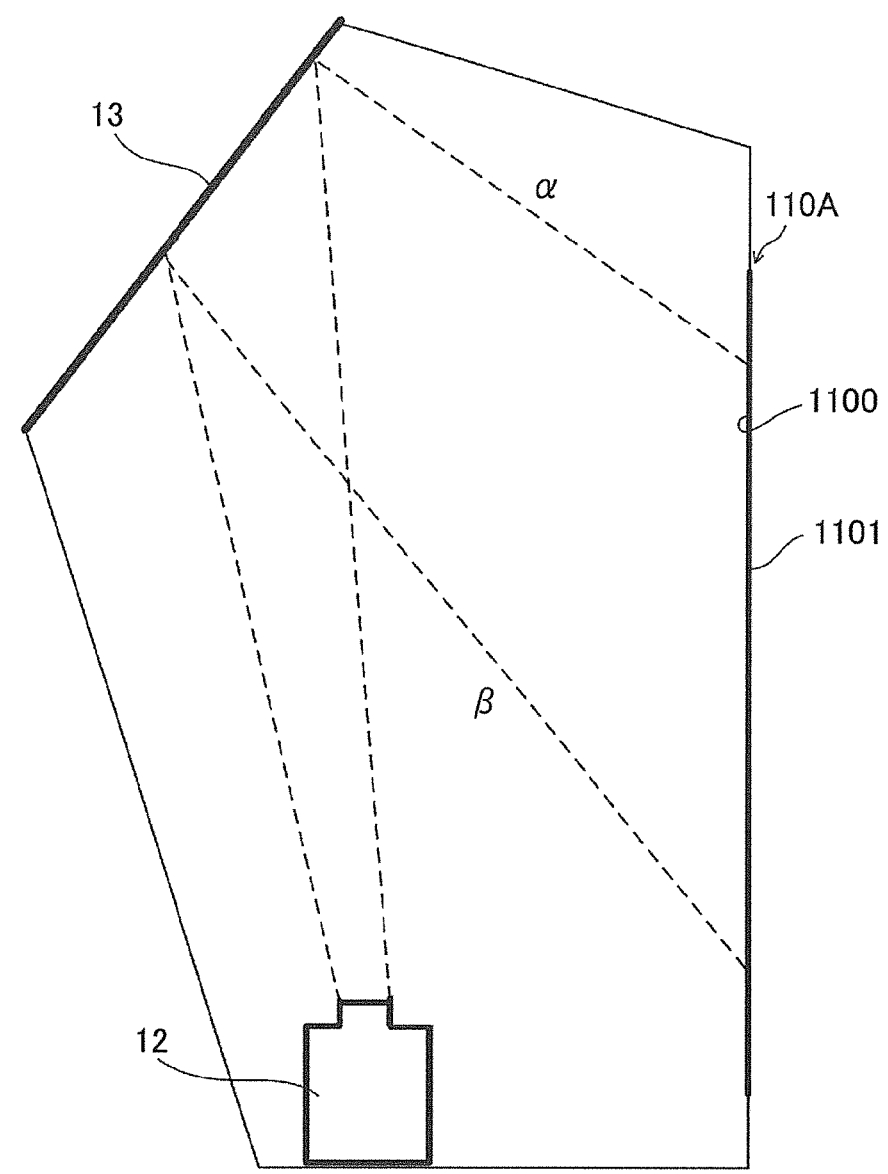
FIG. 7 is an explanatory diagram for explaining how an image is displayed by the display device of First Embodiment.

First, a description is given for the screen 110A. As shown in FIG. 7, a light beam α projected by the projector main body 12 is reflected by the reflector 13, and passes through the incident surface 1100 of the screen 110A, to reach an upper end portion of the display surface 1101. A light beam β projected by the projector main body 12 is reflected by the reflector 13, and then passes through the incident surface 1100 of the screen 110A, to reach a lower end portion of the display surface 1101.

Figure 9:
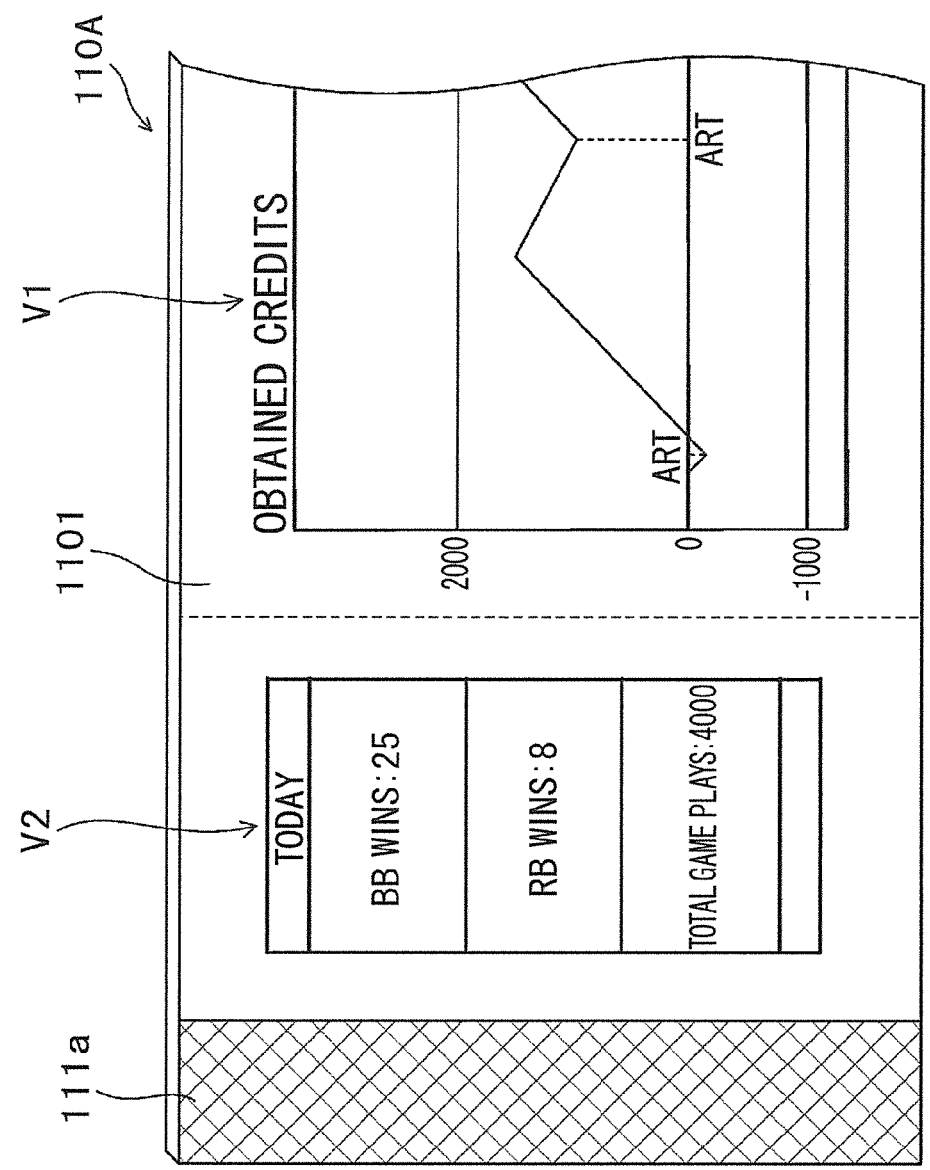
FIG. 9 is an explanatory diagram for explaining a first display example displayed on the display device of First Embodiment.

As a result, the projection images V1 to V3 showing various types of game information are displayed between the upper end portion and the lower end portion of the display surface 1101. FIG. 9 shows a part of the screen 110A showing the images, but the projection image V3 is not shown in this figure. Through the light exit surfaces 111a, lighting up and blinking of the LEDs can be seen. The light exit surfaces 111a are respectively located leftward and rightward of the left and right projection images V2 and V3. Turning on and blinking of the LEDs are performed in accordance with the game status or the like. Note that the right light exit surface 111a is not illustrated.

Figure 8:
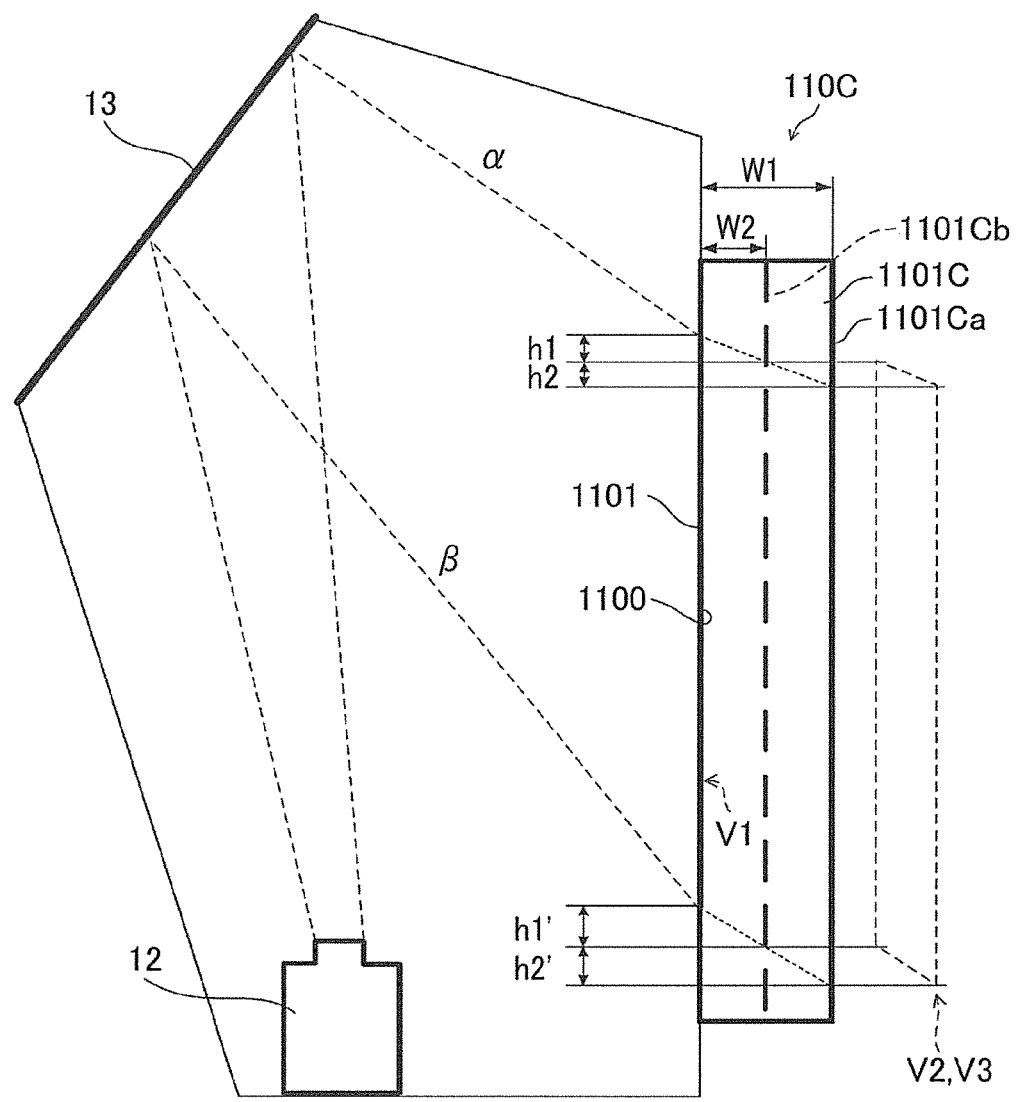
FIG. 8 is an explanatory diagram for explaining the difference in display manners of the display device of First Embodiment.

A description is now given for the screen 110C. As shown in FIG. 8, a light beam α projected by the projector main body 12 is reflected by the reflector 13, and then passes through the incident surface 1100 of the screen 110C, to reach an upper end portion of the first display surface 1101. A light beam β projected by the projector main body 12 is reflected by the reflector 13, and then passes through the incident surface 1100 of the screen 110C, to reach a lower end portion of the first display surface 1101. Then, as shown in FIG. 11, the projection image V1 is displayed on the first display surface 1101 substantially similarly to the case shown in FIG. 9.

Meanwhile, in the vicinity of the shorter side portion 1101Cb of each second display surface 1101 located frontward by the predetermined thickness W2, the light beams α and β having entered the incident surface 1100 are refracted, and then reach the positions on the second display surface, which positions are lower than their positions on the incident surface by h1 and h1', respectively. Further, in the vicinity of the longer side portion 1101Ca of each second display surface 1101 located frontward by the predetermined thickness W1 larger than the thickness W2, the light beams α and β are refracted, and then reach the positions on the second display surface, which positions are lower than their positions on the entrance surface by h2 and h2', respectively.

Thus, as shown in FIG. 11, each second display surface 1101C displays the projection image V2, V3 deformed into a parallelogram shape, differently from the case shown in FIG. 9. Specifically, the projection image is inclined downward toward its left or right outer end. Note that the projection image V3 is not illustrated.

Figure 10:
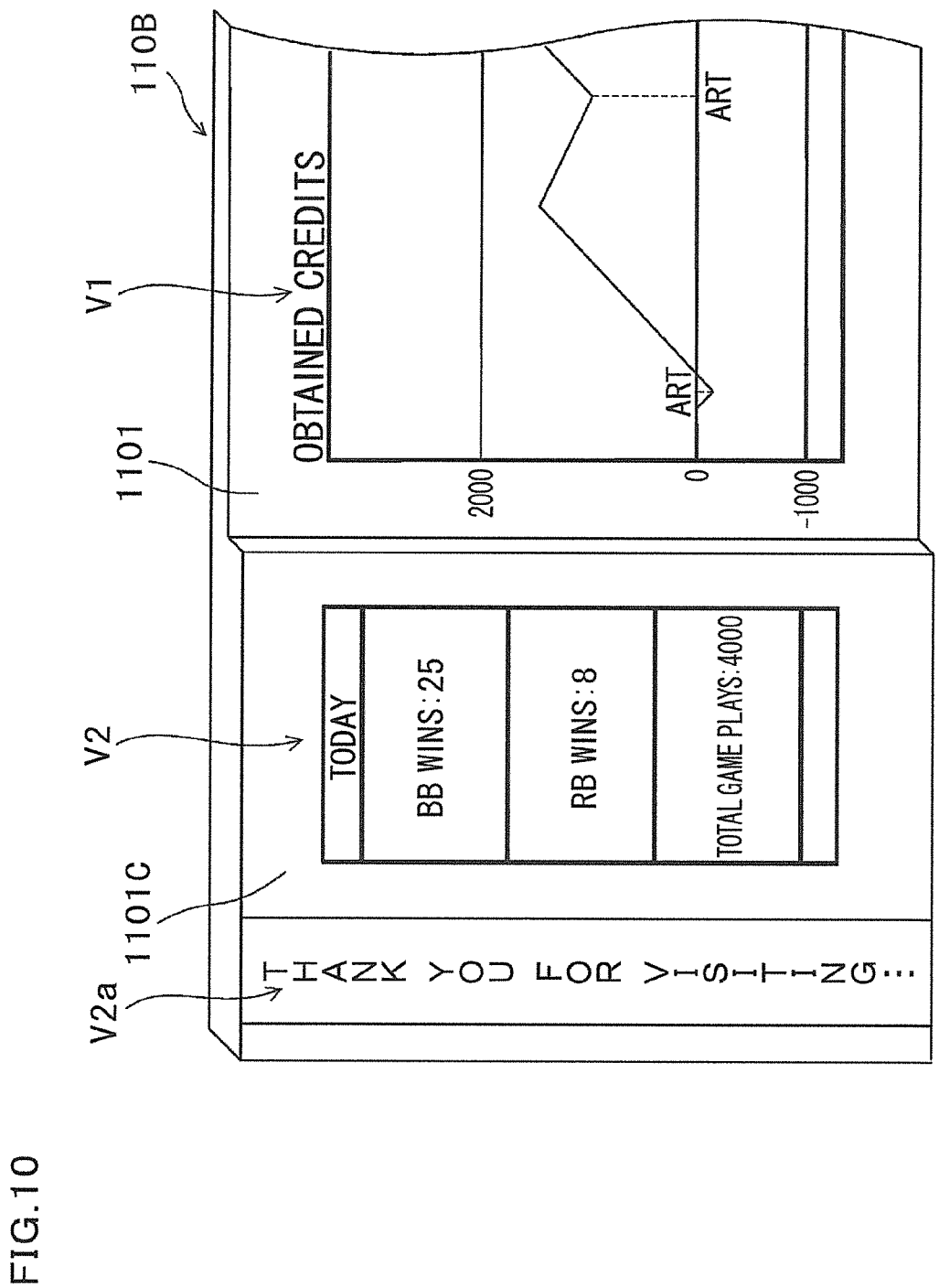
FIG. 10 is an explanatory diagram for explaining a second display example displayed on the display device of First Embodiment.

As shown in FIG. 10, the screen 110B displays images on the same principle. While the first display surface 1101 displays the projection image V1 substantially similarly to the case shown in FIG. 9, each second display surface 1101B displays the projection image V2, V3 so that the projection image is inclined downward toward its left or right outer end, as compared to the case shown in FIG. 9. Note that the projection image V3 is not illustrated. On the second display surfaces 1101B of the screen 110B, a message image is displayed as a projection image V2a. It is possible to replace the portions of the screen 110B where the projection image V2a is displayed with the light exit surfaces 111a.

By replacing the screen unit 11A with the screen unit 11B, the decoration part of the screen unit is changed from the light exit surfaces 111a to the display portions for the projection image V2a. By replacing the screen unit 11B with the screen unit 11A, the decoration part is changed from the display portions for the projection image V2a to the light exit surfaces 111a.

In short, in the display device 1 of First Embodiment, the projection distance from the projector main body 12 to the incident surface 1100 of the screen (110A to 110C) is the same whichever of the screen units 11A to 11C is used. A change in visual effects of the projection images V1 to V3 is caused only by the thickness and position of the screens 110A to 110C. Because of this, the function of adjusting or correcting the projection image in accordance with the projection distance is able to be minimized to be simple, or omitted. This improves the compatibility among the screen units 11A to 11C.

In this display device 1, the screen (110A to 110C) is replaceable together with the screen unit (11A to 11C). This makes it possible to change the visual impressions given by the projection images V2 and V3 on the display surfaces 1101, 1101B, and 1101C. Therefore, the display manner of the screen is freely changeable merely by replacing the screens (110A to 110C) in accordance with the layout of a casino or the design of the gaming machine, for example. Thus, the designability and the diversity of the display manner are enhanced.

In the display device 1 provided with the screen 110A shown in FIG. 9, it is possible to associate the light emission mode of the light exit surfaces 111a with the projection image V1 displayed on the display surface 1101, and it is possible to present the display and light emission in patterns similar to each other. Further, on the light exit surfaces 111a, lighting display is possible in a totally different manner from the display of the projection image. This further enhances the designability and the diversity of the display manner.

In the present embodiment, the distance from the projector main body 12 to the incident surface 1100 is the same whichever of the screens 110A to 110C is used. However, the present invention is not limited to this. For example, the incident surface may be arranged to have a non-planar shape so that the distance is partially different among the screens. That is, there is at least a portion common among the screens with respect to the distance to the incident surface, the length of the light path from the projector main body to the common portion is the same among the screens. Therefore, merely by changing the thickness of the common portion, a change is brought to a projection image, to easily enhance the visual effects.

In the display device 1 with the replaceable screens 110A to 110C shown in FIG. 9 to FIG. 11, all the incident surfaces 1100 of the screens 110A to 110C are uniformly flat. Therefore, the distance from the projector main body 12 to the incident surface 1100 is the same among the screens 110A to 110C. This enables the optical system (e.g., the reflector 13) structuring the light path from the projector main body 12 to the incident surface 1100 to have a simple structure. Meanwhile, merely by making a difference in the thickness of the member for the first display surface 1101 and the thickness of the members for the second display surfaces 1101B and 1101C, visual impressions given by the projection images V2 and V3 are changed, thereby to easily enhance the visual effects.

Further, as shown in FIG. 9 to FIG. 11, in the display device 1, merely by replacing the screen (110A to 110C) to be disposed at the opening 10A of the casing 10, the visual impressions given by the projection images V2 and V3 on the display surface (1101, 1101B, 1101C) are changed. Thus, the display manner of the screen is freely changeable, and the designability and the diversity of the display manner are enhanced.

Second Embodiment

Figure 12:
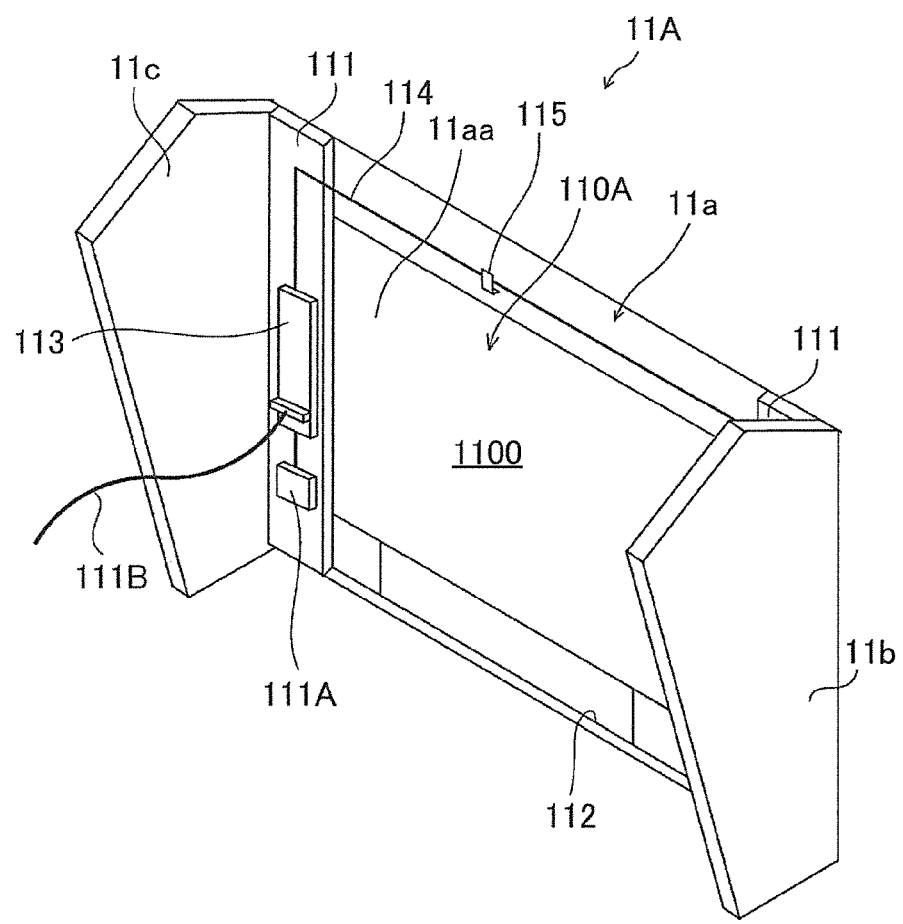
FIG. 12 is a perspective view of the screen unit of the display device of Second Embodiment, viewed from the back.

The following will describe the screen unit in Second Embodiment of the present invention, with reference to FIG. 12. Note that elements which are the same as or similar to those in the above-described First Embodiment are given the same reference numerals, and descriptions thereof are omitted.

In the screen unit 11A shown in FIG. 12, the LED substrate 111 is provided behind each light exit surface 111a. On one of the LED substrates 111, which is at the left when viewed from the back, a relay substrate 113 is provided. The relay substrate 113 is directly connected to the left LED substrate 111, and is connected to the other LED substrate 111 via a connection line 114.

The relay substrate 113 is connected to the control unit in the casing 10 via a cable 111B through a so-called board to board connection. The connection line 114 extends from the relay substrate 113, detours around the opening 11aa, to be connected to the other LED substrate 111. The connection line 114 is laid using a guide component 115 to prevent the connection line 114 from sagging toward the incident surface 1100. The relay substrate 113 may be connected with the cable 111B via a connector 111A.

A signal from the control unit is supplied to the one LED substrate 111 via the cable 111B and the relay substrate 113, and supplied to the other LED substrate 111 via the relay substrate 113 and the connection line 114. This causes the LEDs on both the LED substrates 111 to be turned on or blink. Light emitted from the LEDs is applied frontward through the light exit surfaces 111a.

In this arrangement, the two LED substrates 111 are connected to the control unit via the single connection cable 111B. This simplifies the work of connection needed when replacing the screen unit 11A with another one.

Third Embodiment

Figure 13:
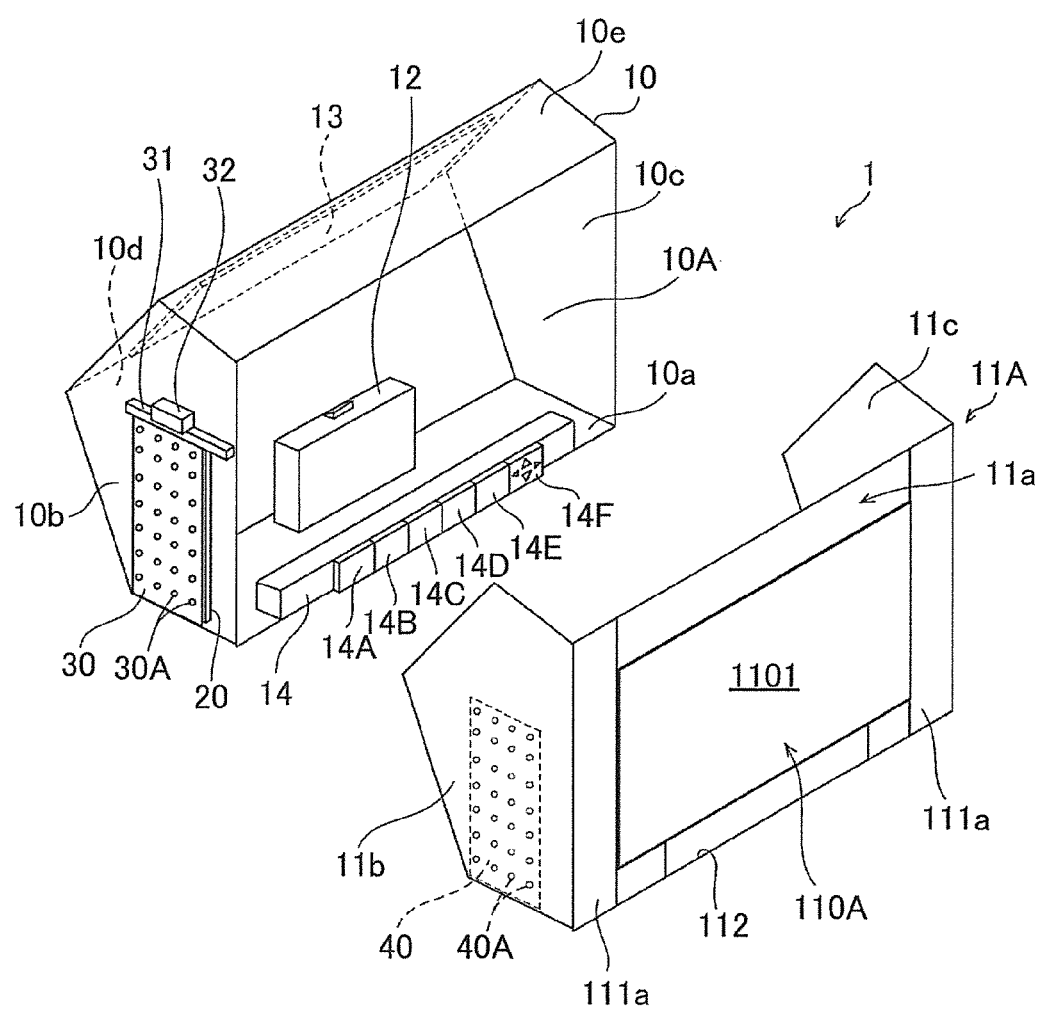
FIG. 13 is an exploded perspective view of the display device of Third Embodiment.
Figure 14:
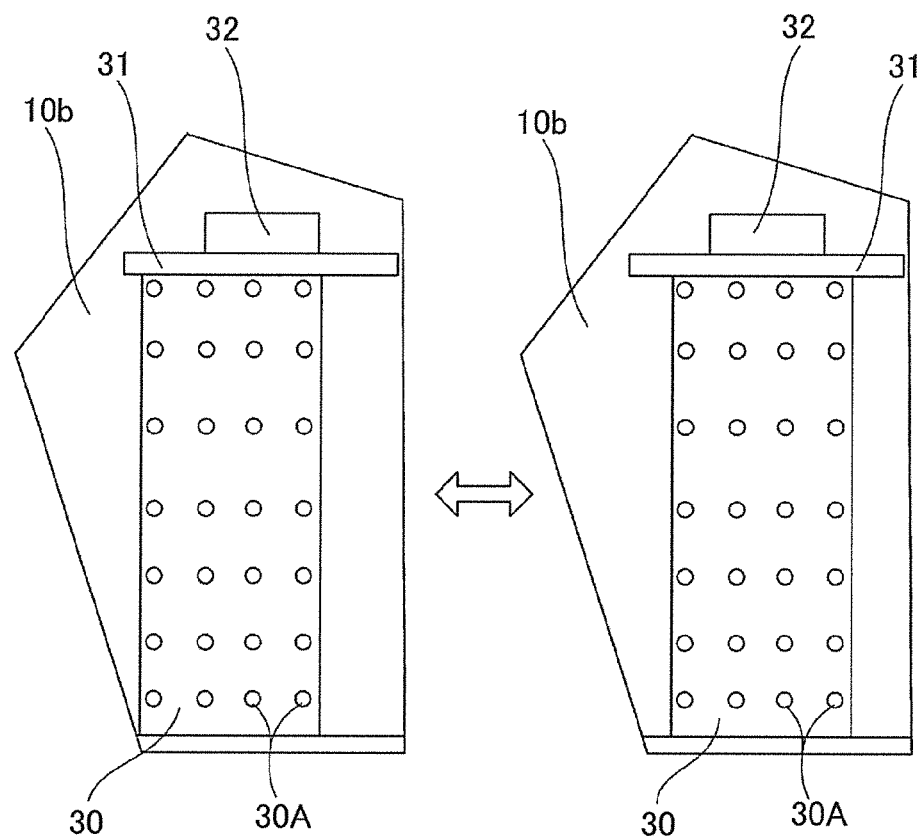
FIG. 14 is an explanatory diagram illustrating the operation of a movable decoration sheet of the display device of Third Embodiment.

The following will describe the display device of Third Embodiment of the present invention, with reference to FIG. 13 to FIG. 15. Note that elements which are the same as or similar to those in the above-described First Embodiment are given the same reference numerals, and descriptions thereof are omitted.

As shown in FIG. 13 and FIG. 14, an LED substrate 20 is provided on a side surface 10b of the casing 10. A movable decoration sheet 30 is provided to be opposed to the LED substrate 20. A guide component 31 and a driving mechanism 32 are provided on an upper portion of the side surface 10b. The guide component 31 supports the upper end of the movable decoration sheet 30 so that the movable decoration sheet 30 is able to be guided in the front-back direction. The driving mechanism 32 is configured to move the movable decoration sheet 30 in the front-back direction.

The driving mechanism 32 is connected to the control unit provided in the casing 10. The control unit controls the operation of the driving mechanism 32. Although not illustrated, such an LED substrate 20, movable decoration sheet 30, guide component 31, and driving mechanism 32 are provided also on the side surface 10c of the casing 10.

Side portions 11b and 11c of the screen unit 11A are respectively opposed to the above-described side surfaces 10b and 10c. At least a part of each side portion 11b, 11c that is opposed to the corresponding LED substrate 20 is made of a light-transmitting material, preferably a transparent material. A fixed decoration sheet 40 is attached to the inner surface of the side portion 11b.

Although not illustrated, such a fixed decoration sheet 40 is attached also to the inner surface of the side portion 11c. There has been described that the part of the side portion that is opposed to the LED substrate 20 is made of a light-transmitting material. However, such a light-transmitting part of the side portion 11b or 11c does not have to be provided, as long as the side portion 11b or 11c has at least a portion to which light from the LEDs provided on the LED substrate 20 is applied. Suppose that the light exit surface 111a has light-transmitting property while the side portion 11b does not have light-transmitting property. In this case, high-contrast is provided on the light exit surface 111a by light emitted from the LEDs and guided toward the front.

Each movable decoration sheet 30 is a light-transmitting resin sheet of a flat rectangular shape. The movable decoration sheet 30 has a plurality of light-guiding holes 30A corresponding to the LEDs 20A (see FIG. 14) on the LED substrate 20. Each hole 30A opens so that the corresponding LED 20A is at least exposable through this hole 30A. The diameter of each light-guiding hole 30A is on the order of 1 mm, for example. The positional distribution of the light-guiding holes 30A matches the positional distribution of the LEDs 20A.

As shown in FIG. 14, the movable decoration sheet 30 is movable in the front-back direction along the guide component 31, driven by the driving mechanism 32. Thus, each light-guiding hole 30A is capable of entering the state where light from the corresponding LED 20A is directly guided outward through the hole 30A, and the state where light from the corresponding LED 20A is not directly guided to the outside due to misalignment (see FIG. 15A and FIG. 15B).

Similarly to the movable decoration sheet 30, each fixed decoration sheet 40 is a light-transmitting resin sheet of a flat rectangular shape. On a surface of the fixed decoration sheet 40, characters, pictures and/or the like are printed. The fixed decoration sheet 40 also has a plurality of light-guiding holes 40A. The aperture area of each light-guiding hole 40A is substantially equal to that of the light-guiding hole 30A. The diameter of each light-guiding hole 40A is on the order of 1 mm, for example, similarly to the light-guiding holes 30A.

The positional distribution of the light-guiding holes 40A matches the positional distribution of the light-guiding holes 30A. That is, the positional distribution of the light-guiding holes 40A of the fixed decoration sheet 40 matches the positional distribution of the LEDs 20A. The fixed decoration sheet 40 is attached so that the light-guiding holes 40A are respectively opposed to the LEDs 20A.

Figure 15A:
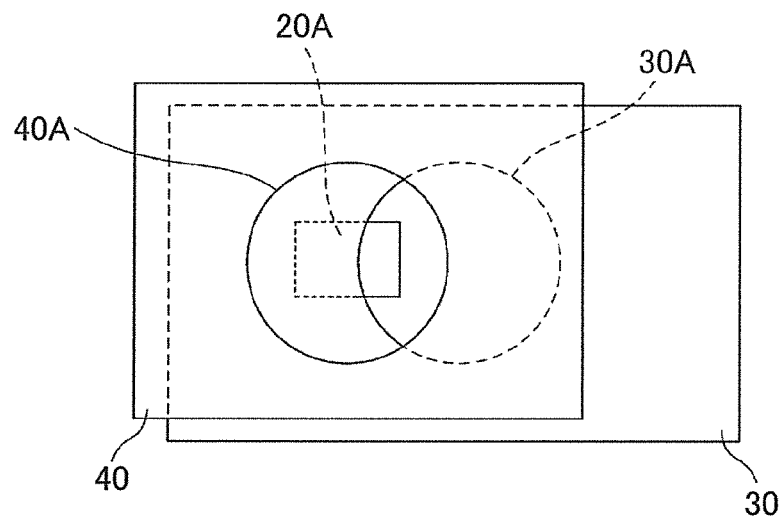
FIG. 15A is an explanatory diagram for explaining the difference in brightness caused by a change in the positional relationship between the movable decoration sheet and a fixed decoration sheet of the display device of Third Embodiment.
Figure 15B:
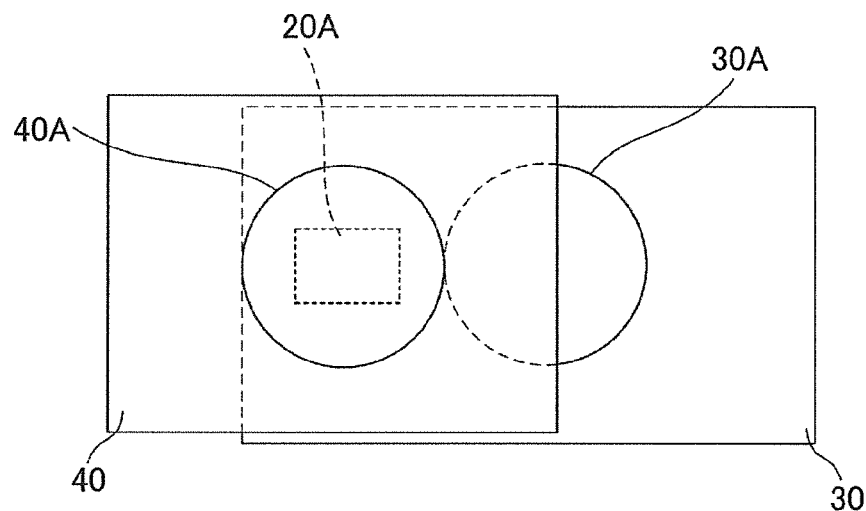
FIG. 15B is an explanatory diagram for explaining the difference in brightness caused by a change in the positional relationship between the movable decoration sheet and the fixed decoration sheet of the display device of Third Embodiment.

Thus, as the movable decoration sheet 30 moves in the front-back direction, the state of each light-guiding hole 40A changes between the state where light from the corresponding LED 20A is directly guided outward through the light-guiding hole 40A overlapping the corresponding hole 30A, and the state where light from the LED 20A is not directly guided to the outside due to the misalignment between the holes 40A and 30A (see FIG. 15A and FIG. 15B).

In this embodiment, the positional distribution of the light-guiding holes 40A matches the positional distribution of the light-guiding holes 30A. However, the present invention is not limited to this. It is only required that at least one light-guiding hole 40A is able to be aligned with the corresponding light-guiding holes 30A. The expression "a hole is able to be aligned with the corresponding hole" means that the holes are positioned at least so that light from the LED is able to pass through the light-guiding holes to the outside. The positions of the holes are not limited to specific positions.

As shown in FIG. 15A, when the movable decoration sheet 30 is positioned so that at least a part of each LED 20A overlaps the corresponding light-guiding hole 30A, the light-guiding hole 30A at least partially overlaps the corresponding light-guiding hole 40A of the fixed decoration sheet 40. In this case, light from the LED 20A is directly guided outward through the portions of the light-guiding holes 30A and 40A overlap each other. With this, on the side surfaces 10b and 10c of the casing 10, the characters and/or the pictures illustrated on the fixed decoration sheet 40 are visible with relatively high intention of illumination and in relatively high contrast.

Meanwhile, when the movable decoration sheet 30 is positioned so that each light-guiding hole 30A does not overlap the corresponding light-guiding hole 40A and is not aligned with the corresponding LED 20A, as shown in FIG. 15B, light from the LED 20A cannot go to the outside through the light-guiding holes 30A and 40A. As a result, on the side surfaces 10b and 10c of the casing 10, the characters and/or the pictures illustrated on the fixed decoration sheet 40 are visible with relatively low intention of illumination and in relatively low contrast.

In the display device 1 of Third Embodiment, as the movable decoration sheet 30 moves from the position where the light-guiding holes 30A and 40A overlap each other to the position where the light-guiding holes 30A and 40A do not overlap each other, the overlapping portion where each hole 30A overlaps the corresponding hole 40A gradually decreases, which decreases the amount of light guided from the corresponding LED 20A to the side surface 10b, 10c through the light-guiding holes 30A and 40A.

That is, by moving the movable decoration sheet 30 relative to the fixed decoration sheet 40 by a predetermined distance which is equal to or longer than the diameter of each light-guiding hole 30A, 40A, the intensity of illumination changes depending on the size of the overlapping portion. Thus, the contrast of the image(s) shown through the decoration sheets 30 and 40 opposed to each other is easily changeable by adjusting the intensity of illumination. As a result, the visual effects are easily enhanced.

Further, in the display device 1 of Third Embodiment, the LED substrates 20 and the driving mechanisms 32 are provided on the casing 10. As compared to the device of Fourth Embodiment which will be described later, weight reduction and simplification of the screen unit 11A is possible. In addition, wiring work is unnecessary.

Fourth Embodiment

Figure 16:
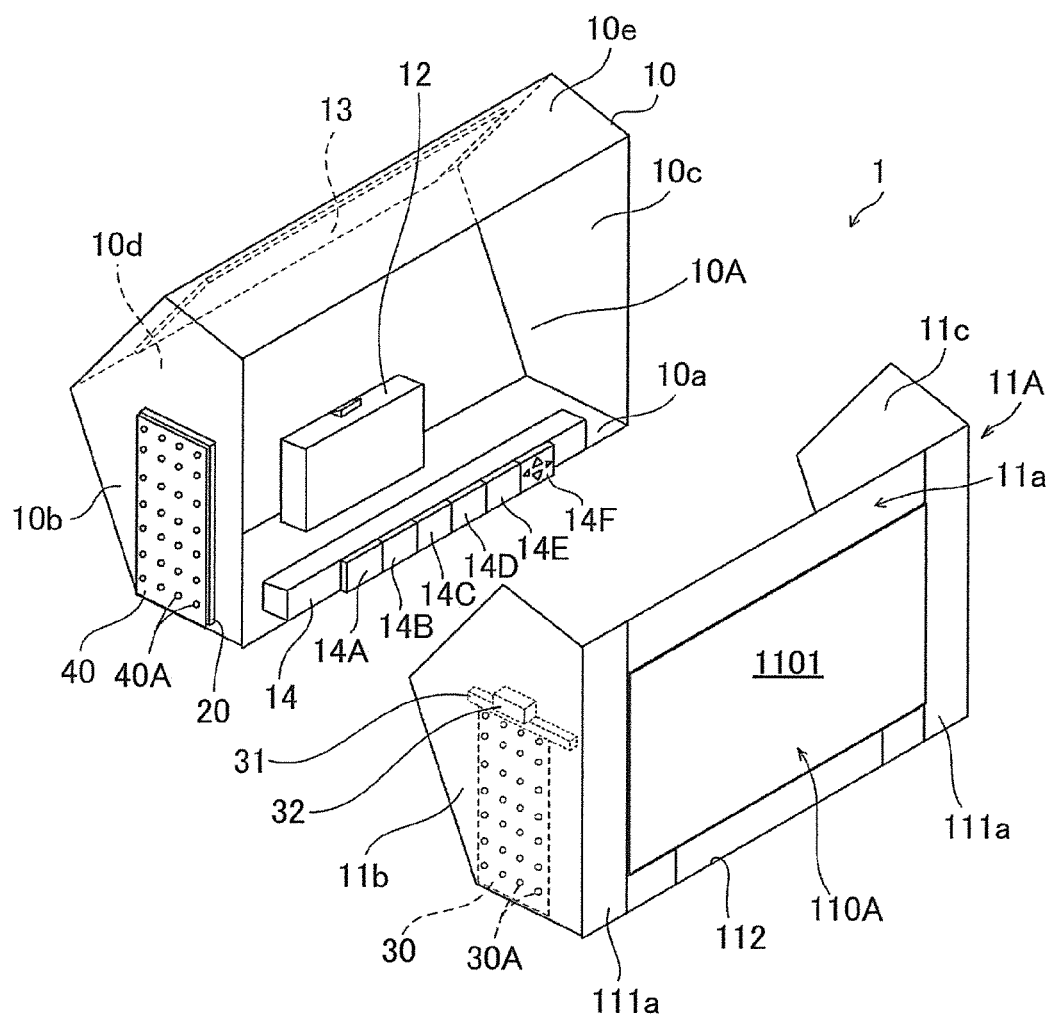
FIG. 16 is an exploded perspective view of the display device of Fourth Embodiment.

The following will describe the display device of Fourth Embodiment of the present invention, with reference to FIG. 16. The display device 1 of Fourth Embodiment is different from that of Third Embodiment only in the positional relationship between each movable decoration sheets 30 and the corresponding fixed decoration sheet 40. Therefore, elements which are the same as or similar to those in the above-described Third Embodiment are given the same reference numerals, and descriptions thereof are omitted.

As shown in FIG. 16, in the display device 1 of Fourth Embodiment, the fixed decoration sheet 40 is disposed to be opposed to the LED substrate 20 provided on the side surface 10b of the casing 10. Meanwhile, the movable decoration sheet 30 is provided on the side portion 11b of the screen unit 11A so that the movable decoration sheet 30 can be opposed to the fixed decoration sheet 40.

The guide component 31 and the driving mechanism 32 are provided on an upper portion of the side portion 11b. The guide component 31 supports the upper end of the movable decoration sheet 30 so that the movable decoration sheet 30 is able to be guided in the front-back direction. The driving mechanism 32 is configured to move the movable decoration sheet 30 in the front-back direction. The driving mechanism 32 is connected, through an unillustrated cable, to the control unit provided in the casing 10. The control unit controls the operation of the driving mechanism 32. Although not illustrated, such an LED substrate 20 and fixed decoration sheet 40 are provided also on the side surface 10c of the casing 10. Such a movable decoration sheet 30, guide component 31, and driving mechanism 32 are provided also on the side portion 11c of the screen unit 11A.

The fixed decoration sheet 40 is fixed so that the positional distribution of the light-guiding holes 40A matches the positional distribution of the LEDs 20A. Meanwhile, characters and/or pictures are printed on a surface of each movable decoration sheet 30. The movable decoration sheet 30 is movable along the guide component 31 by the driving mechanism 32 in the front-back direction. As the movable decoration sheet 30 moves, the state of each light-guiding hole 30A changes between the state where light from the corresponding LED 20A is directly guided outward through the light-guiding holes 30A and 40A overlapping each other, and the state where light from the LED 20A is not directly guided outward due to the misalignment between the holes 40A and 30A.

That is, in the display device 1 of Fourth Embodiment, as the movable decoration sheet 30 moves from the position where the light-guiding holes 30A and 40A overlap each other to the position where the light-guiding holes 30A and 40A do not overlap each other, the overlapping portion where each hole 30A overlaps the corresponding hole 40A gradually decreases, which decreases the amount of light guided from the corresponding LED 20A to the side surface 10b, 10c through the light-guiding holes 30A and 40A.

Thus, by moving the movable decoration sheet 30 relative to the fixed decoration sheet 40 by a predetermined distance which is equal to or longer than the diameter of each light-guiding hole 30A, 40A, the intensity of illumination changes depending on the size of the overlapping portion. Thus, the contrast of the image(s) shown through the decoration sheets 30 and 40 opposed to each other is easily changeable by adjusting the intensity of illumination. As a result, the visual effects are easily enhanced.

Fifth Embodiment

The following will describe the display device of Fifth Embodiment of the present invention, with reference to FIG. 17 to FIG. 20. Note that elements which are the same as or similar to those in the above-described embodiments are given the same reference numerals, and descriptions thereof are omitted.

Figure 18:
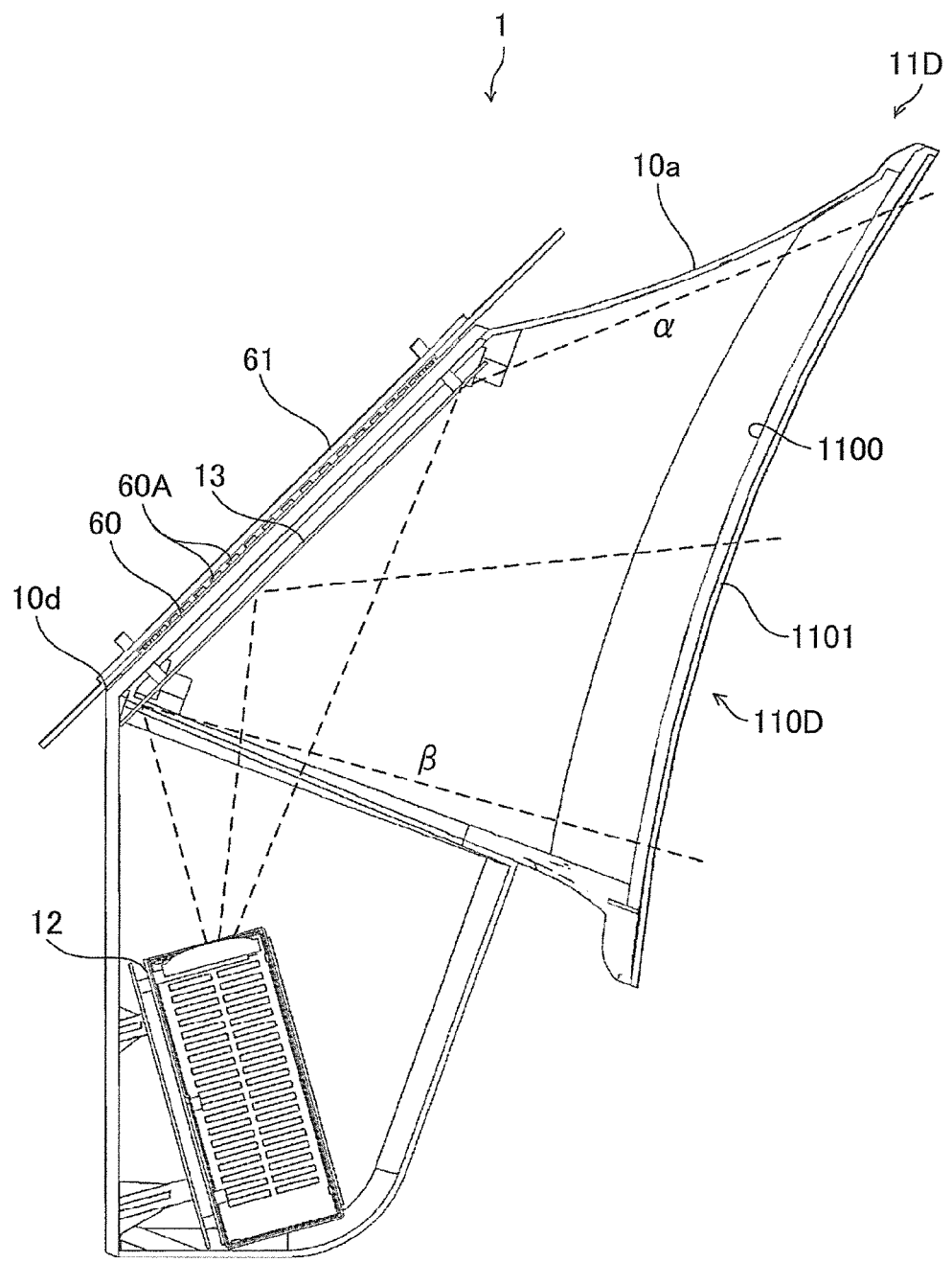
FIG. 18 is a cross section of the display device of Fifth Embodiment.

As shown in FIG. 17 and FIG. 18, in the display device 1 of Fifth Embodiment, the entire front surface of a screen unit 11D is structured by a screen 110D having a concave surface. The entire front surface of the screen 110D is a gently inclined concave display surface 1101. This display device 1 does not have a light exit surface and button.

Further, as shown in FIG. 18, an LED substrate 60 and a reflection plate 61 are provided on the outer side of the rear surface 10d of the casing 10. The rear surface 10d is behind the reflector 13. On the LED substrate 60, a plurality of LEDs 60A are mounted and arranged annularly to be opposed to the rear surface 10d. The LEDs 60A are arranged so that light can be applied to the reflection plate 61. Light from the LEDs 60A is reflected by the reflection plate 61, to illuminate the surrounding of the display device 1 and the peripheral part of the screen 110A.

With this display device 1, a projection image is able to be projected on the entire display surface 1101 of the screen 110D, and functions and effects optically similar to those of the device shown in FIG. 4A are brought about. In addition, decorative effects are enhanced by light emitted from the back by the LEDs 60A.

In Fifth Embodiment, the display surface of the screen 110D has a non-planar shape. Specifically, the screen 110D has a concave shape with inclination. This makes it possible to display a stereoscopic image with depth. This further enhances visual effects and decorative effects.

In the display device 1 of Modification 1 of Fifth Embodiment, the entire front surface of a screen unit 11E is structured by a screen 110E, as shown in FIG. 19. A central portion of the front surface of the screen 110E is a gently-inclined concave first display surface 1101. Right and left end portions of the front surface of the screen 110E are concave second display surfaces 1101E. Each second display surface 1101E is positioned forward of the first display surface 1101. A part of each second display surface 1101E is located outward of the left or right end of the first display surface 1101. The screen 110E of the display device 1 of Modification 1 of Fifth Embodiment is formed by a plurality of projection surface members (the first display surface 1101 and the second display surfaces 1101E) partially overlapping one another. This makes the display surface non-planar.

Each second display surface 1101E is a surface of a projection surface member having a thickness. The difference in the position between the first display surface 1101 and the second display surfaces 1101E in the front-back direction made by the thickness defines each second display surface as a rectangular area. In this display device 1, it is possible to project different projection images respectively on the first display surface 1101 and the second display surfaces 1101E of the screen 110E, and functions and effects optically similar to those of the device shown in FIG. 4B are brought about.

As shown in FIG. 20, the display device 1 of Modification 2 of Fifth Embodiment is structured as follows. A central portion of the front portion of a screen unit 11F is structured by a screen 110F. Left and right end portions of the screen unit 11F are respectively structured by light exit surfaces 111a spaced apart from the screen unit 110F by a predetermined distance. A central portion of the front surface of the screen 110F is a gently-inclined concave first display surface 1101. Right and left end portions of the front surface of the screen 110F are concave second display surfaces 1101F. Each second display surface 1101F is positioned forward of the first display surface 1101. A part of each second display surface 1101F is located outward of the left or right end of the first display surface 1101. As described above, the screen 110F of the display device 1 of Modification 2 of Fifth Embodiment is formed by the plurality of projection surface members (the first display surface 1101 and the second display surfaces 1101F) partially overlapping one another. This makes the display surface non-planar.

Each second display surface 1101F is a surface of a member having a thickness. The difference in the position between the first display surface 1101 and the second display surfaces 1101F in the front-back direction made by the thickness defines each second display surface as a substantially trapezoidal area. The light exit surfaces 111a are respectively positioned behind the portions of the second display surfaces 1101F projecting relative to the left and right ends of the first display surface 1101. In this display device 1, it is possible to project different projection images respectively on the first display surface 1101 and the second display surfaces 1101F of the screen 110F, and functions and effects optically similar to those of the device shown in FIG. 4C are brought about. In addition to the above, turning on and blinking of lights are visible through the light exit surfaces 111a. Thus, it is possible to present a display manner different from any of the display devices described above.

Further, each of the second display surfaces 1101E, 1101F also has a concave shape. This makes it possible to show a stereoscopic image with depth on the second display surfaces, as well as on the first display surface 1101. Note that second display surfaces 1101E and 1101F may be flat. Further, the LED substrate 60 and the reflection plate 61 may be omitted as needed.

Sixth Embodiment

The following will describe the display device of Sixth Embodiment of the present invention, with reference to FIG. 21A to FIG. 23. Note that elements which are the same as or similar to those in the above embodiments are given the same reference numerals, and descriptions thereof are omitted.

The display device of Sixth Embodiment is configured to improve visual effects and decorative characteristics by illuminating an upper edge portion (upper side) of the screen 110A of the screen unit 11A (FIG. 5A) of First Embodiment, for example.

Figure 21A:
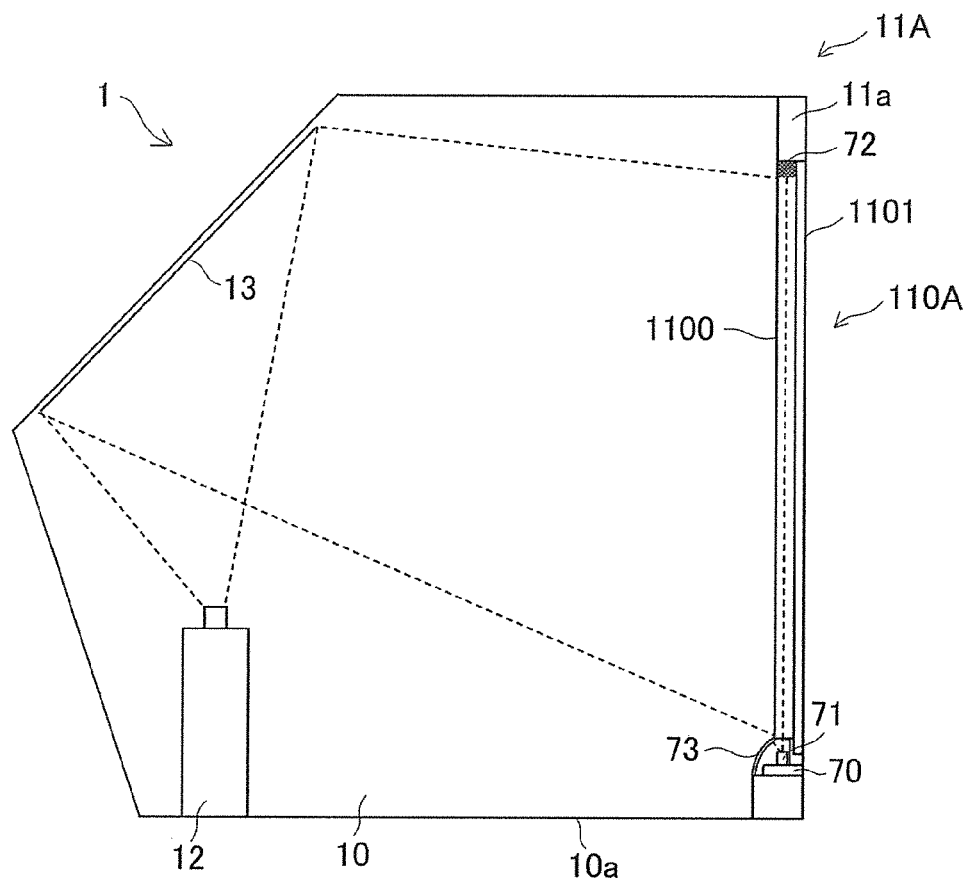
FIG. 21A is a cross section of the display device of Sixth Embodiment.

In the display device 1 of Sixth Embodiment, the rectangular screen 110A includes an incident portion (light guiding portion) 1100 and a display portion 1101, as shown in FIG. 21A. The incident portion has a predetermined thickness and light is transmittable therethrough. The display portion has a predetermined thickness, and a projected image is displayed on a surface thereof. Further, at least one substrate (LED substrate) 70 is provided on the bottom surface 10a of the casing 10 and in the vicinity of a lower edge portion (lower side) of the screen 110A. A diffused reflection portion 72 is provided at the upper edge portion (upper side) of the incident portion (light guiding portion) 1100 of the screen 110A. The upper edge portion is opposed to the lower edge portion (lower side) of the screen 110A. The diffused reflection portion 72 includes projections and recesses to irregularly reflect light.

One or more light emitters (LED) 71 are mounted on the substrate 70. Light emitted from the light emitters 71 passes through the incident portion (light guiding portion) 1100 of the screen 110A to reach the diffused reflection portion 72. Then, light is irregularly reflected by the diffused reflection portion 72.

The diffused reflection portion 72 is provided to extend all over the upper edge portion of the screen 110A. The substrate 70 may be provided to extend all over the lower edge portion of the screen 110A. Alternatively, the substrate 70 may be divided into parts as needed, and the divided parts may be provided apart from each other. The location and the output angle of the one or more light emitters 71 are adjusted as needed, so that light from the light emitters 71 reaches the whole diffused reflection portion 72 uniformly. Thus, the light emitters 71 arranged in the casing 11A and the diffused reflection portion 72 illuminated by the light emitters 71 constitute a light emission unit. The light emission unit is provided so that at least one of edges of the screen 110A is fringed with the light emission unit.

The device of Sixth Embodiment is structured as above. In this embodiment, light from the light emitters 71 passes through the incident portion (light guiding portion) 1100 of the screen 110A, to reach the diffused reflection portion 72. Then, light is irregularly reflected by the diffused reflection portion 72, toward a user. As a result, there is created a band of reflected light which is long in the horizontal direction and with which the upper edge portion of the screen 110A is fringed. In consequence, visual effects and decorative effects are improved. Note that a light-shielding member may be provided between the diffused reflection portion 72 and the casing 10 to prevent the irregularly reflected light from going toward the inside of the casing 10. Such a light-shielding member is not illustrated.

Figure 21B:
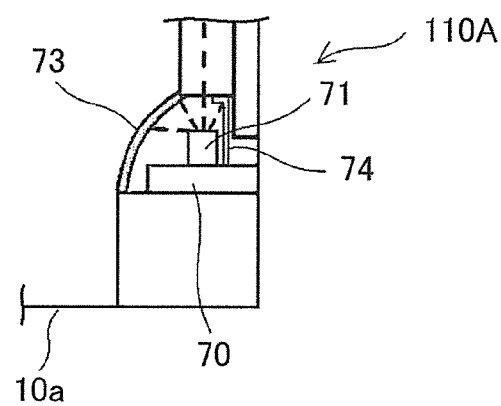
FIG. 21B is an enlarge cross section of a main part of the display device.

As shown in FIG. 21B, light emitted from the light emitters 71 does not wholly go to the diffused reflection portion 72. A part of light leaks through a gap between the substrate 70 and the bottom surface 10a. This reduces the efficiency of light application. Further, there is a possibility that the leakage light is scattered in the casing 10 to reduce the brightness and resolution of images from the projector main body 12.

To deal with this, a light-shielding member 73 is provided at the gap in Sixth Embodiment, to prevent the leakage of light into the casing 10. The light-shielding member 73 is a narrow and long strip-like thin plate. The light-shielding member 73 is secured to the lower edge portion of the screen 110A and to and end portion of the bottom surface 10a. For example, the light-shielding member 73 is attached to these portions via an adhesive. The material for the light-shielding member 73 may be any material such as metal and resin, as long as the material has a light-shielding function. In light of workability, it is desirable to use a flexible material.

Further, as shown in FIG. 21B, a light-shielding member 74 may be provided around the light emitters 71 to prevent light from the light emitters 71 from going to the display portion 1101 of the screen 110A.

Sixth Embodiment deals with the case where the diffused reflection portion 72 is provided at the upper edge portion (upper side) of the incident portion (light guiding portion) 1100 of the screen 110A. The present invention is not limited to this arrangement. The diffused reflection portion 72 may be provided at a portion of the screen unit 11A that is above the screen 110A. Such a modification is not illustrated. As described above, the light-shielding member is provided at an edge portion of the screen 110A. The light-shielding member is configured to shield the display portion of the screen 110A from light traveling from the light emission unit (the light emitters 71 and the diffused reflection portion 72) toward the display portion.

It is a matter of course that the light emitting unit of Sixth Embodiment is applicable to the screen units 11B and 11C described in First Embodiment.

In Sixth Embodiment, light emitted from the light emitters 71 on the substrate 70 provided in the vicinity of the lower edge portion of the screen 110A is reflected to create a band of light with which the upper edge portion of the screen 110A is fringed. This improves the visual effects and decorative characteristics of the display device 1. In addition, the leakage of light from the light emitters 71 to the inside of the casing 10 is prevented. This enhances the efficiency of light application and eliminates the effect on images projected on the screen 110A. The substrate 70 may be provided in the vicinity of the upper edge portion, the left edge portion, and/or the right edge portion of the screen 110A, and the diffused reflection portion 72 may be provided, so as to be opposed thereto, at the lower edge portion, right edge portion, and/or the left edge portion of the incident portion (light guiding portion) 1100. With this, the edge portion(s) (the upper edge portion, the lower edge portion, and/or the left edge portion) of the screen 110A is/are illuminated, as needed.

Figure 22:
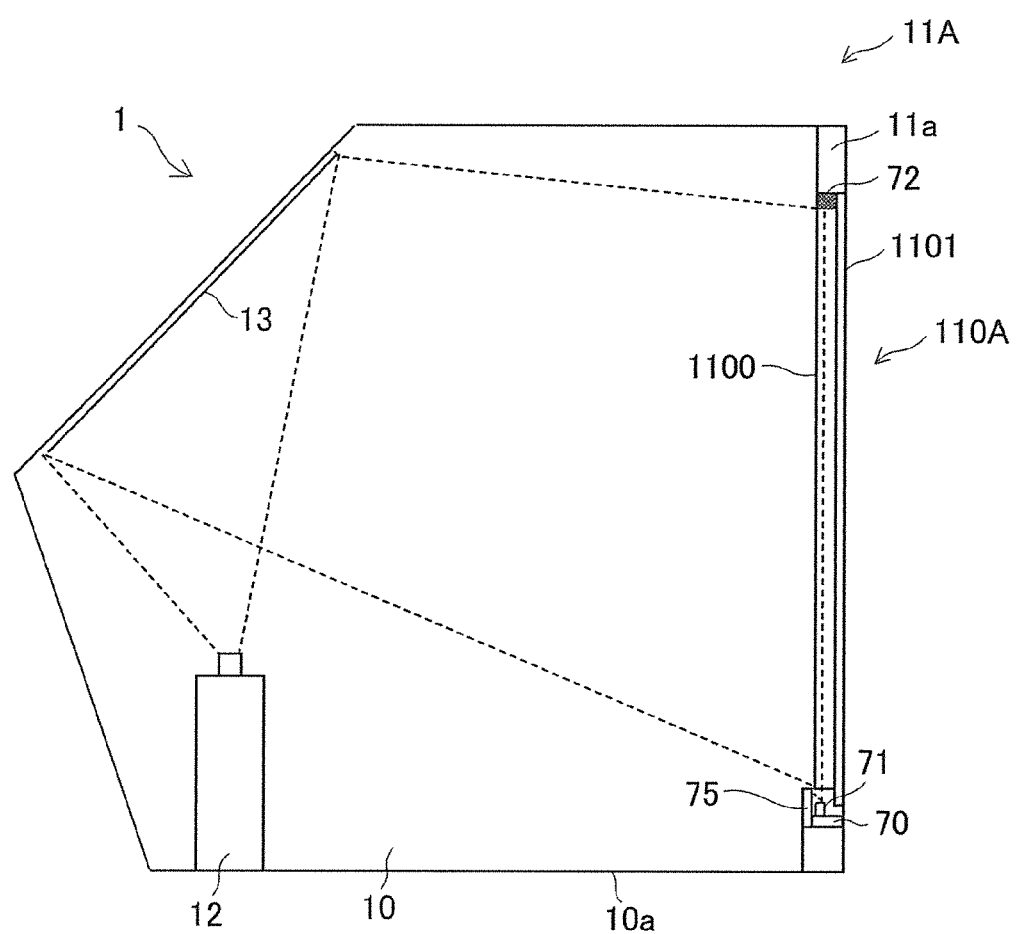
FIG. 22 is a cross section of the display device of Modification 1 of Sixth Embodiment.

(Modification 1) In Modification 1, a light-shielding member (side wall) 75 is provided between the substrate 70 and the casing 10 to prevent the leakage of light into the casing 10, as shown in FIG. 22. The light-shielding member 75 is a thin plate-like member having a predetermined height. In this arrangement, functions and effects similar to those in the above Sixth Embodiment are provided.

Figure 23:
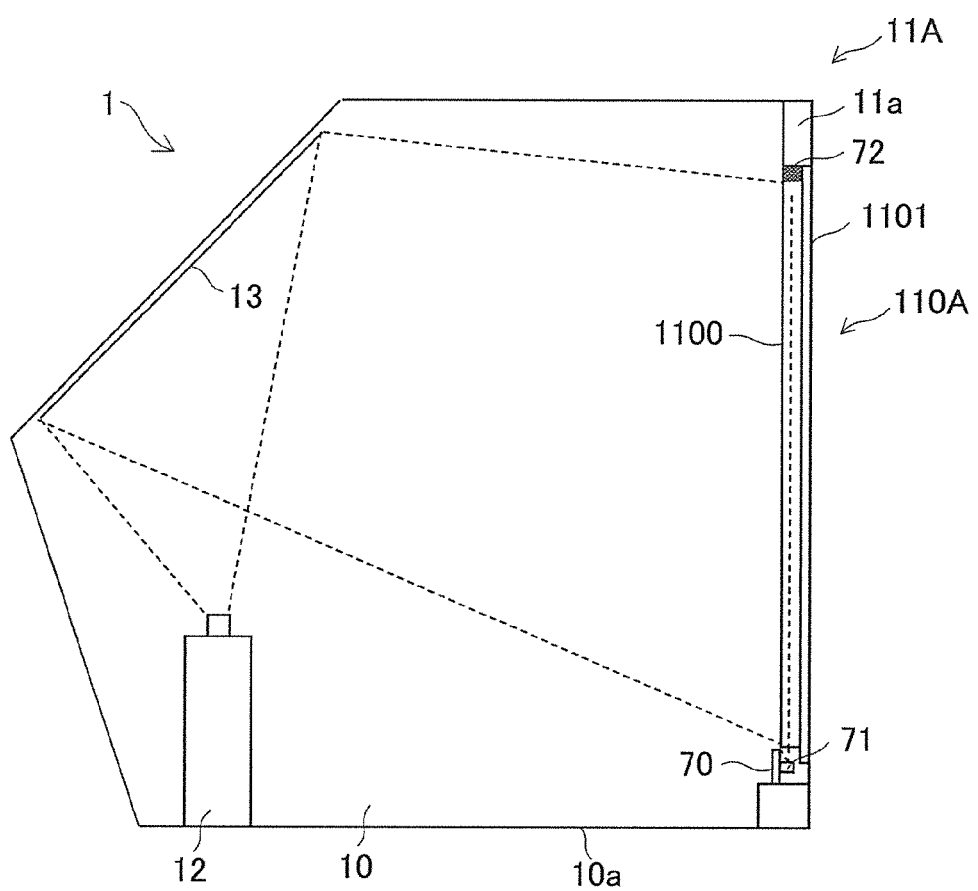
FIG. 23 is a cross section of the display device of Modification 2 of Sixth Embodiment.

(Modification 2) In Modification 2, the substrate 70 having a light-shielding function is oriented vertically, as shown in FIG. 23. The substrate 70 itself prevents the leakage, to the casing 10, of light emitted from the light emitters. In this arrangement, functions and effects similar to those in the above Sixth Embodiment are provided. In addition, reduction in the number of components is achievable.

Seventh Embodiment

Figure 24:
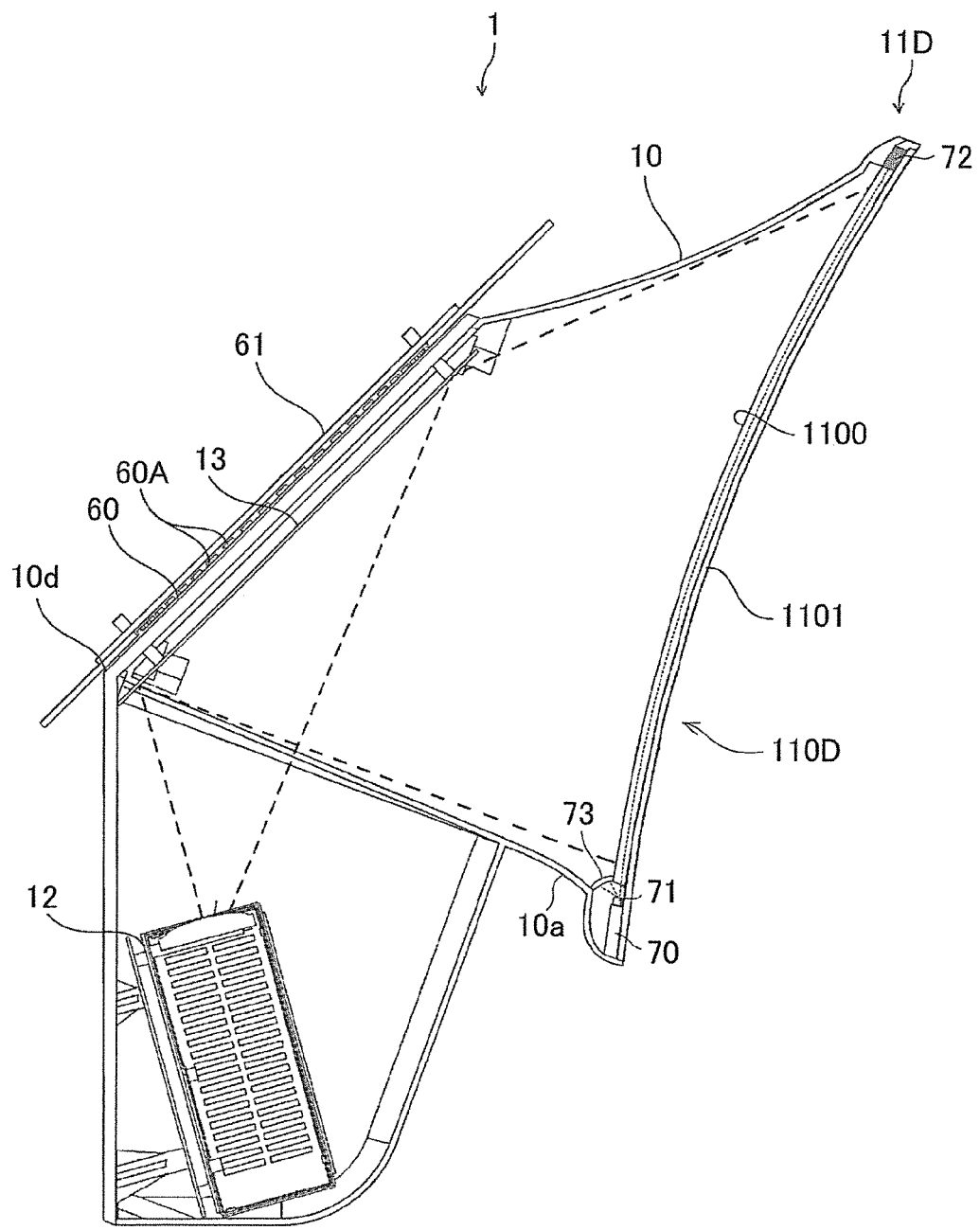
FIG. 24 is a cross section of the display device of Seventh Embodiment.
Figure 25:
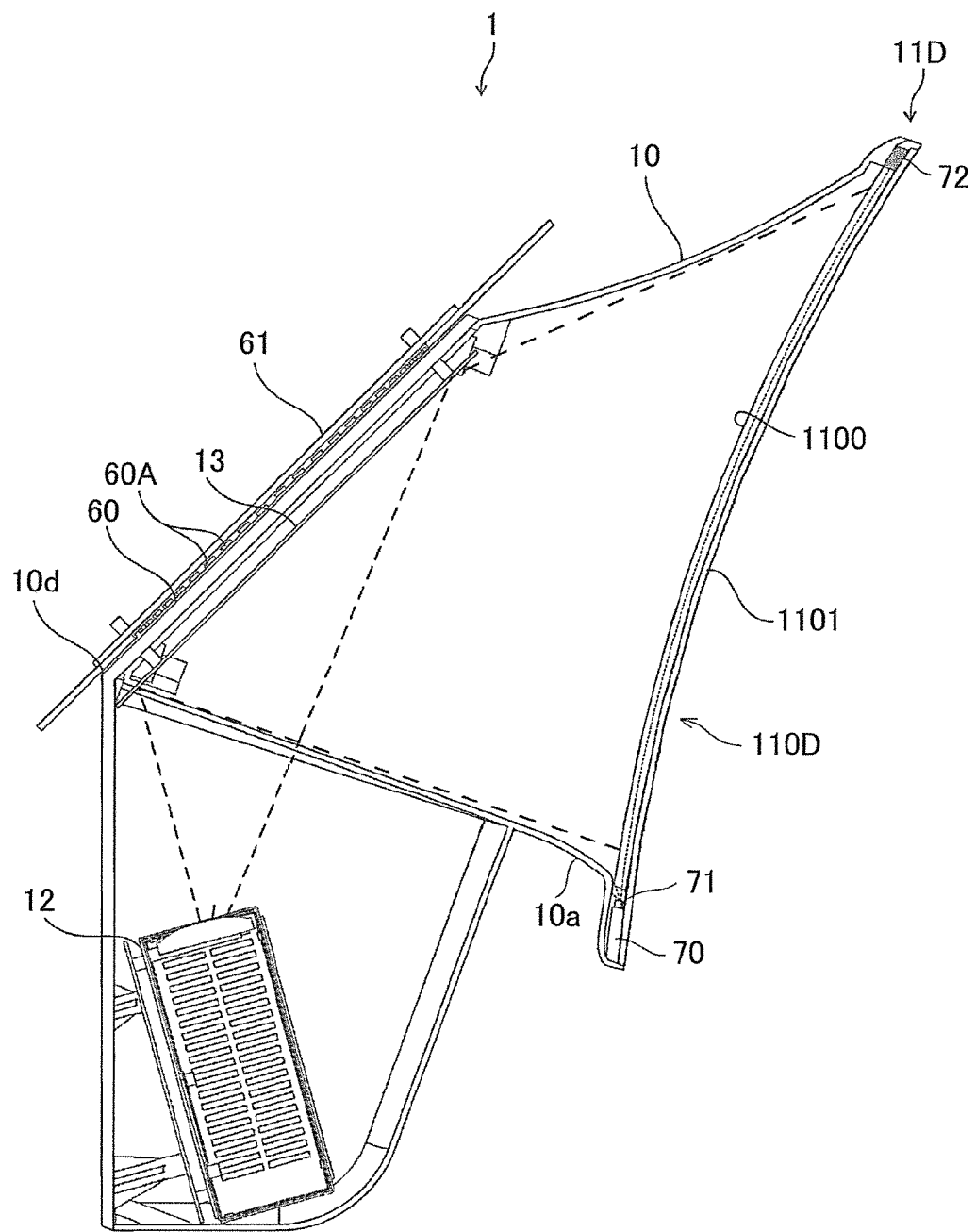
FIG. 25 is a cross section of the display device of Modification 1 of Seventh Embodiment.
Figure 26:
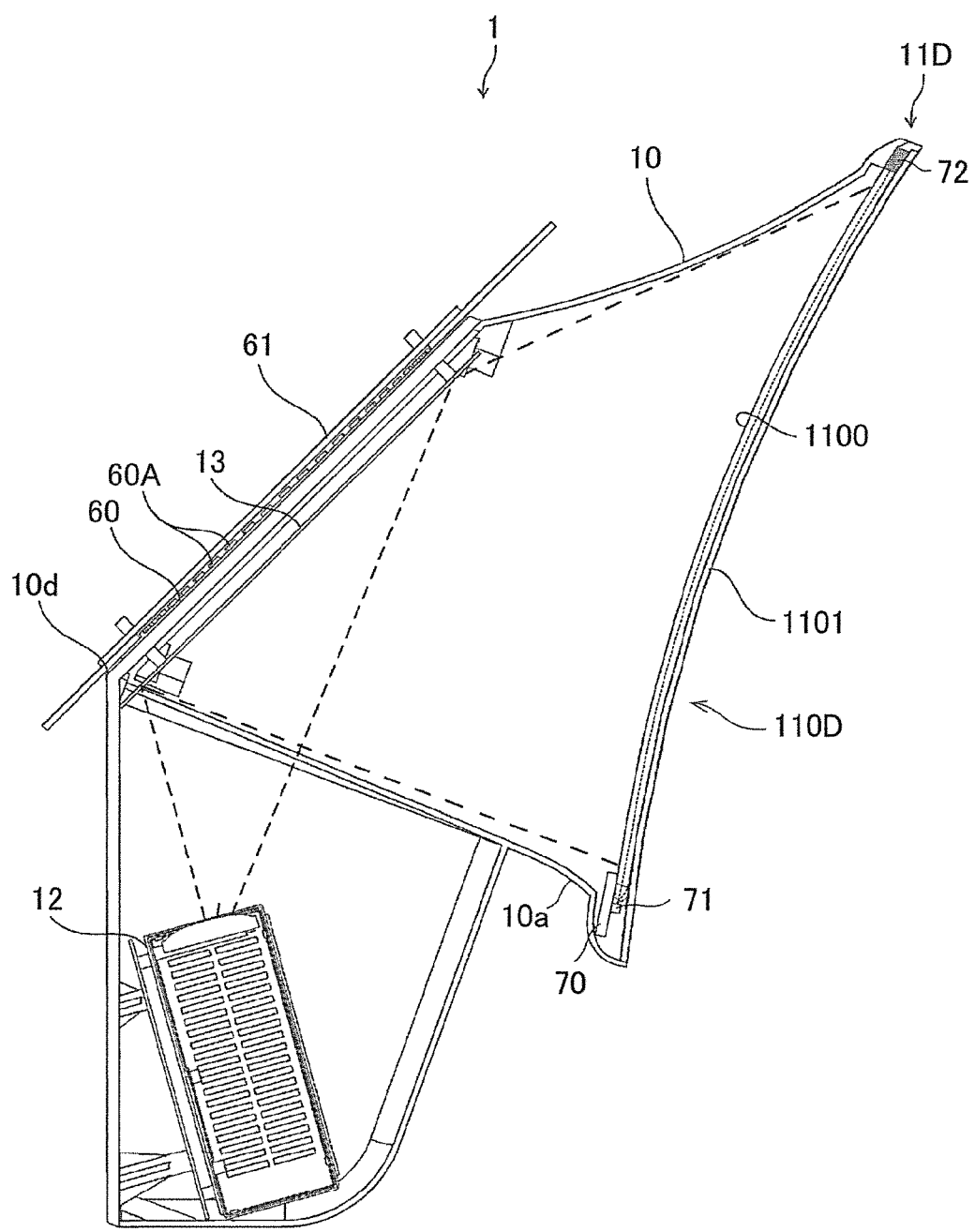
FIG. 26 is a cross section of the display device of Modification 2 of Seventh Embodiment.

The following will describe the display device of Seventh Embodiment of the present invention, with reference to FIG. 24 to FIG. 26. Note that elements which are the same as or similar to those in the above embodiments are given the same reference numerals, and descriptions thereof are omitted.

The display device of Seventh Embodiment is configured to improve visual effects and decorative characteristics by illuminating an upper edge portion of a concave screen 110D, as shown in FIG. 17, for example.

In the display device 1 of Seventh Embodiment, the screen 110D includes the incident portion (light guiding portion) 1100 and the display portion 1101, as shown in FIG. 24. The incident portion 1100 has a predetermined thickness and light is transmittable therethrough. The display panel 1101 has a predetermined thickness, and a projected image is displayed on a surface thereof. Further, at least one substrate (LED substrate) 70 is provided on the bottom surface 10a of the casing 10 and in the vicinity of a lower edge portion of the screen 110D. The diffused reflection portion 72 is provided at the upper edge portion of the incident portion (light guiding portion) 1100 of the screen 110D. The diffused reflection portion 72 includes projections and recesses to irregularly reflect light.

Similarly to that in Sixth Embodiment, the diffused reflection portion 72 is provided to extend all over the upper edge portion of the screen 110D. The substrate 70 may be provided to extend all over the lower edge portion of the screen 110D. Alternatively, the substrate 70 may be divided into parts as needed, and the divided parts may be provided apart from each other. The location and the output angle of the one or more light emitters 71 are adjusted as needed, so that light from the light emitters 71 reaches the whole diffused reflection portion 72 uniformly.

As a result, there is created a band of reflected light which is long in the horizontal direction and with which the upper edge portion of the screen 110D is fringed. In consequence, visual effects and decorative effects are improved. In FIG. 24, the LED substrate 60 and the reflection plate 61 are provided behind the reflector 13. The LED substrate 60 and the reflection plate 61 may be omitted as needed.

To prevent the leakage of light emitted from the light emitters 71 through a gap between the substrate 70 and the bottom surface 10a, the light-shielding member 73 is provided in the gap. With this, leakage of light into the casing 10 is prevented.

Further, a light-shielding member may be provided around the light emitters 71 to prevent light emitted from the light emitters 71 from going to the display portion 1101 of the screen 110D (see FIG. 21B).

In Seventh Embodiment, light emitted from the light emitters 71 on the substrate 70 provided in the vicinity of the lower edge portion of the screen 110D is reflected to create a band of light with which the upper edge portion of the screen 110D is fringed, similarly to Sixth Embodiment. This improves the visual effects and decorative characteristics of the display device 1. In addition, the leakage of light from the light emitters 71 to the inside of the casing 10 is prevented. This enhances the efficiency of light application and eliminates the effect on the image projected on the screen 110D. Similarly to Sixth Embodiment, the substrate 70 may be provided in the vicinity of the upper edge portion, the left edge portion, and/or the right edge portion of the screen 110D, and the diffused reflection portion 72 may be provided, so as to be opposed thereto, at the lower edge portion, right edge portion, and/or the left edge portion of the incident portion (light guiding portion) 1100. With this, the edge portion(s) (the upper edge portion, the lower edge portion, and/or the left edge portion) of the screen 110D is/are illuminated, as needed.

(Modification 1) In Modification 1, to prevent the leakage of light emitted from the light emitters 71 into the casing 10 through the gap between the substrate 70 and the bottom surface 10a, the bottom surface 10a having a light-shielding function is shaped to close the gap, as shown in FIG. 25. In this arrangement, functions and effects similar to those in the above Seventh Embodiment are provided. In addition, reduction in the number of components is achievable.

(Modification 2) In Modification 2, the substrate 70 has a light-shielding function is oriented vertically, as shown in FIG. 26. The substrate 70 itself prevents the leakage of light emitted from the light emitters into the casing 10. In this arrangement, functions and effects similar to those in the above Seventh Embodiment are provided. In addition, reduction in the number of components is achievable.

Also in Modifications 1 and 2, the LED substrate 60 and the reflection plate 61 may be omitted, as needed.

Eighth Embodiment

The following will describe the display device of Eighth Embodiment of the present invention, with reference to FIG. 27 to FIG. 33. Note that elements which are the same as or similar to those in the above embodiments are given the same reference numerals, and descriptions thereof are omitted.

Figure 27:
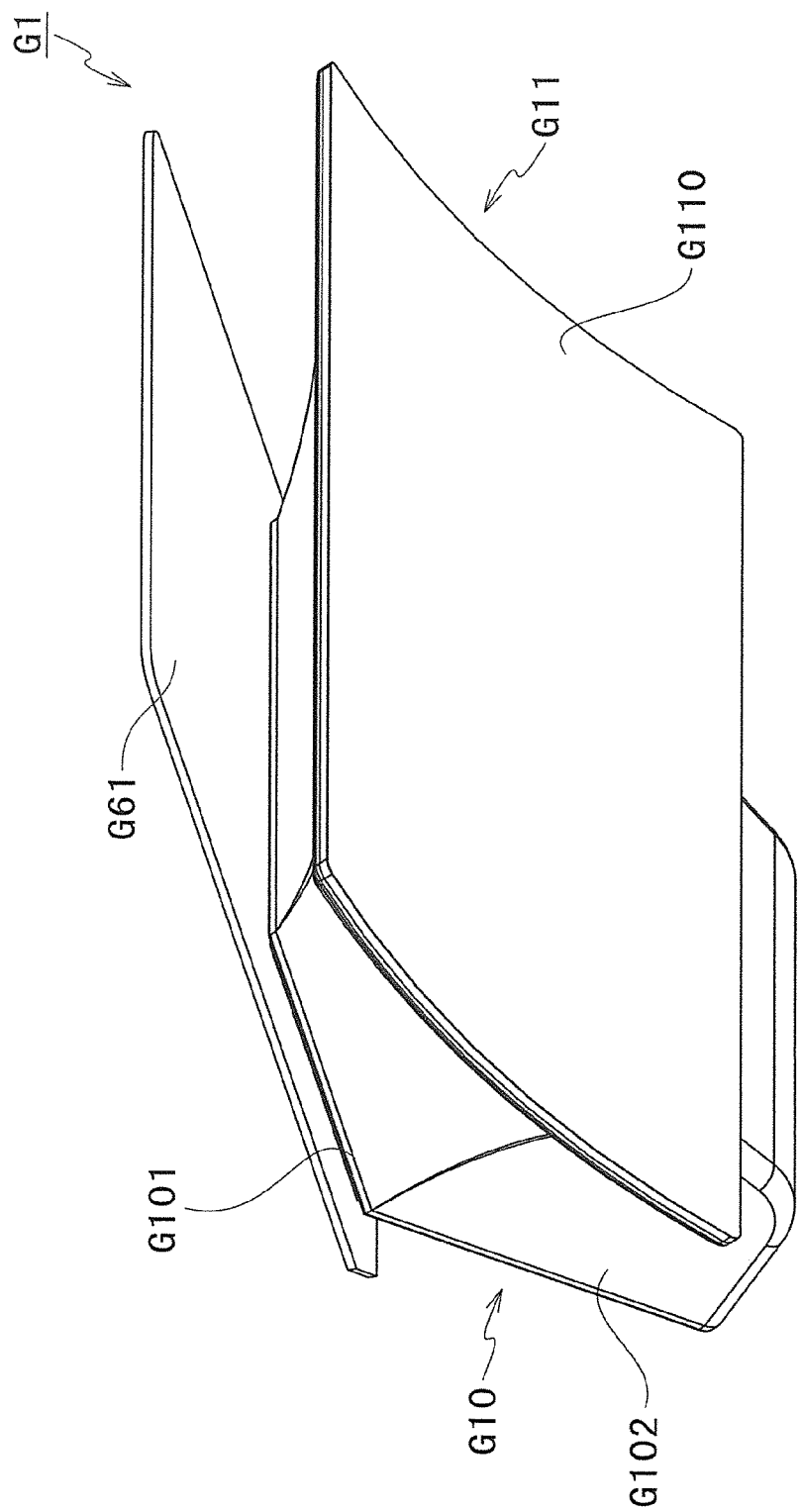
FIG. 27 is a perspective view of the display device of Eighth Embodiment.

FIG. 27 is a perspective view of a display device G1 of Eighth Embodiment. As shown in FIG. 27, the display device G1 includes a casing G10, and a screen unit G11. The entire front surface of the screen unit G11 is structured by a screen G110 having a concave shape. The casing G10 includes a base body G101 and a projector accommodating body G102.

Figure 28:
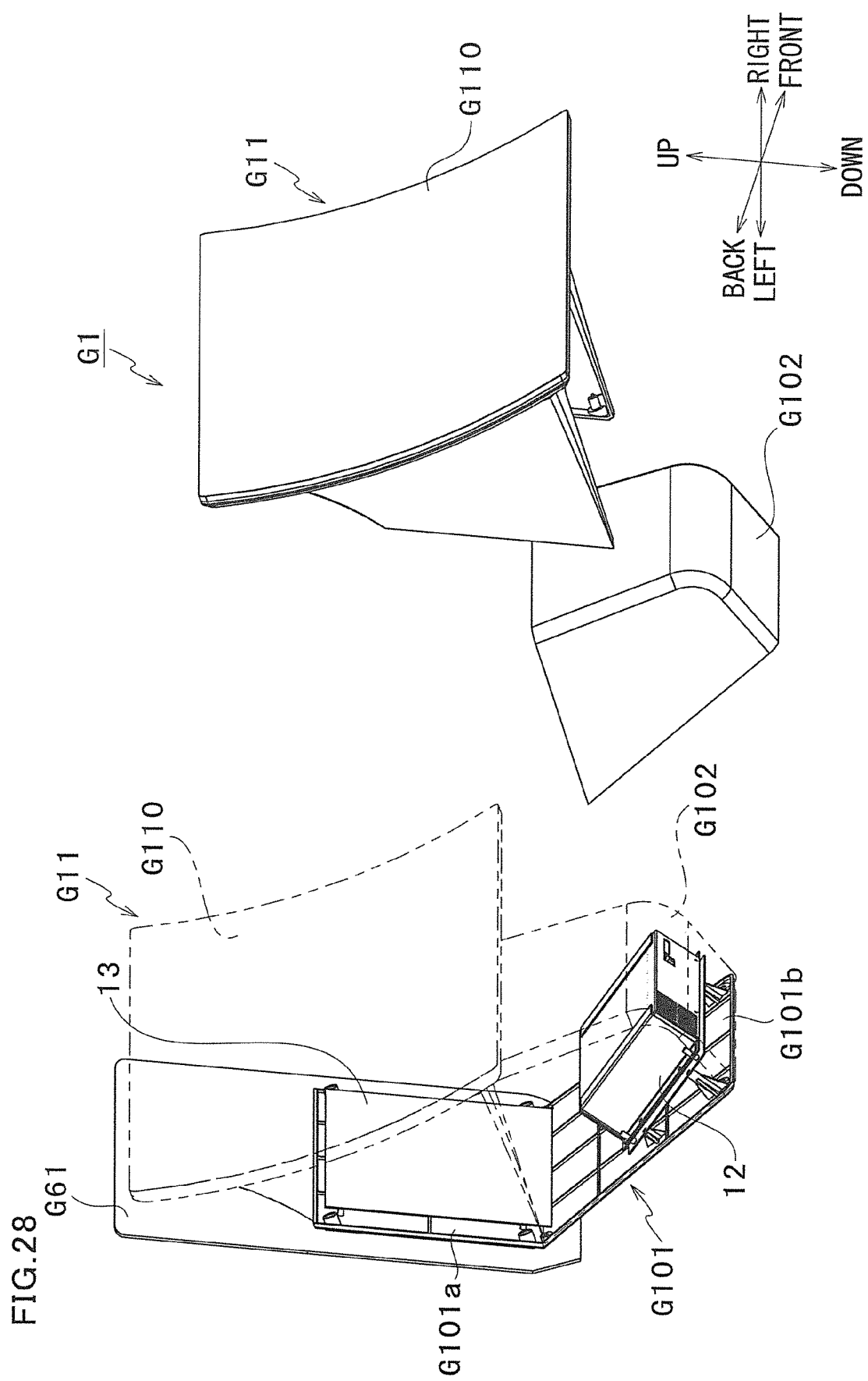
FIG. 28 is an exploded perspective view of the display device of Eighth Embodiment.

FIG. 28 is an exploded perspective view of the display device G1. As shown in FIG. 28, the base body G101 has a flat-plate-like rear portion G101a and a bottom portion G101b. These portions respectively form a rear wall and a bottom wall of the casing G10. The projector main body 12 is attached to the bottom portion G101b to be placed thereon. The reflector 13 is provided along the inner surface of the rear portion G101a.

The projector accommodating body G102 is attached to the bottom portion G101b so as to cover the projector main body 12. With this, the projector accommodating body G102 accommodates the projector main body 12 in its internal space. The internal space opens toward the top. This enables light for images emitted from the projector main body 12 to reach the reflector 13 disposed along the rear portion G101a. The screen unit G11 is attached to cover the reflector 13. The screen unit G11 is configured so that light reflected by the reflector 13 is applied to the screen G110.

As described above, the display device G1 of Eighth Embodiment functions as a transmission-type projector device similar to those of the above-described embodiments. However, the display device G1 is not limited to this. The display device may be a device incorporating therein a liquid crystal display or an organic EL (electroluminescence) display.

For the sake of convenience, a direction orthogonal to a main surface of the rear portion G101a may be referred to as a front-back direction in the following description of Eighth Embodiment. The position of the screen unit G11 relative to the rear portion G101a in the front-back direction may be expressed as "in front (frontward) of the display device G1", and the direction opposite to the front direction may be referred to as "back (backward, rearward) direction". The left and right as seen from the front of the device may be referred to as the right (rightward) and the left (leftward) of the display device G1, respectively. Further, the direction including the rightward and leftward directions may be referred to as a left-right direction. Furthermore, the direction orthogonal to the front-back direction and to the left-right direction may be referred to as an up-down direction or a height direction.

Figure 29:
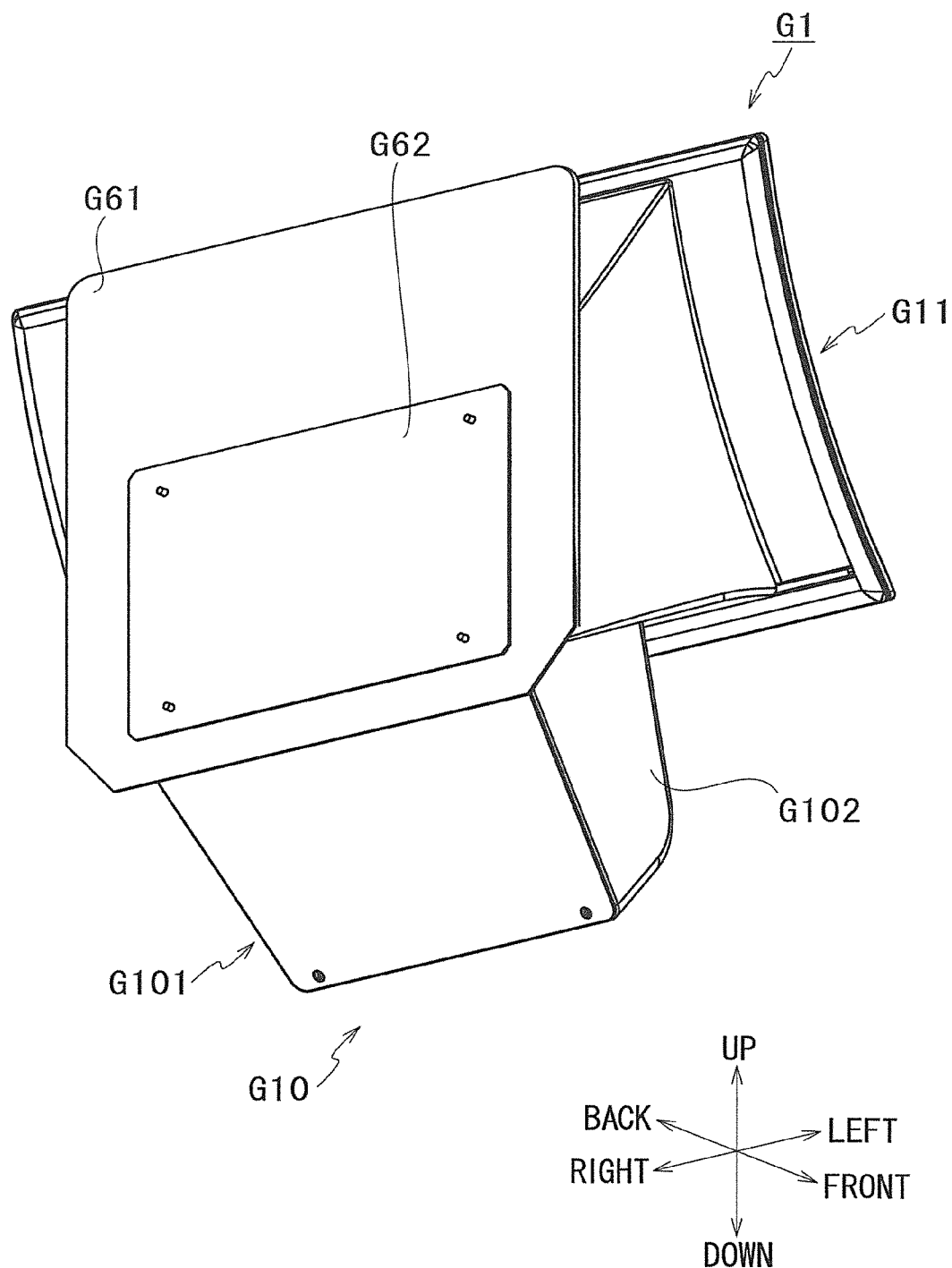
FIG. 29 is an exploded perspective view of the display device of Eighth Embodiment, viewed from the back.

FIG. 29 is a perspective view of the display device G1, viewed from the back. As shown in FIG. 27 to FIG. 29, a light guiding plate G61 is disposed behind the rear portion G101a of the base body G101 so as to be parallel to the rear portion G101a. That is, the light guiding plate G61 is disposed to be parallel to the up-down direction and the left-right direction. The light guiding plate G61 is configured so that light is transmittable therethrough and light having entered the plate is guided in the plate. While the light guiding plate G61 is a flat rectangular plate in Eighth Embodiment, the shape of the light guiding plate G61 is not limited to this. The light guiding plate G61 may have any shape such as a circular shape. As shown in FIG. 29, the light guiding plate G61 is secured to the base body G101 by a rear substrate cover G62.

The display device G1 is disposed, for example, above an external device such as a gaming machine. In this case, the display device G1 is oriented so that the screen G110 faces obliquely frontward and downward, to be opposed to the face of a user. It is preferable to structure the light guiding plate G61, in terms its position and/or its size, so that the light guiding plate G61 can be seen above the screen G110 from the user in the above situation.

Figure 30:
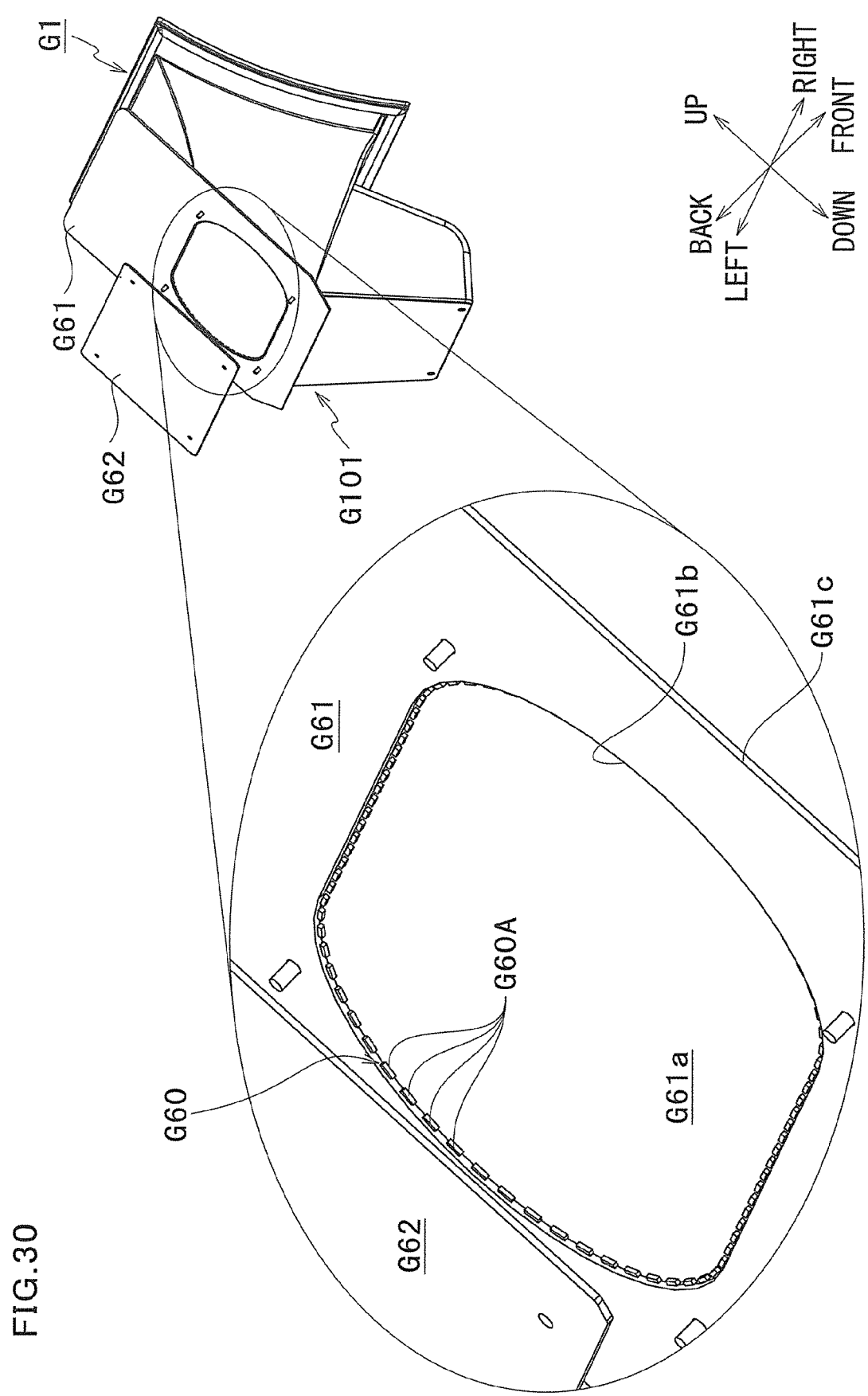
FIG. 30 is an exploded perspective view of the display device of Eighth Embodiment, viewed from the back.

FIG. 30 is an exploded perspective view of the display device G1, viewed from the back. As shown in FIG. 30, the light guiding plate G61 has a substantially circular opening G61a penetrating therethrough in its thickness direction. The light guiding plate G61 has an end surface (opening-side end surface G61b) which extends circularly and faces the opening G61a. In other words, the opening-side end surface G61b defines the opening G61a of the light guiding plate G61. While the opening G61a has a substantially circular shape in Eighth Embodiment, the shape of the opening is not limited to this. The opening may have a quadrangular shape. Further, a part of the circumferential edge of the opening G61a may overlap the circumferential edge of the light guiding plate G61. That is, the opening G61a may be formed by cutting off a part of the light guiding plate G61.

An LED substrate G60 is disposed between the light guiding plate G61 and the base body G101. That is, a plurality of LEDs G60A are provided on the LED substrate G60 which is different from the light guiding plate G61. The LEDs G60A are mounted on the LED substrate G60. The LEDs G60A are disposed to be opposed to the opening-side end surface G61b of the light guiding plate G61. To be more specific, the LEDs G60A are provided at equal intervals on the LED substrate G60 so as to surround the opening G61a along the opening-side end surface G61b. When the opening G61a is a cut-out opening as described above, the LEDs G60A are arranged in an arc shape along the cut-out opening. Each LED G60A has a light emission port opposed to the opening-side end surface G61b. Thus, light is applied from the LEDs G60A on the LED substrate G60 radially toward the opening-side end surface G61b of the light guiding plate G61. The optical axis of light applied from each LED G60A is parallel to the light guiding plate G61. This enables light having entered the light guiding plate G61 to travel through the light guiding plate G61 and to reach an outer end surface G61c forming the circumferential edge of the light guiding plate G61. The thickness of the light guiding plate G61 is longer than the length of each LED G60A in the front-back direction. This prevents the rear substrate cover G62, by which the light guiding plate G61 is secured, from coming into contact with the LEDs G60A in the opening G61a of the light guiding plate G61.

As such, light emitted from the LEDs G60A disposed in the opening G61a of the light guiding plate G61 enters through the opening-side end surface G61b of the light guiding plate G61, and then light is guided in the light guiding plate G61, to illuminate the whole area of the outer end surface G61c of the light guiding plate G61. In other words, the plurality of LEDs G60A, which are disposed outside the casing G10 and on the opposite side of the casing from the screen G110, and the light guiding plate G61 illuminated by the LEDs G60A constitute a light emission unit. Thus, light emitted from the LEDs G60A is radially dispersed in the light guiding plate G61 and reaches the outer end surface G61c. This makes it possible to illuminate the whole circumference of the light guiding plate G61 annularly. As a result, the thus illuminated light guiding plate G61 is visible from all the directions relative to the display device G1, which makes it easier to identify the external device, such as a gaming machine, to which the display device G1 is attached.

The LED substrate G60 is configured so that lighting of the LEDs G60A can be controlled individually. The LED substrate G60 includes a memory (not illustrated) which stores a plurality of lighting patterns. The LEDs G60A are controlled in accordance with one of the patters corresponding to a signal transmitted from outside. For example, the LED substrate G60 selects one of the lighting patterns corresponding to a signal indicating the gaming state or the like transmitted from the external device (e.g., gaming machine) connected to the display device G1, or in response to an operation performed through an input device (not illustrated) included in the display device G1. Then, the LED substrate G60 controls the LEDs G60A based on the thus selected pattern. For example, a drive effect in which light streams along the circumferential edge of the light guiding plate G61 is provided by controlling the LEDs G60A in accordance with the lighting pattern to turning on the LEDs G60A sequentially in order of their arrangement. Further, when full-color LEDs are used as the LEDs G60A, various notifications using the color of the LEDs are possible. For example, the following arrangement is possible: when an input operation to call an attendant or the like is performed by a user through a touch sensor or the like, which will be described later, the LEDs are turned on in red; and when there is an anomaly in the external device (e.g., gaming machine), the LEDs blink in yellow.

The light guiding plate G61 has portions processed to have a reflection function to reflect, in a direction of the thickness toward the base body G101, a part of light emitted from the LEDs G60A and passing through the light guiding plate G61. Such processing to the light guiding plate G61 may be made to form a shape with designability. In this case, illumination of this shape appears on a main surface of the light guiding plate G61 when the LEDs are turned on. The following will specifically describe the processing onto the light guiding plate G61 for reflectivity, with reference to an illustration of a pattern of path of light traveling through the light guiding plate G61.

Figure 31A:
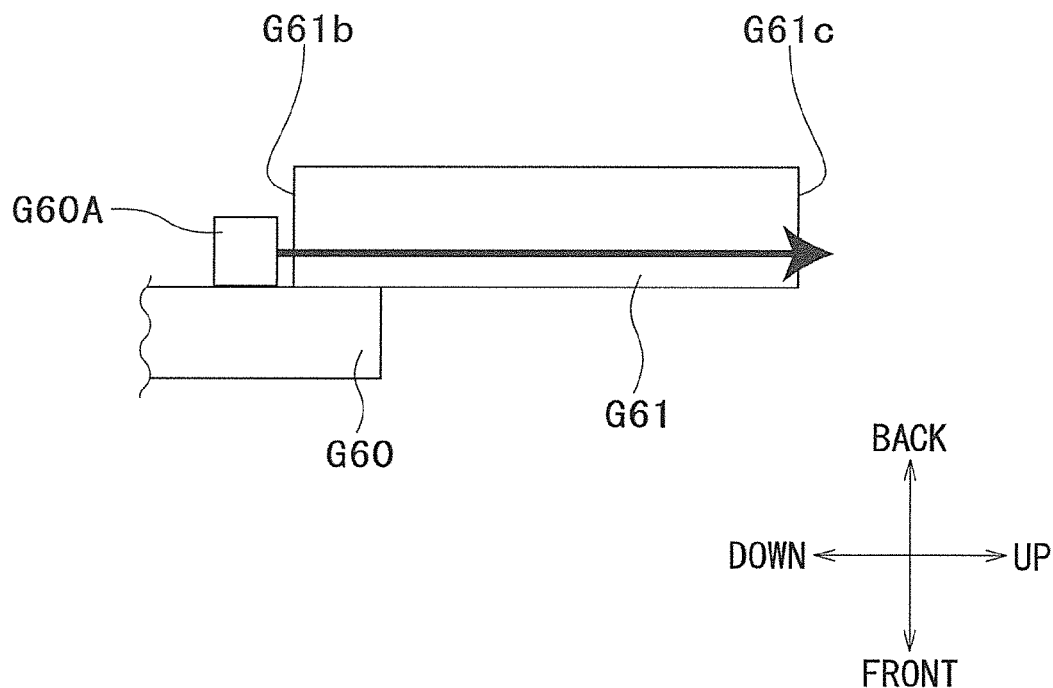
FIG. 31A is an explanatory diagram illustrating an example of a pattern of path of light emitted from an LED and traveling through a light guiding plate in the device of Eighth Embodiment.
Figure 31B:
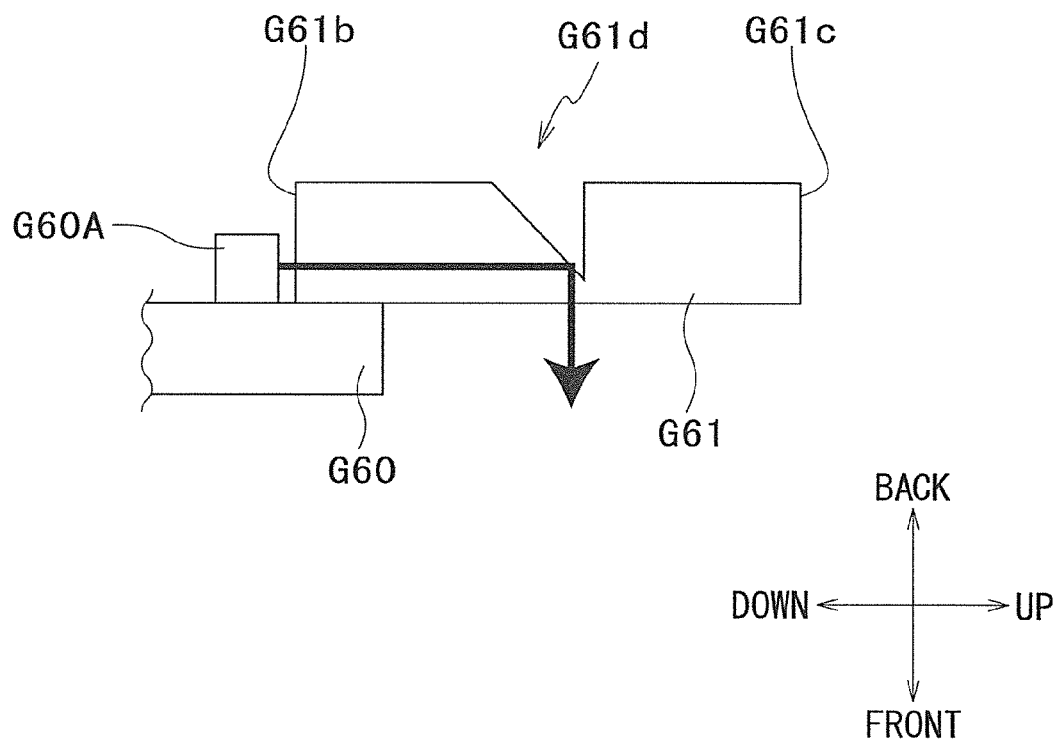
FIG. 31B is an explanatory diagram illustrating an example of a pattern of path of light emitted from an LED and traveling through the light guiding plate in Eighth Embodiment.

FIG. 31A and FIG. 31B each is an explanatory diagram showing an example of a pattern of path of light emitted from the LEDs G60A and traveling through the light guiding plate G61. As shown in FIG. 31A, when no processing for reflection is made to the path of light emitted from the LEDs G60A, light emitted from the LEDs G60A enters the light guiding plate G61 through the opening-side end surface G61b, travels inside the light guiding plate G61 in a planar direction (up-down direction), and then reaches the outer end surface G61c. With this, the entire circumference of the light guiding plate G61 is annularly illuminated.

Meanwhile, as shown in FIG. 31B, the light guiding plate G61 has reflecting portions G61d which reflect light traveling in the planar direction of the light guiding plate G61 (up-down direction). In Eighth Embodiment, each reflecting portion G61d is a dent formed on the main surface of the light guiding plate G61 that is opposite from the LED substrate G60. The reflecting portion G61d has a reflecting surface, the normal of which is inclined 45 degrees toward the thickness direction (frontward) relative to the path of light emitted from the LEDs G60A. Thus, light arriving at the reflecting portion G61d is reflected toward the LED substrate G60 in the thickness direction of the light guiding plate G61 (i.e., frontward). The reflecting portions G61d may be provided inside the light guiding plate by laser processing, for example.

FIG. 32 is an explanatory diagram showing an example of illumination manners of the light guiding plate G61. As shown in FIG. 32, light is radially emitted from the LEDs G60A (see FIG. 30) arranged in the opening G61a. Light reaches the outer end surface G61c, to illuminate the circumferential edge of the light guiding plate G61. A part of light emitted from the LEDs G60A (see FIG. 30) is reflected frontward by the reflecting portions G61d, to form bright spots on the main surface of the light guiding plate G61. Because the reflecting portions G61d are collectively provided so as to form a design, the bright spots formed by light reflected by the reflecting portions G61d form the design by way of pointillism.

Figure 33:
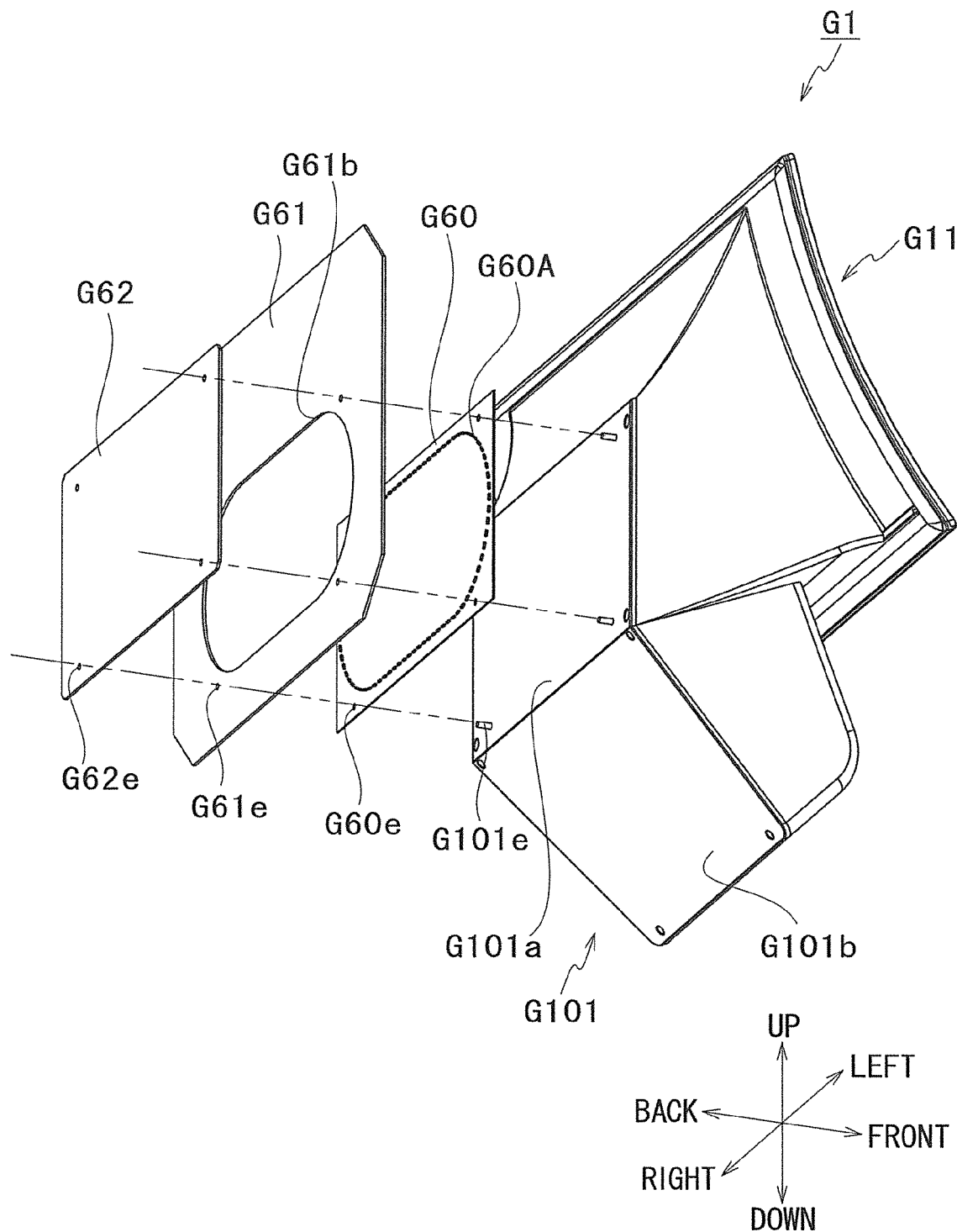
FIG. 33 is an exploded perspective view of the display device of Eighth Embodiment, viewed from the back.

FIG. 33 is an exploded perspective view of the display device G1, viewed from the back. As shown in FIG. 33, the plurality of LEDs G60A are provided on the LED substrate G60 which is different from the light guiding plate G61. The LED substrate G60 has alignment portions G60e. The light guiding plate G61 has alignment portions G61e. These alignment portions G60e and G61e are provided to align the substrate and the plate with each other so that the LEDs G60A are positioned to be opposed to the opening-side end surface G61b of the light guiding plate G61.

To be more specific, the alignment portions G60e are four through holes respectively provided at four corners of the light guiding plate G61, each penetrating the plate G61 in the front-back direction. The alignment portions G61e are four through holes respectively corresponding to the four alignment portions G60e. The rear substrate cover G62 also has alignment portions G62e. The rear substrate cover G62 and the LED substrate G60 sandwich the light guiding plate G61 between them.

On the rear portion G101a of the base body G101, there are provided alignment members G101e for aligning the components in association with the alignment portions G60e and G61e of the LED substrate G60 and the light guiding plate G61. Each alignment member G101e has a cylindrical shape with a cross section engageable in the alignment portions G60e, G61e, and G62e. The alignment member G101e is longer than the total sum of the thicknesses of the LED substrate G60, the light guiding plate G61, and the rear substrate cover G62. The alignment member G101e projects rearward from the base body G101.

As such, the LED substrate G60, the light guiding plate G61, and the rear substrate cover G62 are provided, attachably to and detachably from the base body G101. These components are aligned with the base body G101 by inserting the alignment members G101e of the base body G101 into the alignment portions G60e, G61e, and G62e of the LED substrate G60, the light guiding plate G61, and the rear substrate cover G62, sequentially.

When the light guiding plate G61 is aligned, the alignment portions G61e are first aligned with projecting end portions of the alignment members G101e of the base body G101 and the alignment members G101e are inserted into the alignment portions G61e. Then, the light guiding plate G61 is moved frontward while the movement in the up-down direction and the left-right direction is restricted by the alignment members G101e, to be placed on the LED substrate G60. Thus, the movement of the light guiding plate G61 is restricted by the alignment members G101e only to the movement in the front-back direction. This prevents the light guiding plate G61 from coming into contact with the LEDs G60A provided on the LED substrate G60 during the alignment.

(Outline of Eighth Embodiment)

The display device G1 of Eighth Embodiment includes: the light-transmitting light guiding plate G61 provided so as to be attachable to and detachable from the base body G101, and including the opening-side end surface G61b of a predetermined shape which forms the opening G61a penetrating the plate G61 in its thickness direction; the LEDs G60A arranged to be opposed to the opening-side end surface G61b forming the opening G61a of the light guiding plate G61, the LEDs G60A being arranged to be aligned along the opening-side end surface G61b, and the light guiding plate G61 including the reflecting portions G61d processed to reflect, in the thickness direction of the light guiding plate G61, a part of light emitted from the LEDs G60A and guided into the light guiding plate G61 through the opening-side end surface G61b.

In the above arrangement, light emitted from the LEDs G60A arranged in the opening of the light guiding plate G61 enters through the opening-side end surface G61b of the light guiding plate G61, and then the light is guided in the light guiding plate G61, to illuminate the whole area of the outer end surface G61c of the light guiding plate G61. Meanwhile, a part of light guided in the light guiding plate G61 exits through a surface of the light guiding plate G61, reflected by the reflecting portions G61d of the light guiding plate G61. The reflecting portions G61d have been processed to reflect light. Thus, light emitted from the LEDs G60A is radially dispersed in the light guiding plate G61 and reaches the outer end surface G61c. This makes it possible to illuminate the whole circumference of the light guiding plate G61 annularly. As a result, the thus illuminated light guiding plate G61 is visible from all the directions relative to the display device G1, which makes it easier to identify the external device (e.g., a gaming machine) to which the display device G1 is attached. Further, the designability of the display device G1 is improved by light exiting from the surface of the light guiding plate G61. In addition, because the light guiding plate G61 is attachable to and detachable from the base body G101, it is possible to replace one light guiding plate G61 with another light guiding plate G61 processed to reflect light to provide a different design. Thus, the display device G1 is applicable to various types of gaming machines.

Further, in the display device G1 of Eighth Embodiment, the LEDs G60A are provided on the LED substrate G60 which is different from the light guiding plate G61. The LED substrate G60 and the light guiding plate G61 respectively include the alignment portions G60e and the alignment portions G61e for aligning them so that the LEDs G60A are positioned to be opposed to the opening-side end surface G61b of the light guiding plate G61.

In the above arrangement, the position of the detachable light guiding plate G61 is determined by the alignment portions G60e and G61e so that the LEDs G60A are opposed to the opening-side end surface G61b of the light guiding plate G61. Thus, the light guiding plate G61 is accurately aligned by the alignment portions G60e and G61e. This prevents reduction of visual effects caused by misalignment.

Furthermore, in the display device G1 of Eighth Embodiment, the base body G101 includes the alignment members G101e which align the components in association with the alignment portions G60e and G61e of the LED substrate G60 and the light guiding plate G61.

In the above arrangement, the alignment is performed by the alignment members G101e provided on the base body G101 and the alignment portions G60e and G61e of the LED substrate G60 and the light guiding plate G61, which are associated with one another. With this, the LED substrate G60 and the light guiding plate G61 are aligned with each other, and are also aligned with the base body G101. As a result, the reduction of visual effects caused by misalignment is further prevented.

In the display device G1 of Eighth Embodiment, the opening G61a has a substantially circular shape, and the LEDs G60A are arranged annularly along the opening-side end surface G61b forming the opening G61a.

In this arrangement, the LEDs G60A are arranged annularly along the opening-side end surface G61b forming the substantially circular opening G61a. Because the LEDs G60A are arranged annularly along the opening-side end surface G61b of the light guiding plate G61, the number of the LEDs G60A can be minimized. Further, this enable light from the LEDs G60A to more efficiently enter the light guiding plate G61, to more effectively illuminate the outer end surface G61c of the light guiding plate G61.

Ninth Embodiment

The following will describe the display device of Ninth Embodiment of the present invention, with reference to FIG. 34 to FIG. 37. Note that elements which are the same as or similar to those in the above embodiments are given the same reference numerals, and descriptions thereof are omitted. In Ninth Embodiment, a description will be given for an alternative of the projector accommodating body G102 (see FIG. 28 and FIG. 29) which has been described in Eighth Embodiment. The other elements and the like are similar to those in Eighth Embodiment, and therefore the description thereof are omitted.

Figure 34:
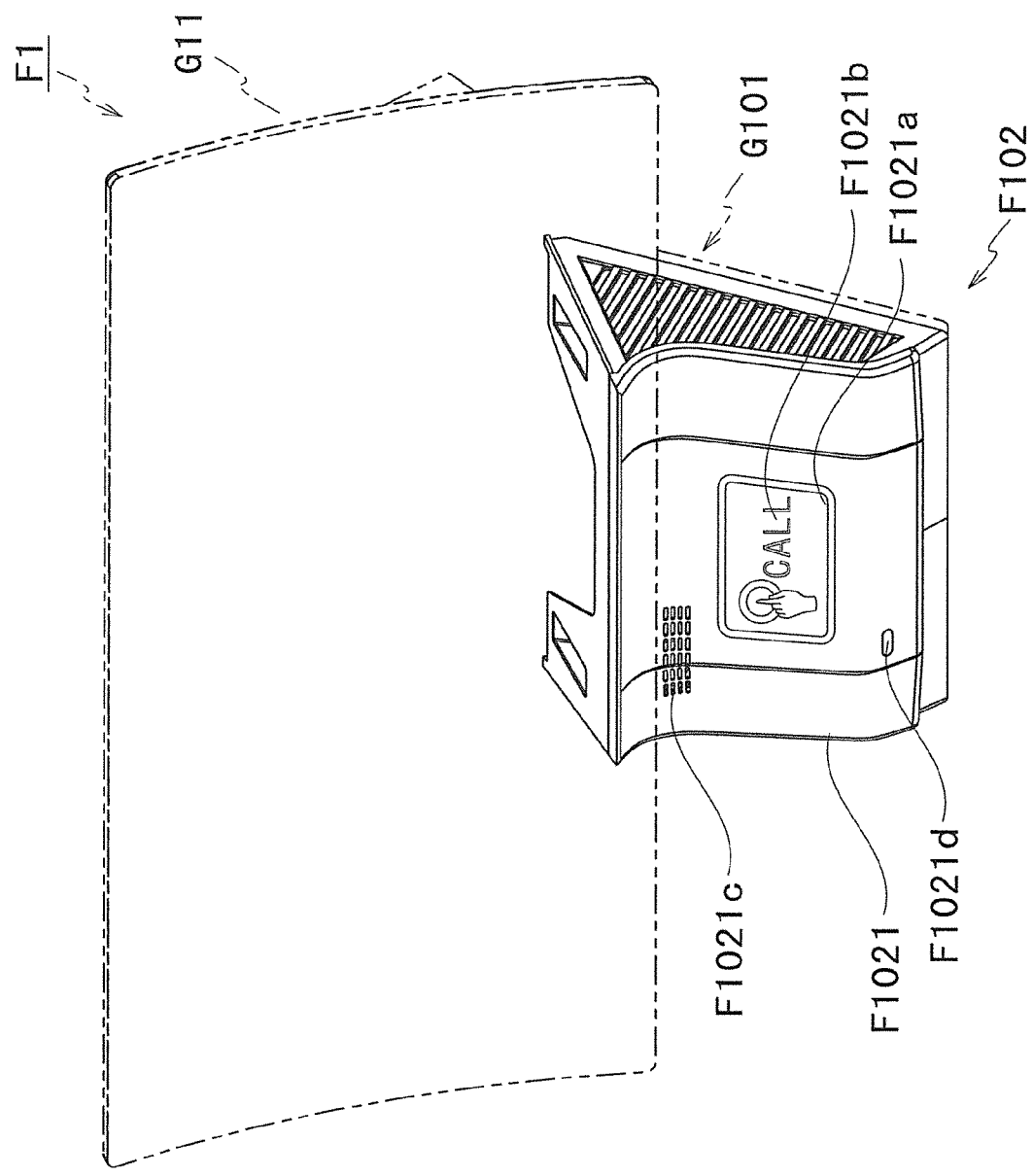
FIG. 34 is a perspective view of a projector accommodating body included in the display device of Ninth Embodiment.

FIG. 34 is a perspective view of a projector accommodating body F102 included in a display device F1 of Ninth Embodiment. As shown in FIG. 34, the projector accommodating body F102 is attached to the base body G101 so as to cover the projector main body 12 (see FIG. 28), below the screen unit G11. With this, the projector accommodating body F102 accommodates the projector main body 12 in its internal space. Similarly to that in Eighth Embodiment, the internal space opens toward the top. This enables light for images emitted from the projector main body 12 to reach the reflector 13 disposed along the rear portion G101a. The projector accommodating body F102 of Ninth Embodiment further has a function as an input device configured to receive an input by a user, and a function of giving a notice to the user. The following will specifically describe the projector accommodating body F102.

The projector accommodating body F102 includes an exterior panel F1021 forming the front outer shape of the projector accommodating body F102. The exterior panel F1021 includes a touch area F1021a, a speaker portion F1021c, and a light receiving portion F1021d.

The touch area F1021a is a rectangular input area defined so as to correspond to the shape of a touch sensor F1022 (see FIG. 35), which will be described later. The touch area F1021a has a light-transmitting portion F1021b through which light is transmittable. That is, light applied from the back side is transmittable through the light-transmitting portion F1021b. In Ninth Embodiment, the light-transmitting portion F1021b has a rectangular shape indicating the range of the touch area F1021a, and a picture of a hand and a text of "CALL" are provided in the rectangle. However, the light-transmitting portion F1021b is not limited to this. Further, in Ninth Embodiment, the exterior panel F1021 is made of a light-transmitting material, and printing is performed thereon with non-transmissible ink so that the light-transmitting portion F1021b remains. However, the present invention is not limited to this. For example, the light-transmitting portion may be formed by providing a light-transmitting material to be flush with the exterior panel F1021. Alternatively, the light-transmitting portion may be merely a through hole penetrating the exterior panel F1021. Further alternatively, the light-transmitting portion F1021b may be formed by a through hole penetrating the exterior panel F1021 with an optical sheet (optical film) provided on the back side of the exterior panel F1021. The optical sheet (optical film) is configured to irregularly reflect light.

The speaker portion F1021c is constituted by through holes through which sound from a speaker F10253 (see FIG. 35 and FIG. 36) is output to the outside. The speaker F10253 will be described later. The light receiving portion F1021d is an input device configured to receive a signal such as an infrared signal from the outside.

Figure 35:
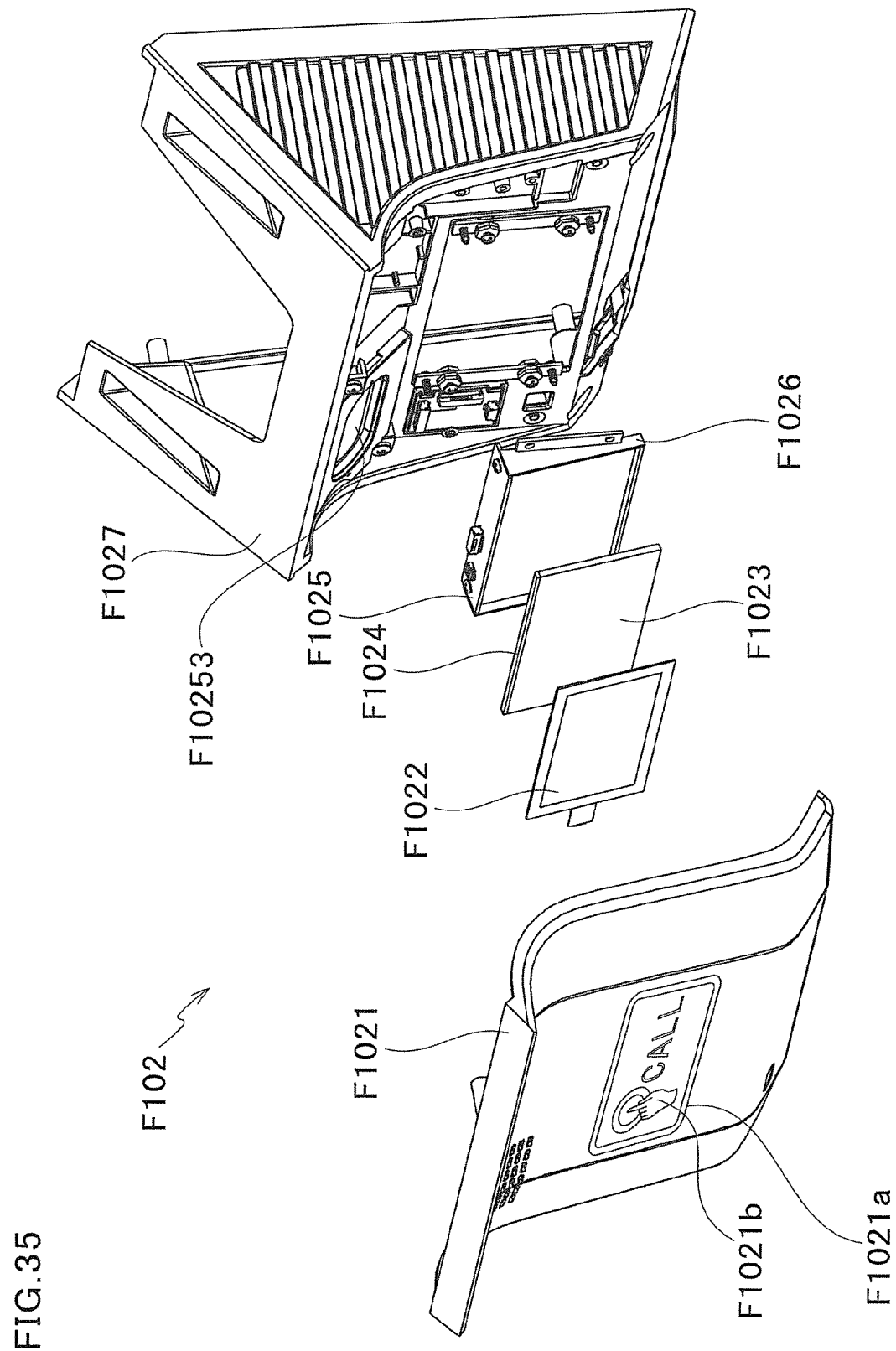
FIG. 35 is an exploded perspective view of the projector accommodating body included in the display device of Ninth Embodiment.

FIG. 35 is an exploded perspective view of the projector accommodating body F102. As shown in FIG. 35, the projector accommodating body F102 includes: the exterior panel F1021 described above; the touch sensor F1022; a light guiding plate F1023; an LED array F1024 provided on an upper edge of the light guiding plate F1023; a substrate F1025; a frame F1026; and an accommodating base body F1027.

The accommodating base body F1027 and the exterior panel F1021 form the outer shape of the projector accommodating body F102. The touch sensor F1022, the light guiding plate F1023, the LED array F1024, and the substrate F1025 are accommodated in the space created between the accommodating base body F1027 and the exterior panel F1021. Further, the accommodating base body F1027 is provided with light receiving elements through which the speaker and the light receiving portion F1021d described above receive an optical signal transmitted from the outside. The accommodating base body F1027 accommodates the projector main body 12 (see FIG. 28) in its space which is on the opposite side from the exterior panel F1021. The speaker F10253 is provided at an upper left portion on the front surface of the accommodating base body F1027. Sound from the speaker F10253 is output through the speaker portion F1021c.

The substrate F1025 has a function of receiving an input from the touch sensor F1022 and from the light receiving portion F1021d, and a function of controlling lighting of the LED array F1024.

The LED array F1024 is an LED unit in which a plurality of full-color LEDs are arranged in parallel. The LED array F1024 emits a plane of light from the upper edge of the light guiding plate F1023 into the light guiding plate F1023. The light guiding plate F1023 is provided behind the touch sensor F1022. A reflection sheet is provided on the back surface of the light guiding plate F1023, while a diffusion sheet is provided on the front surface of the light guiding plate F1023. Light emitted from the LED array F1024 travels through the light guiding plate F1023 while being reflected by the reflection sheet, to exit from the plane of the diffusion sheet provided on the front side of the light guiding plate F1023. That is, the light guiding plate F1023 has a function of guiding light emitted from the LED array F1024 toward the light-transmitting portion F1021b of the exterior panel F1021 provided on the front side, via the touch sensor F1022. With this, the light-transmitting portion F1021b, through which light is transmittable, is illuminated.

Through the touch sensor F1022, light is transmittable. The touch sensor F1022 is disposed behind the exterior panel F1021 so as to correspond to the touch area F1021a. This enables the touch sensor F1022 to detect an input by a user made through a touch of the touch area F1021a.

The touch sensor F1022, the light guiding plate F1023 with the LED array F1024, and the substrate F1025 are attached to the frame F1026, and then these members are attached to a central portion of the accommodating base body F1027 that is on the side closer to the exterior panel F1021.

Figure 36:
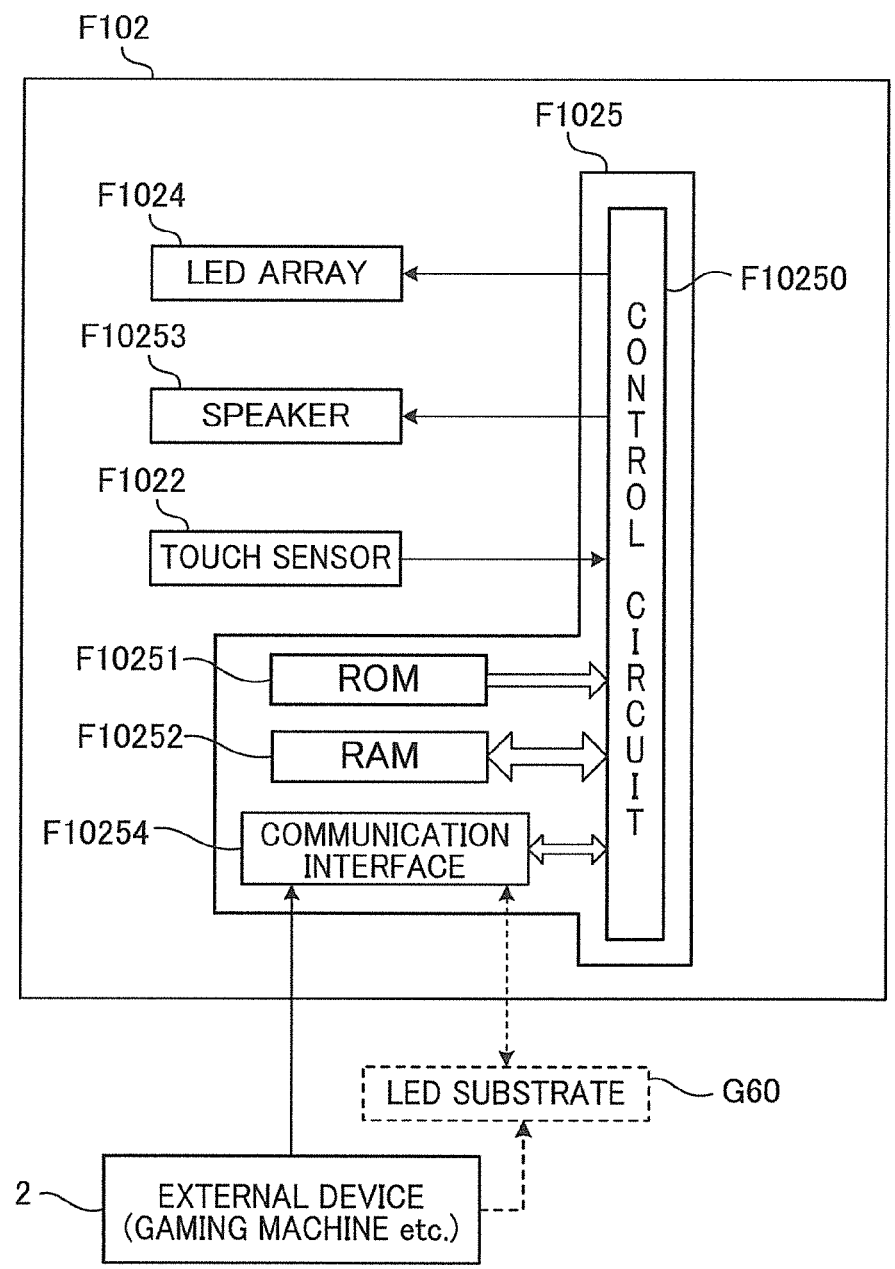
FIG. 36 is a block diagram showing the electrical structure of the projector accommodating body in Ninth Embodiment.

FIG. 36 is a block diagram showing the electrical structure of the projector accommodating body F102. As shown in FIG. 36, the substrate F1025 includes a control circuit F10250, a ROM (read only memory) F10251, a RAM (random access memory) F10252, a communication interface F10254. The control circuit F10250 includes a CPU (central processing unit), and a circuit for controlling the LED array F1024 and the speaker F10253. The ROM F10251 stores therein lighting patterns and the like used for lighting control of the LED array. The RAM F10252 temporarily stores information input from the outside, for example. The communication interface F10254 is for communicating with an external device 2 such as a gaming machine, and with the LED substrate G60 (see FIG. 30), for example. The communication with the external device may be performed via the LED substrate G60 or via an unillustrated control board controlling the LED substrate G60. Further, signals do not have to be transmitted directly from the external device. Signals may be transmitted indirectly, i.e., via other devices, such as a server and a controller in a casino, for example.

As described above, the substrate F1025 is capable of changing the illumination for the light-transmitting portion F1021b based on information from the touch sensor F1022 and/or the external device. Further, the substrate F1025 is connected to the LED substrate G60 which illuminates the light guiding plate G61 disposed on the back side of the display device G1. This structure makes it possible to provide effects and/or notification by the illumination for the light-transmitting portion F1021b and the illumination for the light guiding plate G61 which are synchronized with each other.

Figure 37:
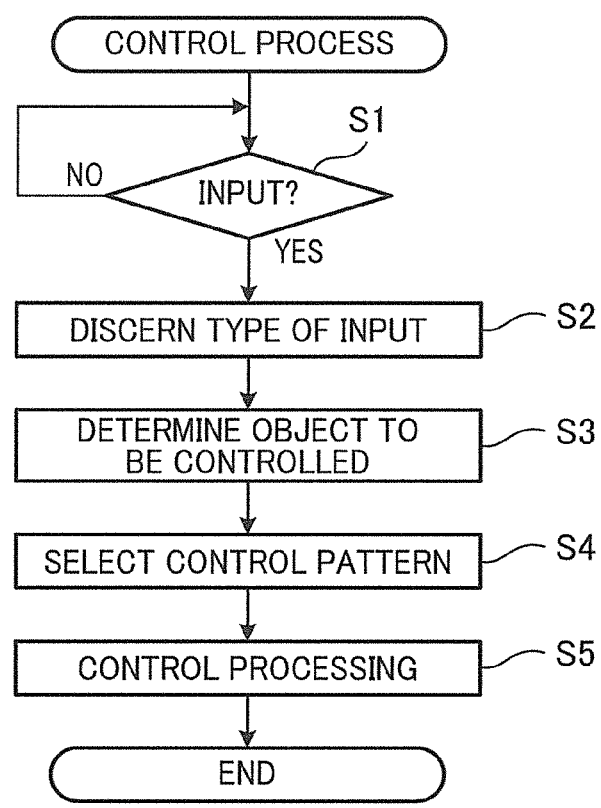
FIG. 37 is a flowchart of a control process executed by a control circuit in Ninth Embodiment.
Figure 38:
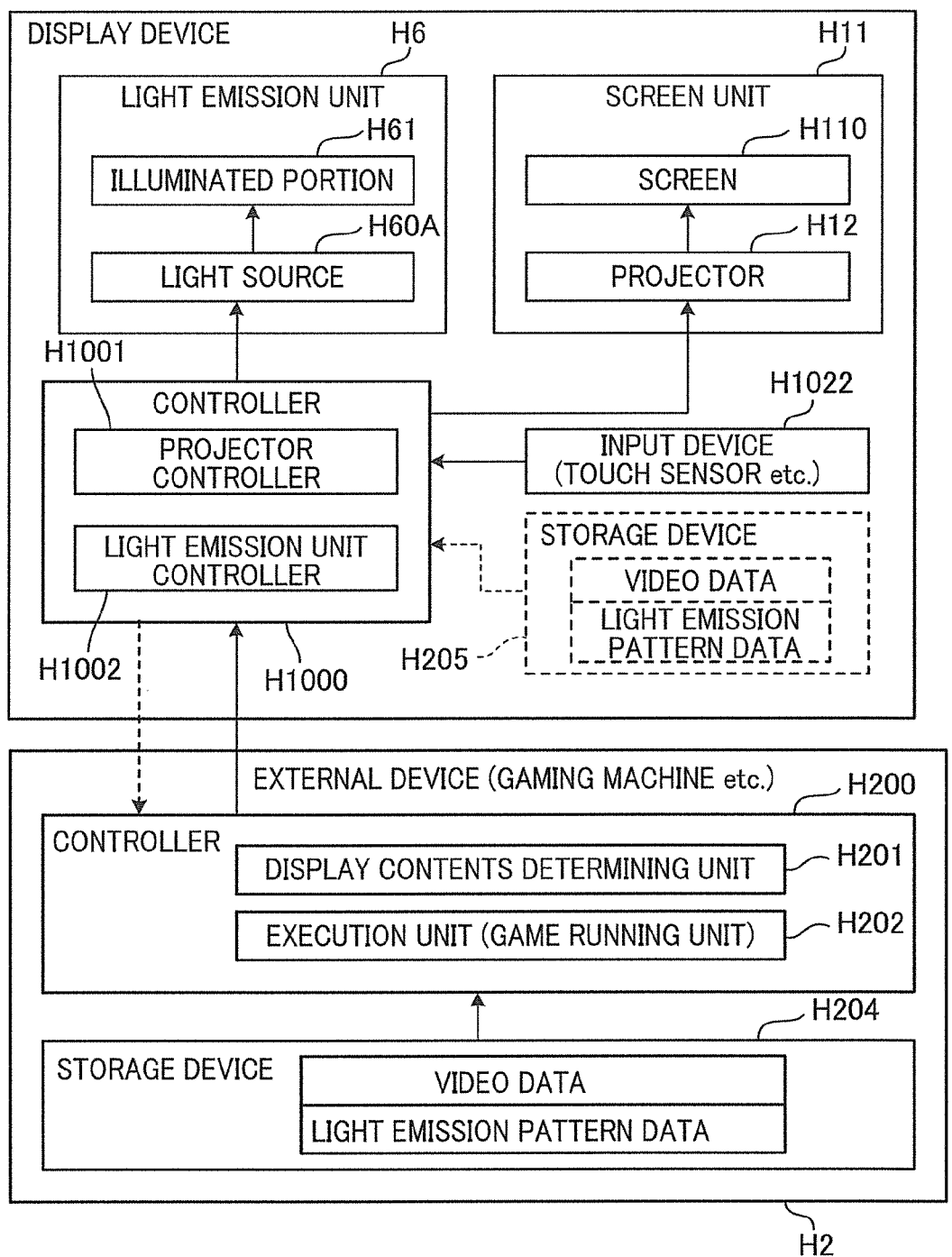
FIG. 38 is an explanatory functional block diagram related to Tenth Embodiment.

FIG. 37 is a flowchart of a control process executed by the control circuit F10250. The operation of the control circuit F10250 will be described with reference to FIG. 37.

As shown in FIG. 37, the control circuit F10250 first determines whether an input has been received (S1). The input includes: an input to the touch sensor F1022 by a user; and an input of a signal (e.g., a signal indicating a gaming state) transmitted from an external device such as a gaming machine connected to the display device. If there is no input (S1: NO), the step S1 is repeated. Note that the control process may include a step performed when there is no input. For example, illumination of the light-transmitting portion F1021b (LED array F1024) in a predetermined manner may be continued unless an input to the touch sensor F1022 is received.

When there is an input (S1: YES), the control circuit F10250 discerns the type of the input (S2). Then, the control circuit F10250 determines the object to be controlled (S3). That is, the control circuit F10250 selects the actuator to be controlled based on the type of the input. The actuator includes: the LED array F1024, the speaker F10253, and the LEDs G60A on the LED substrate G60. That is, the ROM F10251 stores therein a data table in which the controlled actuators are associated with the types of the input. The control circuit F10250 selects the actuator associated with the concerned type of the input referring to the data table.

Then, the control circuit F10250 selects a control pattern according to which the actuator is controlled (S4). That is, the ROM F10251 stores therein a data table in which the control patterns of the actuators are associated with the types of the input. The control circuit F10250 selects the control pattern associated with the actuator to be controlled, referring to the data table.

Then, the control circuit F10250 controls the actuator in accordance with the selected control pattern (S5). Then, the process ends. To be more specific, when an input is made by a user to the touch sensor F1022, the control circuit performs control to change the illumination manner of the light-transmitting portion F1021b (LED array F1024) to the pattern associated with the type of the input. When controlling the LEDs G60A in response to an input to the touch sensor F1022, the control circuit F10250 transmits a control signal to the LED substrate G60 or to a control board controlling the LED substrate G60, to control the LEDs G60A.

Further, when touch input is performed by a user, the control circuit F10250 may instruct the LED substrate G60 to emit light from the LEDs G60A in a predetermined manner and/or instruct a projector controller to display a predetermined image on the screen G110. When the control circuit F10250 instructs the LED substrate G60 to emit light, the light guiding plate G61, which is visible from a lateral side of the display device and is larger than the main body, is turned on in the predetermined manner (e.g., in red), in addition to the light-transmitting portion F1021*b* of the touch area F1021*a* and the screen G110 in front of a user. This makes it easier for the administrator of the external device to find the display device through which the administrator is called (the external device provided with the display device G1 through which the administrator is called). The administrator arriving at that external device (e.g., a gaming machine) generally turns off the illumination through operation on the touch sensor F1022 (touch area F1021*a*). However, the device may be arranged so that the lighting manner of the LEDs G60A is changed by the LED substrate F1025 over the time elapsing from the touch input. For example, the control circuit F10250 may control the LEDs G60A so as to: turn on the LEDs G60A in red in response to an input by a user; change the lighting manner so that the LEDs G60A blink in red, 30 seconds after the input by the user; and further change the lighting manner so that the LEDs G60A blink in red at a speed higher than before, one minute after the input by the user. This enables the administrator of the external device to understand, at a glance, how much time has passed from the input by the user, even if the administrator is away from the external device. Therefore, if the administrator is called from a plurality of external devices, the above arrangement enables the administrator to prioritize the devices to be dealt with, leading to appropriate service for users.

As described above, the control circuit F10250 performs control to change the lighting manner of the LEDs G60A, which are the light sources for the light guiding plate G61, when a touch input to the touch area F1021*a* is made. Further, the control circuit F10250 performs control to change the lighting manner of the LEDs G60A depending on the time having passed from the touch input to the touch area F1021*a*. Herein, "to change the lighting manner" includes an operation to turn on the turned-off LEDs, and an operation to change the lighting state of the turned-on LEDs from one state to another state. The lighting manner of the LEDs G60A may be changed intermittently, at predetermined timing as described above, or may be changed continuously over the time from the input. For example, the color or the blinking speed of the LEDs may be changed gradually. The control of the LEDs G60A based on the touch input to the touch area F1021*a* does not have to be performed by transmitting an instruction signal from the control circuit F10250 to the LED substrate G60 and/or the projector controller, as described above. For example, the display device F1 may be configured so that the LEDs G60A are connected to the control circuit F10250 to enable the control circuit F10250 to directly control the LEDs G60A.

Outline of Ninth Embodiment

The display device F1 of Ninth Embodiment includes: the exterior panel F1021 having the light-transmitting portion F1021*b* through which light is transmittable and which is provided in the touch area touchable by a user; the light-transmitting touch sensor F1022 which is provided behind the exterior panel F1021 so as to correspond to the touch area F1021*a*, and is configured to detect a touch input to the touch area F1021*a*; the LED array F1024; the light guiding plate F1023 which is provided behind the touch sensor F1022, and is configured to guide light emitted from the LED array F1024 to the light-transmitting portion F1021*b* of the exterior panel F1021; and the control circuit F10250 configured to perform lighting control of the LED array F1024.

In the above arrangement, when a touch input to the touch area F1021*a* is made by a user, the touch sensor F1022 detects the touch input. Meanwhile, the LED array F1024 is turned on under the lighting control by the control circuit F10250, and light emitted from the LED array F1024 is guided to the light-transmitting portion F1021*b*, so that the user is able to see light through the light-transmitting portion F1021*b*. With this arrangement, light emitted from the LED array F1024 is applied to the light-transmitting portion F1021*b* in the touch area F1021*a* of the exterior panel F1021. This makes it easier for the user to understand where to touch. Further, the input is made to the touch area F1021*a* formed as a planar surface, instead of a known call button having a movable portion. This prevents failures caused by dirt or the like entering a space around the movable portion, and failures caused by fatigue in the movable portion.

In the display device F1 of Ninth Embodiment, the control circuit F10250 performs control so as to change the lighting manner of the LED array F1024 when there is a touch input to the touch area F1021*a*.

In the above arrangement, the change of the lighting manner of the LED array F1024 illuminating the light-transmitting portion F1021*b* enables the user to confirm that the touch input by the player has been received. This prevents the user from repeatedly touching the touch area F1021*a* before a staff person comes, which may cause deterioration of the surface of the touch area.

The display device F1 of Ninth Embodiment may further include: the light-transmitting light guiding plate G61 provided so as to be attachable to and detachable from the base body G101, and having the opening-side end surface G61*b* of a predetermined shape which forms an opening penetrating the plate G61 in its thickness direction; the LEDs G60A arranged to be opposed to the opening-side end surface G61*b* forming the opening G61*a* of the light guiding plate G61, and the display device may be arranged such that: the LEDs G60A are arranged to be aligned along the opening-side end surface G61*b*, and the light guiding plate G61 includes the reflecting portions G61*d* processed to reflect, in the thickness direction of the light guiding plate G61, a part of light emitted from the LEDs G60A and guided into the light guiding plate G61 through the opening-side end surface G61*b*; and the control circuit F10250 performs control to change the lighting manner of the LEDs G60A to a predetermined lighting manner, when there is a touch input to the touch area F1021*a*.

In this arrangement, in response to a touch input by a user, the lighting manner of light emitted from the LEDs G60A is changed to the predetermined lighting manner. Light radially spreads in the light guiding plate G61 and reaches the outer end surface of the plate G61, and thereby the entire circumference of the light guiding plate G61 is lighted annularly. As a result, the light guiding plate G61 lighted in the predetermined lighting manner is visible from any direction relative to the display device F1. This makes it easier for the administrator (e.g. the administrator of a casino) to find the external device (e.g., gaming machine) provided with the display device F1 through which the touch input has been made. Further, the designability of the display device F1 is improved by light exiting from the surface of the light guiding plate G61. In addition, because the light guiding plate G61 is detachable from the base body, it is possible to replace one light guiding plate G61 with another light guiding plate G61 processed to reflect light to provide a different design. Thus, the display device F1 is applicable to various types of external devices.

In the display device F1 of Ninth Embodiment, the control circuit F10250 may perform control so as to change the lighting manner of the LEDs G60A over the time having passed from the touch input to the touch area F1021a.

In this arrangement, the administrator (e.g., the administrator of a casino) is able to know, at a glance, how much time has passed from the touch input by a user by seeing the lighting manner of the light guiding plate G61, even if the administrator is away from the external device (e.g., gaming machine). When such a touch input is made through a plurality of display devices F1, the above arrangement enables the administrator to prioritize the display devices to be dealt with, leading to appropriate service for users.

Tenth Embodiment

The following will describe the display device of Tenth Embodiment of the present invention. In Tenth Embodiment, the configuration of functional blocks of a display device will be described with reference to the mechanical structure of the devices of the above-described Embodiments.

(Functional Block Diagram)

A display device H1 includes: a projector H12 configured to project light to display information in the form of a projection image; a screen H110 having a display surface through which light projected by the projector passes to form a projection image thereon; and a controller H1000 configured to control the projector H12. The display surface of the screen H110 has a non-planar shape. The display surface of the screen H110 may have a curved shape having inclination, like the display surface of the screen 110D (see FIG. 17), for example, to make the display surface non-planar. The display surface of the screen H110 may be formed by a plurality of projection surface members partially overlapping each other, like the display surface of the screen 110E (see FIG. 19) or the display surface of the screen 110F (see FIG. 20), to make the display surface non-planar. Alternatively, the screen H110 may be arranged to be replaceable in the display device H1, like the screens 11A to 11C (see FIG. 5).

The display device H1 includes: a screen unit H11 including the screen H110 and the projector H12 as constituent elements; a light emission unit H6 having light sources H60A and an illuminated portion H61 illuminated by the light sources H60A; and the controller H1000. The controller H1000 includes: a projector controller H1001 configured to control the screen unit H11; and a light emission unit controller H1002 configured to control the light emission unit H6. The light emission unit H6 may be provided so that at least one of the edge portions of the screen H110 is fringed therewith, for example, like the light emitters 71 and the diffused reflection portion 72 (see FIG. 21 to FIG. 26). In this case, the edge portion(s) of the screen H110 may be arranged so that the display surface of the screen H110 is shielded from light emitted from the light emission unit H6.

The light emission unit H6 may be disposed so that: the illuminated portion H61 overlaps the screen H110 when viewed from the front; and at least an illuminated part of the illuminated portion H61 is visible from the front. More specifically, the light emission unit H6 may be configured as follows, like the LEDs G60A and the light guiding plate G61 (see FIG. 27 to FIG. 29 and FIG. 32), for example. That is, the light emission unit H6 may include: a light-transmitting light guiding plate functioning as the illuminated portion H61, provided on the opposite side of a casing from the display surface so as to be attachable to and detachable from the casing, and having an opening of a predetermined shape penetrating the plate in its thickness direction; and the light sources H60A disposed to be opposed to an opening-side end surface forming the opening of the light guiding plate, and may be arranged such that the light sources H60A are arranged to be aligned along the opening-side end surface, and light from the light sources H60A is guided in the light guiding plate through the opening-side end surface, to illuminate an outer end surface of the light guiding plate. In this case, the light guiding plate functioning as the illuminated portion H61 may have a reflecting portion, similarly to the light guiding plate G61 (see FIG. 31B and FIG. 32). The reflecting portion has been processed to reflect, in the thickness direction of the plate, a part of light emitted from the light sources H60A and guided in the plate.

The display device H1 further includes an input device H1022 configured to receive operation from the outside. The input device H1022 may be a touch sensor provided to the display device H1, like the touch sensor F1022 (see FIG. 35 and FIG. 36). The touch sensor functioning as the input device H1022 may be provided to the screen H110, or may be provided to the casing of the screen unit H11. The display device H1 may control the light emission unit to emit light in a predetermined light emission mode upon receiving a signal from the input device H1022.

The display device H1 is connected to an external device H2 such as a gaming machine. The external device H2 includes a controller H200 and a storage device H204. The controller H200 includes: an execution unit H202 configured to execute the functions of the external device; and a display contents determining unit H201 configured to determine contents to be displayed by the display device H1. When the external device H2 is a gaming machine, for example, the execution unit H202 is a game running unit configured to run a game, and the display contents determining unit H201 determines contents to be displayed by the display device H1 based on the contents of a game executed by the execution unit H202, and transmits the contents, in the form of signals, to the display device H1.

The storage device H204 stores therein video data to be displayed on the screen unit H11, and data for light emission patterns used to control the light emission unit H6. The display contents determining unit H201 selects a piece of data corresponding to the contents of the game executed by the execution unit H202 from the pieces of data stored in the storage device H204, and transmits a signal indicating the selected piece of data to the display device H1. Note that the display device H1 may include a storage device H205 which stores therein video data to be displayed by the screen unit H11, and data for light emission patterns used to control the light emission unit H6. This enables the display device H1 to operate independently.

Figure 39:
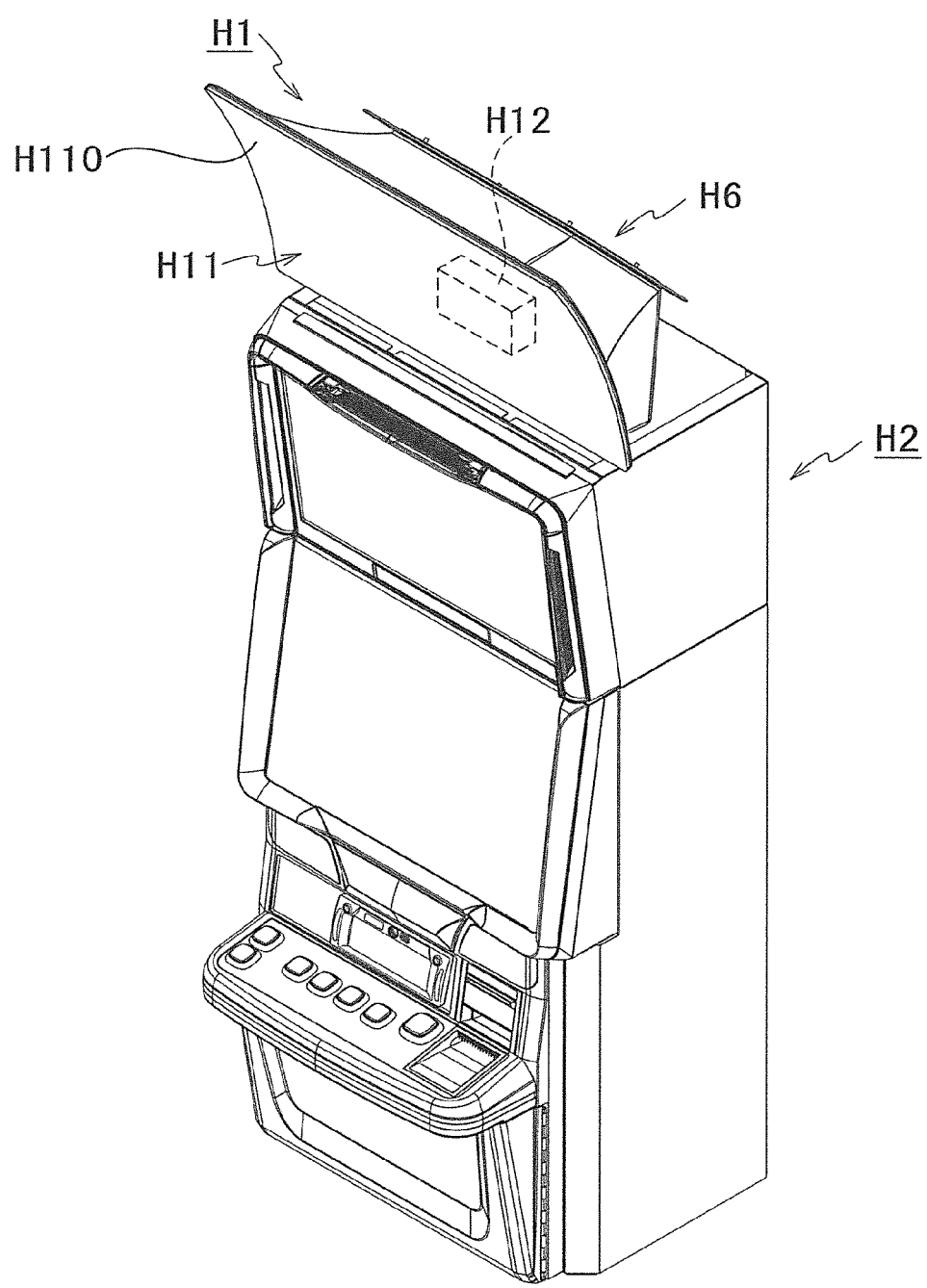
FIG. 39 shows the external appearance of a gaming machine in which the display device is applied.

The following will describe an example in which a gaming machine is used as the external device H2, with reference to FIG. 39. As shown in FIG. 39, the display device H1 is provided to function as a topper of the gaming machine. In the display device H1, the screen H110 of the screen unit H11, the display surface of which has a non-planar shape, is provided so that the display surface of the screen H110 and the display screen of the gaming machine H2 are on the same side. The projector H12 provided inside the display device H1 projects light from the inside to the screen H110, to display information thereon in the form of a projection image. In the display device H1, the light emission unit H6 is provided on the back side so that the light emission unit H6 overlaps the screen H110 when viewed from the front. The gaming machine H2 transmits data to be displayed, to the display device H1, in accordance with the contents of a game to be executed by the gaming machine H2. Based on the data transmitted from the gaming machine H2, the display device H1 controls the projector H12 to project video images onto the screen H110, and controls the light emission mode of the light emission unit H6. The display device H1 does not have to include the light emission unit H6 as long as the display device H1 includes: the screen H110 having the non-planar display surface (as a constituent element of the screen H110); and the projector configured to project light from the inside to display information on the screen H110 in the form of a projection image.

While the embodiments of the present invention have been described, the present invention is not limited to the embodiments, modifications, and the like described above.

For example, when the display device is connected to a gaming machine, different screen units may be used for different gaming machines. Alternatively, the same type of screen units may be used for a bank of gaming machines.

It is only required that the display device is structured as a transmission type projector device with a screen unit replaceable with another screen unit having a screen of a different configuration. For example, the projector main body may be installed on the upper surface or a side surface of the casing. Alternatively, the display device may be arranged so that light projected from the projector main body directly enters the incident surface or incident portion on the back side of the screen, without reflected by a reflector.

The number of types of replaceable screen units is not limited to three, as described in the above embodiments. The number of the types may be two, or four or more, as long as there is a difference in the configuration or the like of the screen. Such a difference may be in the material of the screen, instead of the configuration of the screen.

The position of the light exit surfaces is not limited to the left and right end portions of the front surface. The light exit surfaces may be provided at upper and lower portions of the front surface, or on the side surfaces.

The shape of the second display surfaces is not limited to that described above. Each second display surface may be of a parallelogram, rhombus, or circular shape, as long as the second display surfaces are located forward of the first display surface.

The operation unit including the buttons may be provided unitarily with the screen unit.

The movable decoration sheets and the fixed decoration sheets do not have to be provided on the side surfaces. For example, the sheets may be provided behind the light exit surfaces on the front side.

The light sources used for the movable decoration sheets and the fixed decoration sheets are not limited to the LEDs. For example, electroluminescent lamps or electric lamps may be used.

The size of the light-guiding holes may be different between the movable decoration sheets and the fixed decoration sheets. For example, the diameter of the light-guiding holes of the decoration sheets closer to the LEDs may be relatively large while the diameter of the light-guiding holes of the decoration sheets farther from the LEDs may be relatively small. Alternatively, the arrangement contrary to the above is also possible. That is, the diameter of the light-guiding holes of the decoration sheets closer to the LEDs is relatively small while the diameter of the light-guiding holes of the decoration sheets farther from the LEDs is relatively large. By making a difference in the size of the light-guiding holes between the sheets, a sufficient clearance is ensured when shifting to the state where the holes of one sheet overlap the holes of the other sheet or to the state where the holes of one sheet do not overlap the holes of the other sheet. As a result, a sufficient movement distance for the movable decoration sheet is ensured.

When a screen unit is replaced with another one, there may be needed to change projection data corresponding to projection images and to optically correct the projection images because the configuration and characteristics differ from screen to screen. To deal with this, the control unit of the display device may be arranged as follows: the control unit stores in advance setting information related to projection image data and optical correction data associated with the configurations and the like of the screens. This enables the control unit to invoke and apply the piece of setting information corresponding to the configuration and the like of the attached screen.

To realize the structure such that the corresponding piece of setting information is selectable in response to the replacement of the screen unit, the following arrangements (1), (2), or (3) may be made. (1) Arranging the control unit so as to determine whether the LED substrate (cable) is connected or not. (2) Providing another controller in the screen unit; when the control unit of the casing is activated after replacement of the screen unit, transmitting a specific command from that another controller to the control unit; causing the control unit to determine which of the screen units is connected to the casing. (3) Arranging the device so that a setting screen is invoked in response to an operation of a button on the operation unit, to enable an administrator to input the type of the screen unit after replacement, as setting information, on the setting screen.

Such setting information determines in which projection way (manner) a piece of image data is projected. Such setting information may be changeable in a server device functioning as a hall computer. Further, arrangement may be made such that a change in the setting information in one display device is also applied in other display devices, under master-slave control.

It is only required for the movable decoration sheet to be moved so that the contrast increases when the LEDs are turned on or blink in response to reception, by the display device, of a signal from an external device (e.g., a signal indicating the game status from a gaming machine), or in response to detection of a status of the external device by the display device.

When "coordination effect" is provided on a plurality of display devices, the movable decoration sheets of the display devices may be moved at the same time by operating the driving mechanisms for the movable decoration sheets of the display devices, in association with the coordination effect. The coordination effects include effects provided in coordination with one another among the devices in the same section, and effects provided in coordination with one another among the devices connected to the external devices of the same type.

Based on the embodiments described above, the summary of the present invention is listed below.

(Note A1)

According to an aspect of the present invention, a display device (e.g., display device 1) includes: a projector unit (e.g., a projector main body 12) configured to project light to display information in the form of a projection image; a light-passing portion (e.g., opening 10A) through which light projected by the projector unit passes; and a projection surface member (e.g., screens 110A to 110C) through which light having passed through the light-passing portion is transmitted to form a projection image thereon, wherein the projection surface member includes a display surface (e.g., (first) display surface 1101 and second display surfaces 1101B and 1101C) on which a projection image is projected, and is arranged to be replaceable relative to the light-passing portion; and the display surface is configured to be able to change visual impressions of a projection image along with the replacement of the projection surface member.

(Note A2)

In a preferable embodiment of the present invention, the display device includes at least another display surface (e.g., light exit surfaces 111a) which is different from the aforementioned display surface, and that another display surface is able to provide display in a manner different from that of the display of a projection image.

(Note B1)

According to an aspect of the present invention, a display device (e.g., display device 1) includes: a projector unit (e.g., projector main body 12) configured to project light to display information in the form of a projection image; a projection surface member (e.g., screens 110A to 110C) onto which a projection image is formed by light projected by the projector unit, wherein the projection surface member includes: an incident surface (e.g., incident surface 1100) into which light projected by the projector unit enters; and a display surface (e.g., (first) display surface 1101, second display surfaces 1101B and 1101C) through which light having entered into the incident surface is transmitted to form a projection image thereon, the incident surface is formed by a uniform surface, and the display surface at least includes: a first area (e.g., first display surface 1101); and a second area (e.g., second display surfaces 1101B and 1101C) defined by a difference in a position in a thickness direction of the member from the first area.

(Note B2)

In a preferable embodiment of the present invention, the display device further includes a light-passing portion (e.g., opening 10A) through which light projected by the projector unit passes, and the projection surface member is arranged to be replaceable relative to the light-transmitting portion.

(Note C1)

According to an aspect of the present invention, a display device (e.g., display device 1) includes: a light emitting unit (e.g., LEDs 20A) configured to emit light; a plurality of light guiding portions (e.g., light-guiding holes 30A, 40A) through which light from the light emitting unit is guided from a back side to a front side; at least one set of sheet members (e.g., movable decoration sheets 30 and fixed decoration sheets 40) provided to be opposed to each other, at least one sheet member of the set of the sheet members (e.g., movable decoration sheet 30) being movable relative to the sheet member opposed thereto (e.g., fixed decoration sheet 40); and a driver (e.g., driving mechanism 32) configured to move the at least one movable sheet member between a first position and a second position, wherein: when the movable sheet member is in the first position, the light guiding portions of the movable sheet member partially or completely overlap the light guiding portions of the sheet member opposed to the movable sheet member; and when the movable sheet member is moved from the first position to the second position, the light guiding portions of the movable sheet member are misaligned with the light guiding portions of the sheet member opposed to the movable sheet member.

(Note C2)

In a preferable embodiment of the present invention, the display device includes: a projector unit (e.g., projector main body 12) configured to project light to display information in the form of a projection image; a main body (e.g., casing 10) accommodating the projector unit; a projection surface member (e.g., screens 110A to 110C) onto which a projection image is formed by light projected by the projector unit; and a cover member (e.g., screen units 11A to 11C) which supports the projection surface member and functions as an exterior component for the main body, wherein: the movable sheet member is provided on the main body; the sheet member opposed to the movable sheet member is provided on the cover member; and the cover member is replaceable relative to the main body.

(Note C3)

According to another aspect of the present invention, a display device includes: a light emitting unit (e.g., LEDs 20A) configured to emit light; a plurality of light guiding portions (e.g., light-guiding holes 30A, 40A) through which light from the light emitting unit is guided from a back side to a front side; at least one set of sheet members (e.g., movable decoration sheets 30 and fixed decoration sheets 40) provided to be opposed to each other, at least one sheet member of the set of the sheet members (e.g., movable decoration sheet 30) being movable relative to the sheet member opposed thereto (e.g., fixed decoration sheet 40); and a driver (e.g., driving mechanism 32) configured to move the at least one movable sheet member between a first position and a second position, wherein: when the movable sheet member is in the first position, the light guiding portions of the movable sheet member partially or completely overlap the light guiding portions of the sheet member opposed to the movable sheet member; and when the movable sheet member is moved from the first position to the second position, the light guiding portions of the movable sheet member are misaligned with the light guiding portions of the sheet member opposed to the movable sheet member.

(Note D1)

According to an aspect of the present invention, a display device includes: a projector unit configured to project light to display information in the form of a projection image; a light-passing portion through which light projected by the projector unit passes; and a projection surface member through which light having passed through the light-passing portion is transmitted to form a projection image thereon, wherein the projection surface member includes a display surface on which a projection image is projected, and is arranged to be replaceable relative to the light-passing portion; and the display surface is configured to be able to change visual impressions of a projection image along with the replacement of the projection surface member.

(Note D2)

In a preferable embodiment of the present invention, the display device includes: the display device includes at least another display surface which is different from the aforementioned display surface, and that another display surface is able to provide display in a manner different from that of the display of a projection image.

(Note E1)

According to an aspect of the present invention, a display device includes: a projector unit (projector main body 12) provided in a casing (10) of the display device and configured to project light to display information in the form of a projection image; a projection surface member (screens 110A to 110F) onto which the projection image is projected;

a substrate (70) provided in the vicinity of at least one of edge portions of the projection surface member (e.g., a lower edge portion of the projection surface member) and having at least one light emitter mounted thereon; a diffused reflection portion (72) provided at an edge portion of the projection surface member that is opposed to the at least one of the edge portions (e.g., an upper edge portion of the projection surface member); and a light-shielding member (73) provided between the substrate and the casing.

(Note E2)

The display device of the above aspect may be arranged such that that the projection surface member is formed by a light guiding portion (incident portion 1100) and a display portion (display portion 1101) having their respective predetermined thickness, and the light guiding portion is configured to guide light from the light emitter to the diffused reflection portion.

What is claimed is:

1. A projection-type display device comprising:
    a casing including a screen unit forming a wall of the casing,
    a projector disposed within the casing that projects light to display information in a form of a projection image, and
    a first light emission unit including a light incident surface member and a first light source disposed within the casing,
    wherein,
    the screen unit includes:
        a display surface member upon which the light projected by the projector passes to form a projection image thereon, wherein,
    the light incident surface member is disposed adjacent a rearward side of the display surface member and has a first edge, a second edge, and a diffused reflection portion proximate the second edge, wherein,
    the first light source is disposed proximate the first edge of the light incident surface member such that light from the first light source is emitted into the first edge of the light incident surface member and propagated through the light incident surface member toward the second edge and the diffused reflection portion, wherein,
    the diffused reflection portion includes projections and recesses that irregularly reflect the propagated light such that the screen unit proximate the diffused reflection portion is illuminable by light emitted from the first light source, wherein
    the wall formed from the screen unit comprises one or more of a planar surface, an arcuate surface, and a screen surface comprising more than one plane, and wherein,
    the projection-type display device further comprises:
    a second light emission unit provided on an external nonscreen wall of the casing, the second light emission unit including a detachable light guiding plate sandwiched between a cover and the external non-screen wall of the casing, the detachable light guiding plate including an opening in its thickness direction; and
    a plurality of second light sources disposed opposite an inner opening-side edge surface of the opening of the detachable light guiding plate, the second light sources arranged along the inner opening-side edge surface, the opening and the plurality of second light sources covered from direct view in the sandwiching direction by the cover such that light emitted from the second light sources is guided into the detachable light guiding plate via the opening-side edge surface and propagated through the detachable light guiding plate so as to illuminate an outer edge surface of the detachable light guiding plate.

2. The projection-type display device according to claim 1, wherein the first light emission unit comprises a plurality of diffused reflection portions and a plurality of third light sources disposed on a plurality of edges of the light incident surface member such that the screen unit proximate the plurality of diffused reflection portions is illuminable with light emitted from the plurality of light sources.

3. The projection-type display device according to claim 2, further comprising:
    an input device configured to receive an input operation from an outside source;
    a non-transitory memory device that stores a data table in which control patterns are associated with types of signals received from the input device; and
    a central processing unit (CPU) communicatively connected to an external device and configured to control the first, second and third light emission units based on a control pattern associated with a type of signal received from the input device.

4. The projection-type display device according to claim 2, wherein at least one of the display surface member and light incident surfaces are detachably securable to the casing.

5. The projection-type display device according to claim 1, wherein the casing is provided with a light-shielding member configured to shield the display surface from light emitted by the first light source.

6. The projection-type display device according to claim 5, further comprising:
    an input device configured to receive an input operation from an outside source;
    a non-transitory memory device that stores a data table in which control patterns are associated with types of signals received from the input device; and
    a central processing unit (CPU) communicatively connected to an external device and configured to control the first, second and third light emission units based on a control pattern associated with a type of signal received from the input device.

7. The projection-type display device according to claim 1, wherein the light guiding plate includes a reflecting portion that reflects, in the thickness direction of the light guiding plate, a part of light emitted from the second light sources and propagated in the light guiding plate.

8. The projection-type display device according to claim 7, further comprising:
    an input device configured to receive an input operation from an outside source;
    a non-transitory memory device that stores a data table in which control patterns are associated with types of signals received from the input device; and
    a central processing unit (CPU) communicatively connected to an external device and configured to control the first and second light emission units based on a control pattern associated with a type of signal received from the input device.

9. The projection-type display device according to claim 1, further comprising:
    an input device configured to receive an input operation from an outside source;
    a non-transitory memory device that stores a data table in which control patterns are associated with types of signals received from the input device; and a central processing unit (CPU) communicatively connected to an external device and configured to control the first and second light emission units based on a control pattern associated with a type of signal received from the input device.

10. A projection-type display device comprising:

a casing including a screen unit forming a wall of the casing, a projector disposed within the casing that projects light to display information in a form of a projection image, and a light emission unit comprising a detachable light-transmitting light guiding plate disposed on an external non-screen wall of the casing and sandwiched between a cover and the external non-screen wall of the casing, the light guiding plate including an opening in its thickness direction; and a plurality of light sources disposed opposite an inner opening-side edge surface of the opening of the light guiding plate, the light sources arranged along the inner opening-side edge surface, the opening and the plurality of light sources being covered from direct view in the sandwiching direction by the cover such that light from the light sources is guided into the light guiding plate via the inner opening-side edge surface and propagated through the light guiding plate so as to illuminate an outer edge surface of the light guiding plate, wherein the wall formed from the screen unit comprises one or more of a planar surface, an arcuate surface, and a screen surface comprising more than one plane.

* * * * *